(12) United States Patent  
Liu et al.

(10) Patent No.: US 11,886,880 B2  
(45) Date of Patent: Jan. 30, 2024

(54) DATA PROCESSING APPARATUS AND RELATED PRODUCTS WITH DESCRIPTOR MANAGEMENT

(71) Applicant: CAMBRICON TECHNOLOGIES CORPORATION LIMITED, Beijing (CN)

(72) Inventors: Shaoli Liu, Beijing (CN); Bingrui Wang, Beijing (CN); Xiaoyong Zhou, Beijing (CN); Yimin Zhuang, Beijing (CN); Huiying Lan, Beijing (CN); Jun Liang, Beijing (CN); Hongbo Zeng, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 17/849,182

(22) Filed: Jun. 24, 2022

(65) Prior Publication Data

US 2022/0334840 A1    Oct. 20, 2022

Related U.S. Application Data

(63) Continuation of application No. 17/489,671, filed on Sep. 29, 2021, now Pat. No. 11,385,895, which is a
(Continued)

(30) Foreign Application Priority Data

Apr. 4, 2019    (CN) .......................... 201910272454.7  
Apr. 4, 2019    (CN) .......................... 201910272513.0  
(Continued)

(51) Int. Cl.  
    *G06F 9/30*           (2018.01)  
    *G06N 3/063*         (2023.01)  
    *G06F 9/38*           (2018.01)

(52) U.S. Cl.  
    CPC ........ *G06F 9/30145* (2013.01); *G06F 9/3838* (2013.01); *G06N 3/063* (2013.01)

(58) Field of Classification Search  
    CPC ........................... G06F 9/30145; G06N 3/063  
    See application file for complete search history.

(56) References Cited

U.S. PATENT DOCUMENTS

| | | |
|---|---|---|
| 2018/0322387 A1 | 11/2018 | Sridharan et al. |
| 2018/0341479 A1 | 11/2018 | Temam et al. |

(Continued)

FOREIGN PATENT DOCUMENTS

| | | |
|---|---|---|
| CN | 1388300 A | 3/2005 |
| CN | 102682448 A | 9/2012 |

(Continued)

OTHER PUBLICATIONS

Extended European Search Report in related European Application No. 20785318.5 dated Nov. 17, 2022 (9 pages).

(Continued)

*Primary Examiner* — Michael J Metzger  
(74) *Attorney, Agent, or Firm* — Bayes PLLC

(57) ABSTRACT

The present disclosure provides a data processing apparatus and related products. The products include a control module including an instruction caching unit, an instruction processing unit, and a storage queue unit. The instruction caching unit is configured to store computation instructions associated with an artificial neural network operation; the instruction processing unit is configured to parse the computation instructions to obtain a plurality of operation instructions; and the storage queue unit is configured to store an instruc- (Continued)

tion queue, where the instruction queue includes a plurality of operation instructions or computation instructions to be executed in the sequence of the queue. By adopting the above-mentioned method, the present disclosure can improve the operation efficiency of related products when performing operations of a neural network model.

20 Claims, 12 Drawing Sheets

Related U.S. Application Data continuation of application No. PCT/CN2020/082803, filed on Apr. 1, 2020.

(30) Foreign Application Priority Data

| | | |
|---|---|---|
| Apr. 19, 2019 | (CN) | 201910319175.1 |
| Jul. 30, 2019 | (CN) | 201910694672.X |
| Aug. 9, 2019 | (CN) | 201910734749.1 |
| Aug. 9, 2019 | (CN) | 201910735393.3 |
| Aug. 9, 2019 | (CN) | 201910735424.5 |
| Aug. 9, 2019 | (CN) | 201910735425.X |

(56) References Cited

U.S. PATENT DOCUMENTS

| | | | |
|---|---|---|---|
| 2018/0341484 A1 | 11/2018 | Fowers et al. | |
| 2018/0365307 A1 | 12/2018 | Zhu | |
| 2019/0042092 A1* | 2/2019 | Wu | G06N 3/063 |
| 2019/0042094 A1 | 2/2019 | Nair et al. | |
| 2019/0179635 A1* | 6/2019 | Jiao | G06N 3/063 |
| 2019/0258919 A1* | 8/2019 | Lie | G06F 17/16 |
| 2020/0042856 A1 | 2/2020 | Datta et al. | |
| 2020/0050557 A1 | 2/2020 | Wu et al. | |
| 2020/0118004 A1* | 4/2020 | Chen | G06F 9/223 |

FOREIGN PATENT DOCUMENTS

| | | | |
|---|---|---|---|
| CN | 103310453 | A | 9/2013 |
| CN | 106970956 | A | 7/2017 |
| CN | 107077327 | A | 8/2017 |
| CN | 107347253 | A | 11/2017 |
| CN | 108364065 | A | 8/2018 |
| CN | 109446147 | A | 3/2019 |
| CN | 109543832 | A | 3/2019 |
| JP | H1185969 | A | 3/1999 |
| WO | 2017143909 | A1 | 8/2017 |
| WO | 2018076868 | A1 | 5/2018 |
| WO | 2018193353 | A1 | 10/2018 |

OTHER PUBLICATIONS

Office Action in related Chinese Application No. 201910734749.1, dated Aug. 26, 2022 (6 pages).
Office Action in related Chinese Application No. 201910735424.5, dated Aug. 26, 2022 (6 pages).
Notice of Reasons for Refusal issued in related Japanese Application No. 2021-510523, dated Oct. 19, 2021, 6 pages.
PickUp!, Norwalk Magazine, No. 63, Japan, Ohmssha Co., Ltd., Jan. 15, 2009, pp. 128 to 131.
Notice of Reasons for Refusal issued in related Japanese Application No. 2020-198200, dated Jan. 13, 2022, 6 pages.
International Search Report and Written Opinion with translation in corresponding International Application No. PCT/CN2020/082803, dated Jul. 2, 2020, 10 pages.
Office Action in corresponding Chinese Application No. 201910319175.1 dated Apr. 2, 2022 (15 pages).
CUDNN Study Notes, https://developer.aliyun.com/article/497075, Alibaba Cloud Community (12 pages).

* cited by examiner

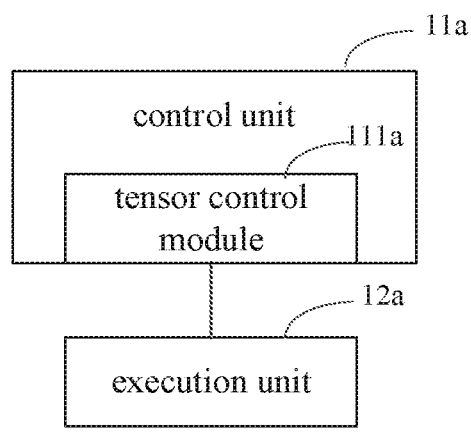
Fig. 1a
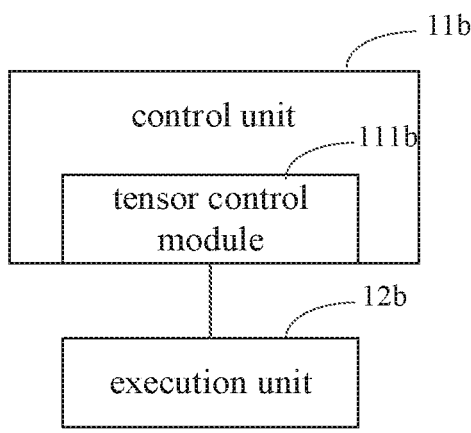
Fig. 1b1

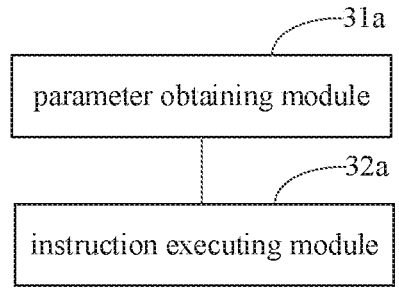
Fig. 3a
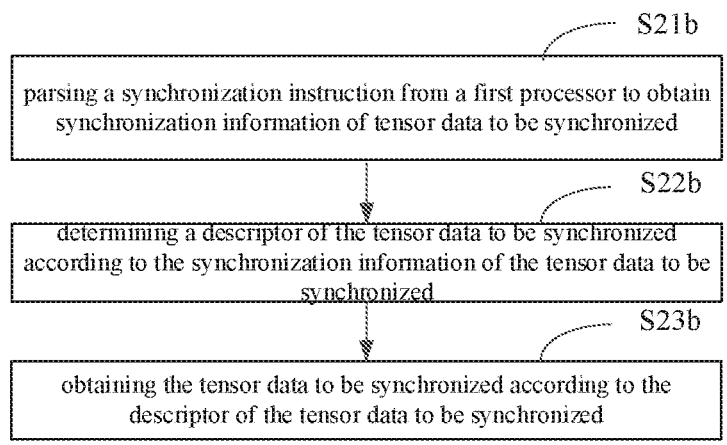
Fig. 3b1
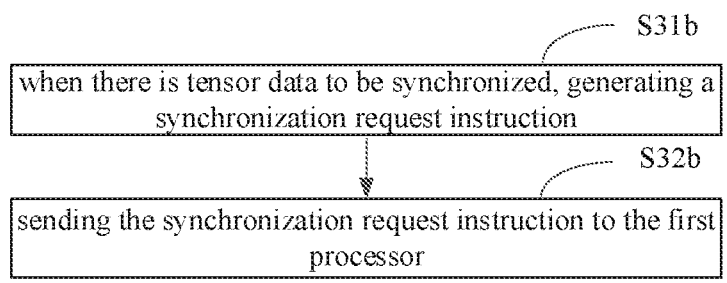
Fig. 3b2

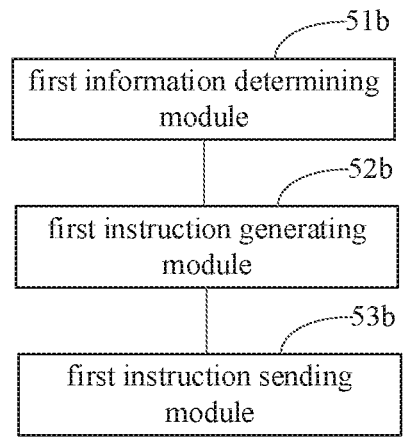
Fig. 3b3
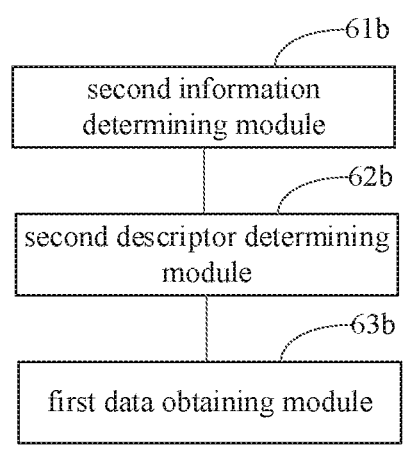
Fig. 3b4
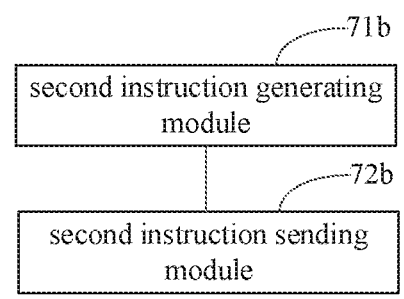
Fig. 3b5

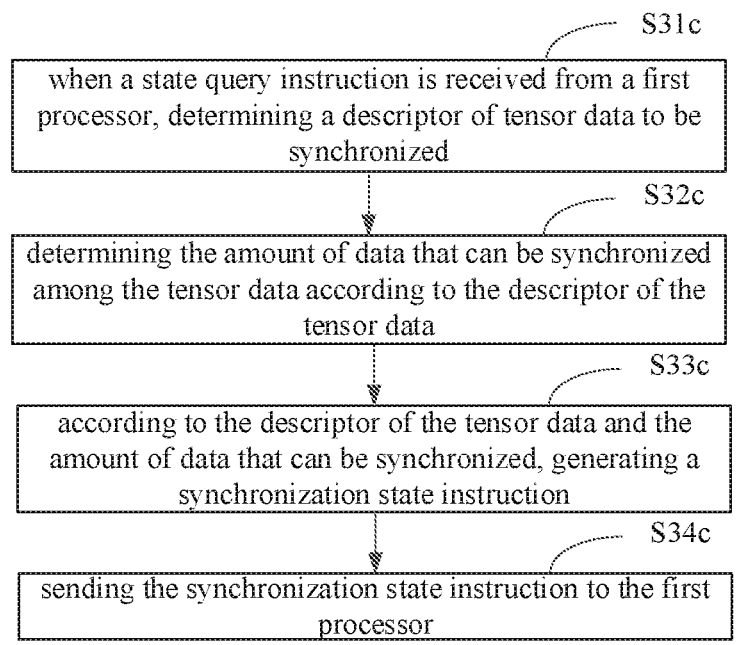
Fig. 3c1
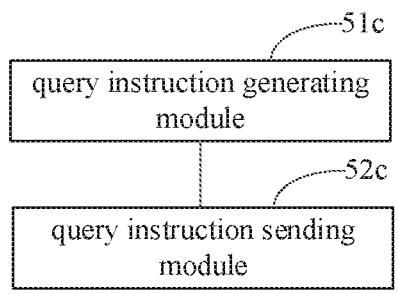
Fig. 3c2
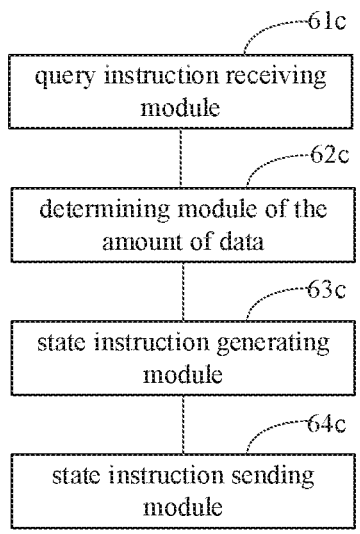
Fig. 3c3

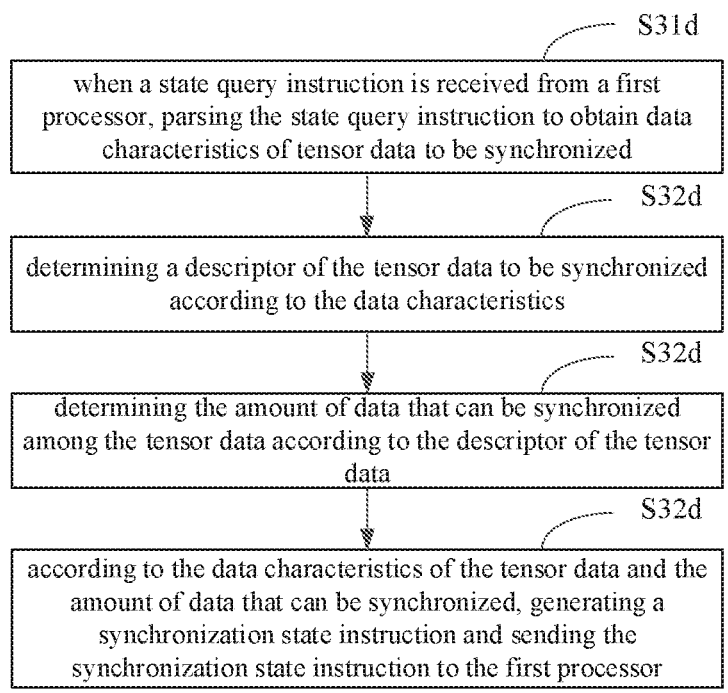
Fig. 3d1
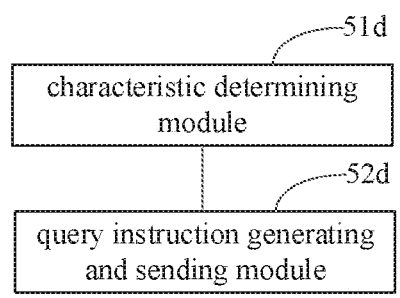
Fig. 3d2

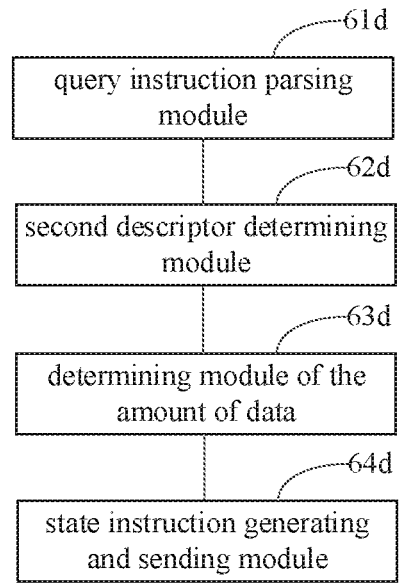
Fig. 3d3
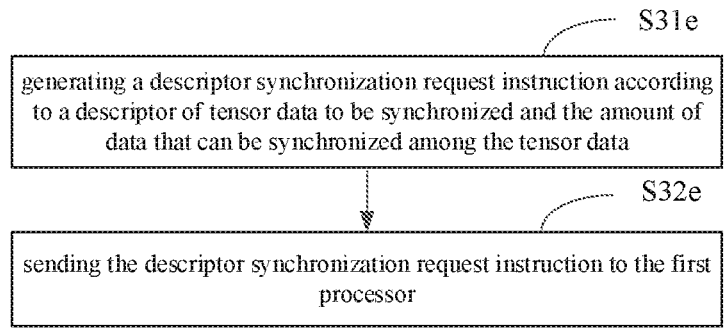
Fig. 3e1
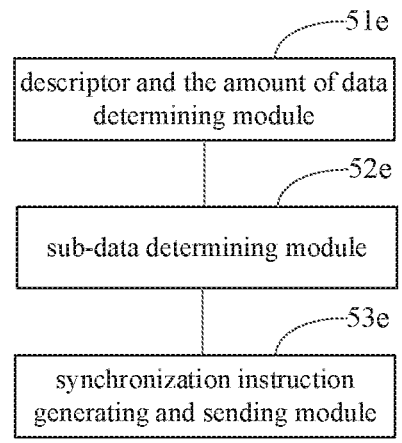
Fig. 3e2

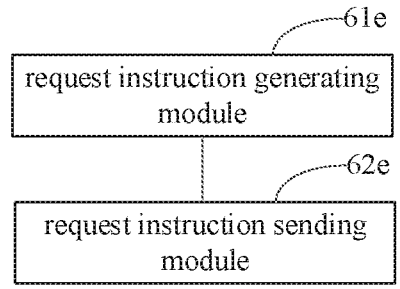
Fig. 3e3
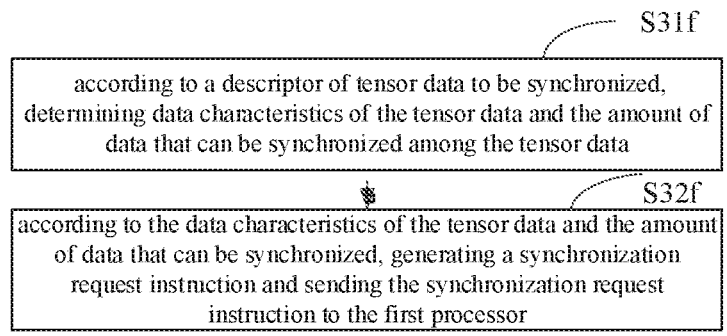
Fig. 3f1
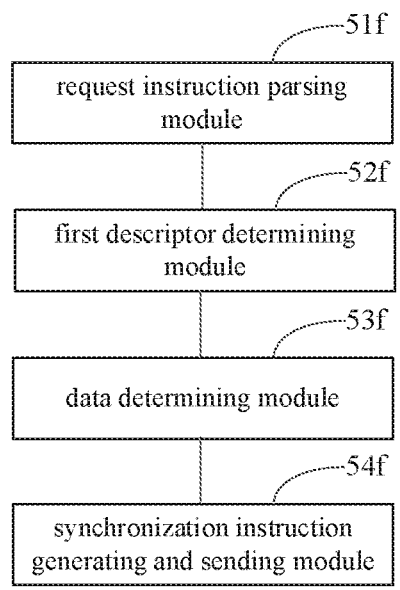
Fig. 3f2

Fig. 3f3

DATA PROCESSING APPARATUS AND RELATED PRODUCTS WITH DESCRIPTOR MANAGEMENT

CROSS-REFERENCE TO RELATED APPLICATIONS

This is a continuation of U.S. application Ser. No. 17/489,671 filed Sep. 29, 2021, which is a bypass continuation application of and claims the benefit of priority of PCT Application No. PCT/CN2020/082803 filed Apr. 1, 2020, which further claims benefit of priority to Chinese Application No. 201910272454.7 filed Apr. 4, 2019, Chinese Application No. 201910272513.0 filed Apr. 4, 2019, Chinese Application No. 201910319175.1 filed Apr. 19, 2019, Chinese Application No. 201910694672.X filed Jul. 30, 2019, Chinese Application No. 201910735425.X filed Aug. 9, 2019, Chinese Application No. 201910735424.5 filed Aug. 9, 2019, Chinese Application No. 201910735393.3 filed Aug. 9, 2019, and Chinese Application No. 201910734749.1 filed Aug. 9, 2019. The contents of all these applications are incorporated herein by reference in their entireties.

TECHNICAL FIELD

The disclosure relates to the field of computer technologies, and particularly to a data processing apparatus and related products.

BACKGROUND

With the continuous development of AI (Artificial Intelligence) technology, the amount of data and data dimensions that need to be processed are increasing. In related arts, processors usually determine the data address by obtaining parameters of instructions, and then read and use data according to the data address. Therefore, those skilled in the art are required to set relevant parameters (such as the relationship between data or between data dimensions, etc.) for data access when designing parameters, so as to generate instructions and send the instructions to processors to complete the data access. The above-mentioned method reduces the processing efficiency of the processors.

SUMMARY

In view of the above, the present disclosure provides a data processing technical solution.

A first aspect of the present disclosure provides a data processing apparatus including a control circuit and an execution circuit, where the control circuit includes a tensor control module, and the control circuit may be configured to:
when an operand of a decoded first processing instruction includes an identifier of a descriptor, determine a descriptor storage space corresponding to the descriptor by the tensor control module according to the identifier of the descriptor, wherein the descriptor indicates a shape of a tensor data;
obtain content of the descriptor from the descriptor storage space; and
send the content of the descriptor and the first processing instruction to the execution circuit, for the execution circuit to execute the first processing instruction according to the content of the descriptor.
The execution circuit is configured to execute the first processing instruction on the tensor data obtained from the data address.

A second aspect of the present disclosure provides an artificial intelligence chip including the data processing apparatus.

A third aspect of the present disclosure provides an electronic device including the artificial intelligence chip.

A fourth aspect of the present disclosure provides a board card including: a storage device, an interface apparatus, a control device, and the above-mentioned artificial intelligence chip. The artificial intelligence chip is connected to the storage device, the control device, and the interface apparatus respectively; the storage device is configured to store data; the interface apparatus is configured to implement data transfer between the artificial intelligence chip and an external equipment; and the control device is configured to monitor a state of the artificial intelligence chip.

A fifth aspect of the present disclosure provides a data processing method performed by an artificial intelligence chip, including:
determining, by a control circuit, that an operand of a first processing instruction includes an identifier of a descriptor, wherein content of the descriptor indicates a shape of tensor data on which the first processing instruction is to be executed;
determining, by the control circuit, a descriptor storage space corresponding to the descriptor according to the identifier of the descriptor;
obtaining, by the control circuit, the content of the descriptor from the descriptor storage space;
determining, by the control circuit, a data address of the tensor data to be used as the operand of the first processing instruction in the data storage space according to the content of the descriptor; and
executing, by an execution circuit, the first processing instruction on the tensor data obtained from the data address.

According to the data processing apparatus provided in the present disclosure, by introducing the descriptor indicating the shape of the tensor and configuring the tensor control module in the control circuit, the corresponding descriptor storage space may be determined by the tensor control module when the operand of the decoded processing instruction includes the identifier of the descriptor, the content of the descriptor may be obtained from the descriptor storage space, and the content of the descriptor and the processing instruction may be sent to the execution unit, so that the execution unit executes the instruction according to the content of the descriptor. Accordingly, the complexity of data access can be reduced and the efficiency of data access improved.

In order to make other features and aspects of the present disclosure clearer, a detailed description of exemplary embodiments with reference to the drawings is provided below.

BRIEF DESCRIPTION OF THE DRAWINGS

The accompanying drawings contained in and forming part of the specification together with the specification show exemplary embodiments, features and aspects of the present disclosure and are used to explain the principles of the disclosure.

FIG. 1a shows a block diagram of a data processing apparatus according to an embodiment of the present disclosure.

FIG. 1b1 shows a block diagram of a data processing apparatus according to an embodiment of the present disclosure.
}

FIG. 1b2 shows a flowchart of a data processing method according to an embodiment of the present disclosure.

FIG. 1d1 shows a schematic diagram of a processing system of a data synchronization method according to an embodiment of the present disclosure.

FIG. 1d2 shows a flowchart of a data synchronization method according to an embodiment of the present disclosure.

FIG. 2 shows a schematic diagram of a data storage space according to an embodiment of the present disclosure.

FIG. 3a shows a block diagram of a data processing apparatus according to an embodiment of the present disclosure.

FIG. 3b1 shows a flowchart of a data synchronization method according to an embodiment of the present disclosure.

FIG. 3b2 shows a flowchart of a data synchronization method according to an embodiment of the present disclosure.

FIG. 3b3 shows a block diagram of a data synchronization apparatus according to an embodiment of the present disclosure.

FIG. 3b4 shows a block diagram of a data synchronization apparatus according to an embodiment of the present disclosure.

FIG. 3b5 shows a block diagram of a data synchronization apparatus according to an embodiment of the present disclosure.

FIG. 3d shows a flowchart of a data synchronization method according to an embodiment of the present disclosure.

FIG. 3c2 shows a block diagram of a data synchronization apparatus according to an embodiment of the present disclosure.

FIG. 3c3 shows a block diagram of a data synchronization apparatus according to an embodiment of the present disclosure.

FIG. 3d1 shows a flowchart of a data synchronization method according to an embodiment of the present disclosure.

FIG. 3d2 shows a block diagram of a data synchronization apparatus according to an embodiment of the present disclosure.

FIG. 3d3 shows a block diagram of a data synchronization apparatus according to an embodiment of the present disclosure.

FIG. 3e1 shows a flowchart of a data synchronization method according to an embodiment of the present disclosure.

FIG. 3e2 shows a block diagram of a data synchronization apparatus according to an embodiment of the present disclosure.

FIG. 3e3 shows a block diagram of a data synchronization apparatus according to an embodiment of the present disclosure.

FIG. 3f1 shows a flowchart of a data synchronization method according to an embodiment of the present disclosure.

FIG. 3f2 shows a block diagram of a data synchronization apparatus according to an embodiment of the present disclosure.

FIG. 3f3 shows a block diagram of a data synchronization apparatus according to an embodiment of the present disclosure.

FIG. 4 shows a block diagram of a board card according to an embodiment of the present disclosure.

DETAILED DESCRIPTIONS

Figure 1C:
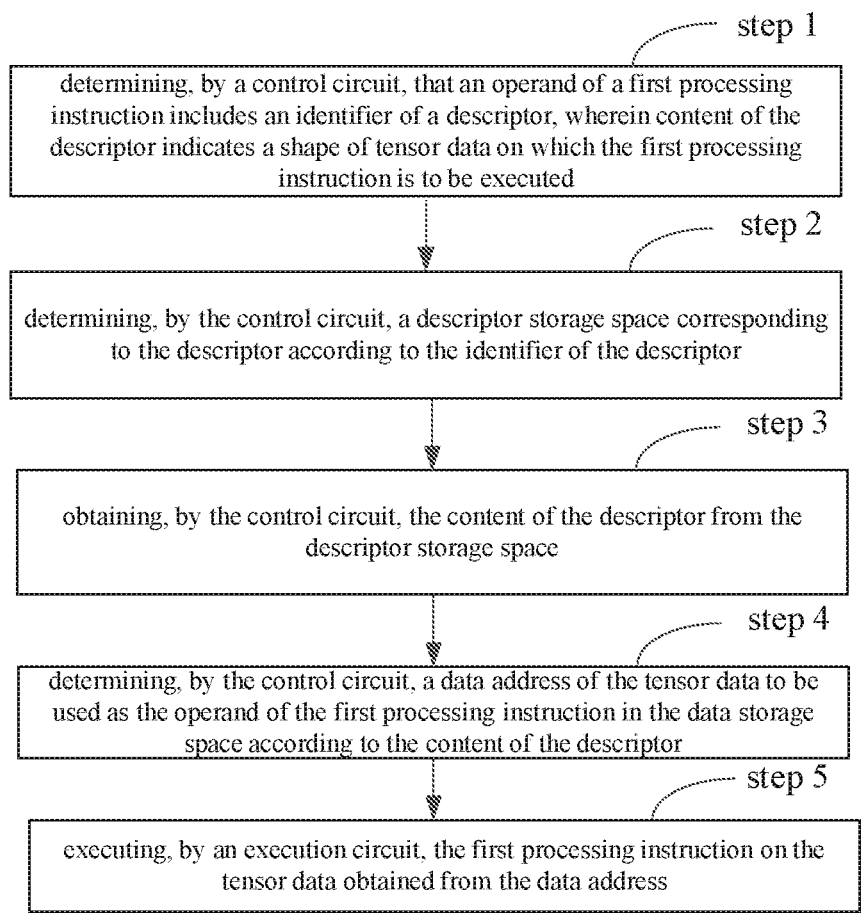
FIG. 1c shows a flowchart of a data processing method according to an embodiment of the present disclosure.
Figure 1C:
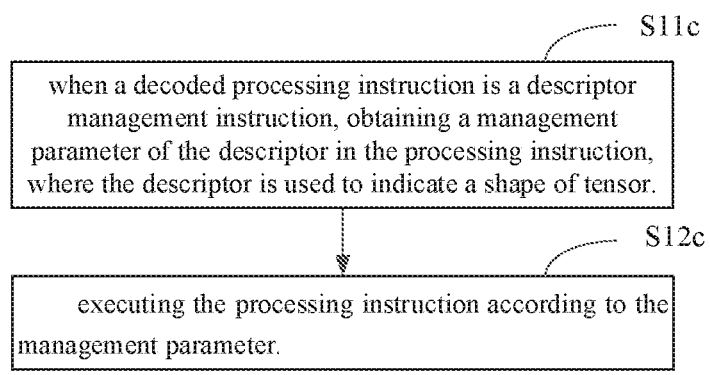

Various exemplary embodiments, features, and aspects of the present disclosure will be described in detail below with reference to the drawings. The same labels in the drawings represent the same or similar elements. Although various aspects of the embodiments are shown in the drawings, the drawings are not necessarily drawn to scale unless specifically noted.

The "exemplary" as used herein means "serving as an example, embodiment, or illustration." Any embodiment described herein as "exemplary" is not necessarily to be interpreted as superior to or better than other embodiments.

In addition, various specific details are provided for better illustration and description of the present disclosure. Those skilled in the art should understand that the present disclosure can be implemented without certain specific details. In some embodiments, methods, means, components, and circuits that are well known to those skilled in the art have not been described in detail in order to highlight the main idea of the present disclosure.

One aspect of the present disclosure provides a data processing apparatus. FIG. 1a shows a block diagram of a data processing apparatus according to an embodiment of the present disclosure. As shown in FIG. 1a, the data processing apparatus includes a control circuit 11a and an execution circuit 12a, where the control circuit 11a includes a tensor control module 111a, and the control circuit 11a may be configured to:

when an operand of a decoded first processing instruction includes an identifier of a descriptor, determine a descriptor storage space corresponding to the descriptor by the tensor control module according to the identifier of the descriptor, wherein the descriptor indicates a shape of a tensor data;

obtain content of the descriptor from the descriptor storage space; and send the content of the descriptor and the first processing instruction to the execution circuit, for the execution circuit to execute the first processing instruction according to the content of the descriptor.

According to the data processing apparatus provided in the present disclosure, by introducing the descriptor indicating the shape of the tensor and setting the tensor control module in the control circuit, the corresponding descriptor storage space may be determined by the tensor control module when the operand of the decoded processing instruction includes the identifier of the descriptor, the content of the descriptor may be obtained from the descriptor storage space, and the content of the descriptor and the processing instruction may be sent to the execution circuit, so that the execution circuit executes the instruction according to the content of the descriptor, which can reduce the complexity of data access and improve the efficiency of data access.

For example, the data processing apparatus may be a processor, where the processor may include a general-purpose processor (such as a CPU (central processing unit), a GPU (graphics processor)) and a dedicated processor (such as an AI processor, a scientific computing processor, or a digital signal processor, etc.). This disclosure does not limit the type of the processor.

In some embodiments, the data processing apparatus includes the control circuit 11a and the execution circuit 12a, where the control circuit 11a is configured to control devices, for example, the control circuit 11a may read an instruction of a memory or an externally input instruction, decode the instruction, and send a micro-operation control signal to corresponding components. The execution circuit 12a is configured to execute specific instructions, where the execution circuit 12a may be, for example, an ALU (arithmetic and logic unit), an MAU (memory access unit), an NFU (neural functional unit), etc. The present disclosure does not limit the specific hardware type of the execution circuit 12a.

In some embodiments, data processed by the data processing apparatus may include N-dimensional tensor data (N is an integer greater than or equal to 0, for example, N=1, 2, or 3). Conventionally, a processing instruction usually includes one or more operands and each operand includes the data address of data on which the processing instruction is to be executed. The data can be tensor data or scalar data. However, the data address only indicates the storage area in a memory of a data processing apparatus where the tensor data is stored. It neither indicates the shape of the tensor data, nor identifies the related information such as the relationship between this tensor data and other tensor data and the relationship between this data dimension and other data dimensions. As a result, the processor is inefficient in accessing tensor data.

When tensor data is stored in a memory of a data processing apparatus, the shape of the tensor data cannot be determined according to a data address (or storage area) of the tensor, and then related information such as the relationship between tensor data or between data dimensions cannot be determined. As a result, the processor is inefficient in accessing tensor data.

In view of this, a descriptor (tensor descriptor) is introduced to indicate the shape of the tensor (N-dimensional tensor data), where the value of N can be determined according to a count of dimensions (orders) of the tensor data, and can also be set according to the usage of the tensor data. For example, when the value of N is 3, the tensor data is 3-dimensional tensor data, and the descriptor can be used to indicate the shape (such as offset, size, etc.) of the 3-dimensional tensor data in three dimensions. It should be understood that those skilled in the art can set the value of N according to actual needs, which is not limited in the present disclosure.

In some embodiments, the descriptor may include an identifier and content. The identifier of the descriptor may be used to distinguish descriptors. For example, the identifier may be a serial number. The content of the descriptor may include at least one shape parameter (such as a size of each dimension of the tensor, etc.) representing the shape of the tensor data, and may also include at least one address parameter (such as a base address of a datum point) representing an address of the tensor data. The present disclosure does not limit the specific parameters included in the content of the descriptor.

By using the descriptor to indicate tensor data, information of the tensor data, such as the shape, position, relationship between tensor data, and the relationship between data dimensions, may be represented accordingly, thus improving the efficiency of accessing tensor data.

In some embodiments, a tensor control module 111a may be arranged in the control circuit 11a to implement operations associated with the descriptor, where the operations may include registration, modification, and release of the descriptor, reading and writing of the content of the descriptor, etc. The tensor control module 111a may be, for example, a TIU (Tensor interface Unit). The present disclosure does not limit the specific hardware type of the tensor control module. In this way, the operations associated with the descriptor can be implemented by special hardware, which further improves the access efficiency of tensor data.

In some embodiments, when the data processing apparatus receives a processing instruction, the data processing apparatus decodes the processing instruction through the control circuit 11a. The control circuit 11a is further configured to decode the received first processing instruction to obtain a decoded first processing instruction. The decoded first processing instruction includes an operation code and one or more operands, where the operation code is used to indicate a processing type corresponding to the first processing instruction.

In this case, after the first processing instruction is decoded by the control circuit 11a, a decoded first processing instruction (microinstruction) may be obtained. The first processing instruction may include a data access instruction, an operation instruction, a descriptor management instruction, a synchronization instruction, and the like. The present disclosure does not limit the specific type of the first processing instruction and the specific manner of decoding.

The decoded first processing instruction includes an operation code and one or more operands, where the operation code is used to indicate a processing type corresponding to the first processing instruction, and the operand is used to indicate data to be processed. For example, the instruction can be represented as: Add; A; B, where Add is an operation code, A and B are operands, and the instruction is used to add A and B. The present disclosure does not limit a count of operands involved in the operation and representation of the decoded instruction.

In some embodiments, if the operand of the decoded first processing instruction includes the identifier of the descriptor, a storage space in which the descriptor is stored can be determined according to the identifier of the descriptor; and content (including information indicating the shape, the address, etc.) of the descriptor can be obtained from the descriptor storage space; and then the control circuit 11a may send the content of the descriptor and the first processing instruction to the execution circuit, so that the execution circuit executes the first processing instruction according to the content of the descriptor.

In some embodiments, the execution circuit is configured to:
 determine a data address of the data corresponding to the operand of the first processing instruction in the data storage space according to the content of the received descriptor and the first processing instruction; and
 execute data processing corresponding to the first processing instruction according to the data address.

In other words, when the content of the descriptor and the first processing instruction are received by the execution circuit 12a, the execution circuit 12a may compute the data address at which the data of each operand is stored in the data storage space according to the content of the descriptor. The execution circuit 12a then obtains the data from the data addresses and perform a computation on the operand data according to the first processing instruction.

For example, for the instruction Add; A; B, if operands A and B include identifiers TR1 and TR2 of the descriptor, respectively, the control circuit may determine the descriptor storage spaces corresponding to TR1 and TR2 respectively, and the control circuit may read the content (such as a shape parameter and an address parameter) of the descriptor storage spaces and send the content to the execution circuit. After receiving the content of the descriptor, the execution circuit may compute data addresses of data A and B. For example, a data address 1 of A in a memory is ADDR64-ADDR127, and a data address 2 of B in the memory is ADDR1023-ADDR1087. Then, the execution circuit can read data A and B from the address 1 and the address 2 respectively, execute an addition (Add) operation on A and B, and obtain an operation result (A+B).

By adopting the above-mentioned method provided by the present disclosure, the content of the descriptor can be obtained from the descriptor storage space, and then the data address can be obtained. In this way, it is not necessary to input the address through an instruction during each data access, thus improving the data access efficiency of the processor.

In some embodiments, the identifier and content of the descriptor can be stored in the descriptor storage space, where the descriptor storage space can be a storage space in an internal memory (such as a register, an on-chip SRAM, or other medium cache, etc.) of the control circuit. Similarly, the data storage space of the tensor data indicated by the descriptor may also be a storage space in the internal memory (such as an on-chip cache) of the control circuit or a storage space in an external memory (an off-chip memory) connected to the control circuit. The data address of the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the data storage space identified by the descriptor may be a fixed address. For example, a separate data storage space may be allocated for tensor data, where a start address of each piece of tensor data in the data storage space corresponds to one identifier of the descriptor. In this case, the execution circuit can determine a data address of data corresponding to the operand according to the content of the descriptor, and then execute the first processing instruction.

In some embodiments, when the data address of the data storage space corresponding to the identifier of the descriptor is a variable address, the descriptor may be also used to indicate an address of N-dimensional tensor data, where the content of the descriptor may further include at least one address parameter representing the address of the tensor data. For example, if the tensor data is 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may vary from different datum points. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of the tensor data includes at least one of the followings: a size of the tensor data in at least one of the N dimensions, a size of the storage area in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area to which the tensor data is mapped in a 3-dimensional space.

It should be understood that those skilled in the art may select a shape parameter representing tensor data according to actual conditions, which is not limited in the present disclosure.

Figure 2:
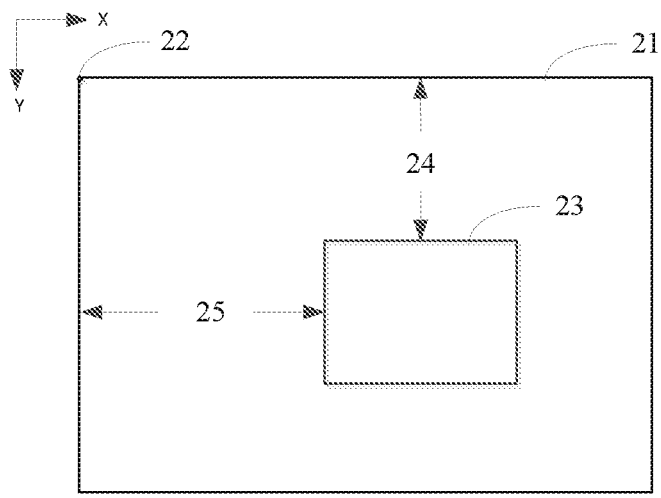

FIG. 2 shows a schematic diagram of a data storage space of a data processing apparatus according to an embodiment of the present disclosure. As shown in FIG. 2, a data storage space 21 stores a piece of 2-dimensional data in a row-first manner, where the data storage space 21 can be represented by (x, y) (where the X axis extends horizontally to the right, and the Y axis extends vertically down), a size in the X axis direction (a size of each row) is ori_x (which is not shown in the figure), a size in the Y axis direction (a total count of rows) is ori_y (which is not shown in the figure), and a start address PA_start (a base address) of the data storage space 21 is a physical address of a first data block 22. A data block 23 is part of the data in the data storage space 21, where an offset 25 of the data block 23 in the X axis direction is represented as offset_x, an offset 24 of the data block 23 in the Y axis direction is represented as offset_y, the size in the X axis direction is denoted by size_x, and the size in the Y axis direction is denoted by size_y.

In some embodiments, when the descriptor is used to define the data block 23, the datum point of the descriptor may be a first data block of the data storage space 21, the base address of the descriptor is the start address PA_start of the data storage space 21, and then the content of the descriptor of the data block 23 may be determined according to the size ori_x of the data storage space 21 in the X axis, the size ori_y of the data storage space 21 in the Y axis, the offset offset_y of the data block 23 in the Y axis direction, the offset offset_x of the data block 23 in the X axis direction, the size size_x of the data block 23 in the X axis direction, and the size size_y of the data block 23 in the Y axis direction.

In some embodiments, the content of the descriptor may be structured as shown by the following formula:

$$\begin{cases} X \text{ direction: ori\_x, offset\_x, size\_x} \\ Y \text{ direction: ori\_y, offset\_y, size\_y} \\ \quad\quad\quad PA\_start \end{cases}$$

It should be understood that although the descriptor describes a 2-dimensional space in the above-mentioned example, those skilled in the art can set the dimensions represented by the content of the descriptor according to actual situations, which is not limited in the present disclosure.

In some embodiments, the content of the descriptor of the tensor data may be determined according to the base address of the datum point of the descriptor in the data storage space and the position of at least two vertices at diagonal positions in N dimensions relative to the datum point.

For example, the content of the descriptor of the data block 23 in FIG. 2 can be determined according to the base address PA_base of the datum point of the descriptor in the data storage space and the position of two vertices at diagonal positions relative to the datum point. First, the datum point of the descriptor and the base address PA_base in the data storage space are determined. For example, a piece of data (such as a piece of data at position (2, 2)) in the data storage space 21 is selected as a datum point, and a physical address of the selected data in the data storage space is used as the base address PA_base. Then, the positions of at least two vertices at diagonal positions of the data block 23 relative to the datum point are determined. For example, the positions of vertices at diagonal positions from the top left to the bottom right relative to the datum point are used, where the relative position of the top left vertex is (x_min, y_min), and the relative position of the bottom right vertex is (x_max, y_max). And then the content of the descriptor of the data block 23 can be determined according to the base address PA_base, the relative position (x_min, y_min) of the top left vertex, and the relative position (x_max, y_max) of the bottom right vertex.

In some embodiments, the content of the descriptor can be structured as shown by the following formula:

$$\begin{cases} X \text{ direction: x\_min, x\_max} \\ Y \text{ direction: y\_min, y\_max} \\ \quad\quad\quad PA\_base \end{cases}$$

It should be understood that although the top left vertex and the bottom right vertex are used to determine the content of the descriptor in the above-mentioned example, those skilled in the art may set at least two specific vertices according to actual needs, which is not limited in the present disclosure.

In some embodiments, the content of the descriptor of the tensor data can be determined according to the base address of the datum point of the descriptor in the data storage space and a mapping relationship between the data description position of the tensor data indicated by the descriptor and the data address of the tensor data indicated by the descriptor. The mapping relationship between the data description position and the data address can be set according to actual needs. For example, when the tensor data indicated by the descriptor is 3-dimensional spatial data, the function f (x, y, z) can be used to define the mapping relationship between the data description position and the data address.

In some embodiments, the content of the descriptor can also be structured as shown by the following formula:

$$\begin{cases} f(x, y, z) \\ PA\_base \end{cases}$$

It should be understood that those skilled in the art can set the mapping relationship between the data description position and the data address according to actual situations, which is not limited in the present disclosure.

When the content of the descriptor is structured according to the formula $$\begin{aligned} &X \text{ direction: ori\_x, offset\_x, size\_x} \\ &Y \text{ direction: ori\_y, offset\_y, size\_y} \quad , \\ &\quad\quad\quad PA\_start \end{aligned}$$

for any datum point in the tensor data, the data description position is set to (x_q, y_q), and then the data address PA2$_{(x,y)}$ of the data in the data storage space can be determined using the following formula:

$$PA2_{(x,y)}=PA\_start+(offset\_y+y_q-1)*ori\_x+(offset\_x+x_q) \quad (4)$$

By adopting the above-mentioned method provided by the present disclosure, the execution circuit may compute the data address of the tensor data indicated by the descriptor in the data storage space according to the content of the descriptor, and then execute processing corresponding to the processing instruction according to the address.

In some embodiments, registration, modification, and release operations of the descriptor can be performed through management instructions of the descriptor, and corresponding operation codes are set for the management instructions. For example, a descriptor can be registered (created) through a descriptor registration instruction (TRCreat); various parameters (shape, address, etc.) of the descriptor can be modified through the descriptor modification instruction; and the descriptor can be released (deleted) through the descriptor release instruction (TRRelease). The present disclosure does not limit the types of the management instructions of the descriptor and the operation codes.

In some embodiments, the control circuit is further configured to:
when the first processing instruction is a descriptor registration instruction, obtain a registration parameter of the descriptor in the first processing instruction, where the registration parameter includes at least one of the identifier of the descriptor, the shape of the tensor, and the content of the tensor data indicated by the descriptor;
determine a first storage area for the content of the descriptor in the descriptor storage space, and a second storage area for the tensor indicated by the content of the descriptor in the data storage space through the tensor control module;
determine content of the descriptor according to the registration parameter of the descriptor and the second storage area to establish a correspondence between the descriptor and the second storage area; and
store the content of the descriptor into the first storage area.

For example, the descriptor registration instruction may be used to register a descriptor, and the instruction may include a registration parameter of the descriptor. The registration parameter may include at least one of the identifier (ID) of the descriptor, the shape of the tensor, and the tensor data indicated by the descriptor. For example, the registration parameter may include an identifier TR0 and the shape of the tensor (a count of dimensions, a size of each dimension, an offset, a start data address, etc.). The present disclosure does not limit the specific content of the registration parameter.

In some embodiments, when the instruction is determined to be a descriptor registration instruction according to an operation code of the decoded first processing instruction, the corresponding descriptor may be created by a tensor control module in a control circuit according to the registration parameter in the first processing instruction.

In some embodiments, the first storage area of the content of the descriptor in the descriptor storage space and the second storage area of the tensor data indicated by the descriptor in the data storage space may be determined first.

For example, if at least one of the storage areas has been preset, the first storage area and/or the second storage area may be directly determined. For example, it is preset that the content of the descriptor and the content of the tensor data are stored in a same storage space, and the storage address of the content of the descriptor corresponding to the identifier TR0 of the descriptor is ADDR32-ADDR63, and the storage address of the content of the tensor data is ADDR64-ADDR1023, then the two addresses can be directly determined as the first storage area and the second storage area.

In some embodiments, if there is no preset storage area, by the tensor control module, the first storage area may be allocated in the descriptor storage space for the content of the descriptor, and the second storage area may be allocated in the data storage space for the content of the tensor data, which is not limited in the present disclosure.

In some embodiments, according to the shape of the tensor in the registration parameter and the data address of the second storage area, the correspondence between the shape of the tensor and the address can be established to determine the content of the descriptor, so that the corresponding data address can be determined according to the content of the descriptor during data processing. The second storage area can be indicated by the content of the descriptor, and the content of the descriptor can be stored in the first storage area to complete the registration process of the descriptor.

For example, for the tensor data 23 shown in FIG. 2, the registration parameter may include the start address PA_start (base address) of the data storage space 21, an offset 25 (offset_x) in the X-axis direction, and an offset 24 (offset v) in the Y-axis direction, the size in the X-axis direction (size_x), and the size in the Y-axis direction (as size_y). Based on the parameters, the content of the descriptor can be determined according to the formula $X$ direction: ori_x, offset_x, size_x $Y$ direction: ori_y, offset_y, size_y PA_start and stored in the first storage area, thereby completing the registration process of the descriptor.

By adopting the above-mentioned method provided by the present disclosure, the descriptor can be automatically created according to the descriptor registration instruction, and the correspondence between the tensor data indicated by the descriptor and the data address can be implemented, so that the data address can be obtained through the content of the descriptor during data processing, and the data access efficiency of the processor can be improved.

In some embodiments, the control circuit is further configured to:
when the first processing instruction is a descriptor release instruction, obtain the identifier of the descriptor in the first processing instruction; and
according to the identifier of the descriptor, through the tensor control module, release a first storage area storing the content of descriptor in the descriptor storage space and a second storage area storing the tensor data in the data storage space.

For example, the descriptor release instruction may be used to release (delete) the descriptor in the descriptor storage space to free up the space occupied by the descriptor. The instruction may include at least the identifier of the descriptor.

In some embodiments, when the instruction is determined to be the descriptor release instruction according to the operation code of the decoded first processing instruction, the corresponding descriptor may be released through the tensor control module in the control circuit according to the identifier of the descriptor in the first processing instruction.

In some embodiments, according to the identifier of the descriptor, the storage area of the descriptor in the descriptor storage space and the storage area of the content of the tensor data in the data storage space indicated by the descriptor can be released by the tensor control module, so that each storage area occupied by the descriptor is released.

By adopting the above-mentioned method provided by the present disclosure, the space occupied by the descriptor can be released after the descriptor is used, thus the limited storage resources can be reused and the efficiency of resource utilization is improved.

In some embodiments, the control circuit is further configured to:

when the first processing instruction is a descriptor modification instruction, obtain a modification parameter of the descriptor in the first processing instruction, where the modification parameter includes at least one of the identifier of the descriptor, tensor shape to be modified, and content of the tensor data indicated by the descriptor;

determine content to be updated of the descriptor by the tensor control module according to the modified parameter of the descriptor; and update the content of the descriptor in the descriptor storage space by the tensor control module according to the content to be updated.

For example, the descriptor modification instruction can be used to modify various parameters of the descriptor, such as the identifier, the shape of the tensor, and the like. The descriptor modification instruction may include a modification parameter including at least one of the identifier of the descriptor, a modified shape of the tensor, and the modified tensor data. The present disclosure does not limit the specific content of the modification parameter.

In some embodiments, when the instruction is determined as the descriptor modification instruction according to the operation code of the decoded first processing instruction, the control circuit may determine the content to be updated of the descriptor according to the modification parameter in the first processing instruction through the tensor control module. For example, the dimension of a tensor may be changed from 3 dimensions to 2 dimensions, and the size of a tensor in one or more dimension directions may be also changed.

In some embodiments, after the content to be updated is determined, the tensor control module may update the content of the descriptor in the descriptor storage space in order to modify the content of the descriptor to indicate the shape of the modified tensor data. The present disclosure does not limit the scope of the updated content and the specific updating method.

By adopting the above-mentioned method provided by the present disclosure, when the tensor data indicated by the descriptor changes, the descriptor is directly modified to maintain the correspondence between the descriptor and the tensor data, which improves the efficiency of resource utilization.

In some embodiments, the control circuit further includes a dependency determining module, where the control circuit is further configured to:

determine whether there is a second processing instruction that has a dependency relationship with the first processing instruction according to the identifier of the descriptor, wherein the second processing instruction is prior to the first processing instruction in an instruction queue, wherein an operand of the second processing instruction has the same identifier of the descriptor; and block or cache the first processing instruction when there is the second processing instruction that has a dependency relationship with the first processing instruction.

For example, after the descriptor is set, a dependency determining module may be set in the control circuit to determine the dependency between instructions according to the descriptor. In some embodiments, a dependency between two instructions may indicate relative execution order of the instructions. For example, if instruction A dependents from instruction B, instruction B has to be executed prior to instruction A. Accordingly, if the operand of the decoded first processing instruction includes the identifier of the descriptor, whether there is an instruction, among pre-instructions of the first processing instruction that has to be executed before the first processing instruction may be determined by the dependency determining module in the control circuit. A pre-instruction is an instruction prior to the first processing instruction in an instruction queue.

In this case, for instructions in the instruction queue prior to the first processing instruction, i.e., pre-instructions, the dependency determining module may search for the second processing instruction with the identifier of the descriptor in the operand, and determine whether the second processing instruction has a dependency relationship with the first processing instruction.

For example, if the first processing instruction is an operation instruction for the descriptor TR0, and the second processing instruction is a writing instruction for the descriptor TR0, during the execution of the second processing instruction, the first processing instruction cannot be executed, and thus the first processing instruction depends on the second processing instruction. For another example, if the second processing instruction includes a synchronization instruction (sync) for the first processing instruction, the first processing has to be executed after the second processing instruction is executed completely, and thus the first processing instruction again depends on the second processing instruction.

In some embodiments, if there is a second processing instruction that has a dependency relationship with the first processing instruction, the first processing instruction may be blocked, in other words, the execution of the first processing instruction and other instructions after the first processing instruction can be suspended until the second processing instruction is executed completely, and then the first processing instruction and other instructions after the first processing instruction can be executed.

In some embodiments, if there is a second processing instruction that has a dependency relationship with the first processing instruction, the first processing instruction may be cached, in other words, the first processing instruction is stored in a preset caching space without affecting the execution of other instructions. After the execution of the second processing instruction is completed, the first processing instruction in the caching space is then executed. The present disclosure does not limit the particular method for processing the first processing instruction when there is a second processing instruction that has a dependency relationship with the first processing instruction.

By adopting the above-mentioned method provided by the present disclosure, a dependency between instructions caused by the instruction type and/or by the synchronization instruction is determined by the dependency determining module, thereby ensuring the execution order of the instructions, and the accuracy of data processing.

In some embodiments, the control circuit is further configured to:

determine a current state of the descriptor according to the identifier of the descriptor by the tensor control module, where the current state of the descriptor includes an operable state or an inoperable state; and block or cache the first processing instruction when the descriptor is in the inoperable state.

For example, a correspondence table for the state of the descriptor may be stored in a tensor control module to display the current state of the descriptor, where the state of the descriptor includes the operable state or the inoperable state.

In some embodiments, in the case where the pre-instructions of the first processing instruction are processing the descriptor (for example, writing or reading), the tensor control module may set the current state of the descriptor to the inoperable state. Under the inoperable state, the first processing instruction cannot be executed, and will be blocked or cached. Conversely, in the case where there is no pre-instruction that is currently processing the descriptor, the tensor control module may set the current state of the descriptor to the operable state. Under the operable state, the first processing instruction can be executed.

In some embodiments, when the content of the descriptor is stored in a TR (Tensor Register), the usage of TR may be stored in the correspondence table for the state of the descriptor of the tensor control module to determine whether the TR is occupied or released, so as to manage limited register resources.

By adopting the above-mentioned method provided by the present disclosure, the dependency between instructions can be determined according to the state of the descriptor, thereby ensuring the execution order of the instructions, and accuracy of data processing.

In some embodiments, the first processing instruction includes a data access instruction, and the operand includes source data and target data.

The control circuit is further configured to:

when at least one of the source data and the target data includes an identifier of a descriptor, determine, by the tensor control module, a storage space of the descriptor;

obtain the content of the descriptor from the descriptor storage space; and send the content of the descriptor and the first processing instruction to the execution circuit.

The execution circuit is configured to:

according to the content of the received descriptor and the first processing instruction, determine a first data address of the source data and/or a second data address of the target data, respectively; and read data from the first data address and write the data to the second data address.

For example, the operand of the data access instruction includes source data and target data, and the operand of the data access instruction is used to read data from the data address of the source data and write the data to the data address of the target data. When the first processing instruction is a data access instruction, the tensor data can be accessed through the descriptor. When at least one of the source data and the target data of the data access instruction includes the identifier of the descriptor, the descriptor storage space of the descriptor may be determined by tensor control module.

In some embodiments, if the source data includes an identifier of a first descriptor, and the target data includes an identifier of a second descriptor, the control circuit may determine a first descriptor storage space of the first descriptor and a second descriptor storage space of the second descriptor through the tensor control module, and the control circuit may read the content of the first descriptor and the content of the second descriptor from the first descriptor storage space and the second descriptor storage space, respectively, and the control circuit may send the content of the first descriptor and the content of the second descriptor to the execution circuit. After receiving the content of the first descriptor and the content of the second descriptor, the execution circuit may compute the first data address of the source data and the second data address of the target data, respectively. Finally, data is read from the first data address and written to the second data address to complete the entire access process.

For example, the source data may be off-chip data to be read, and the identifier of the first descriptor of the source data is 1. The target data is a piece of storage space on the chip, and the identifier of the second descriptor of the target data is 2. The control circuit $11a$ may respectively obtain the content D1 of the first descriptor and the content D2 of the second descriptor obtained from the descriptor storage space according to the identifier 1 of the first descriptor of the source data and the identifier 2 of the second descriptor of the target data. Then the control circuit $11a$ may send the content D1 of the first descriptor, the content D2 of the second descriptor, and the first processing instruction to the execution circuit $12a$. In some embodiments, the content D1 of the first descriptor and the content D2 of the second descriptor can be structured as follows:

$$D1:\begin{cases} X \text{ direction}: \text{ori\_x1, offset\_x1, size\_x1} \\ Y \text{ direction}: \text{ori\_y1, offset\_y1, size\_y1} \\ \qquad \text{PA\_start1} \end{cases}$$

$$D2:\begin{cases} X \text{ direction}: \text{ori\_x2, offset\_x2, size\_x2} \\ Y \text{ direction}: \text{ori\_y2, offset\_y2, size\_y2} \\ \qquad \text{PA\_start2} \end{cases}$$

According to the content D1 of the first descriptor and the content D2 of the second descriptor, the execution circuit $12a$ may obtain a start physical address PA3 of the source data and a start physical address PA4 of the target data, respectively, which can be structured as follows in some embodiments:

$$PA3=PA\_start1+(offset\_y1-1)*ori\_x1+offset\_x1$$

$$PA4=PA\_start2+(offset\_y2-1)*ori\_x2+offset\_x2$$

According to the start physical address PA3 of the source data and the start physical address PA4 of the target data, and the content D1 of the first descriptor and the content D2 of the second descriptor, the execution circuit $12a$ may determine the first data address and the second data address, respectively, read data from the first data address and write the data to the second data address (via an IO path), so as to load tensor data indicated by D1 into a storage space indicated by D2.

In some embodiments, if only the source data includes the identifier of the first descriptor, the control circuit may determine the first descriptor storage space of the first descriptor through the tensor control module. Then the control circuit may read the content of the first descriptor from the first descriptor storage space and send the content of the first descriptor to the execution circuit. After receiving the content of the first descriptor, the execution circuit may compute the first data address of the source data; according to the second data address of the target data in the operand of the instruction, the execution circuit may read data from the first data address and write the data to the second data address, thereby completing the entire access process.

In some embodiments, if only the target data includes the identifier of the second descriptor, the control circuit may determine the second descriptor storage space of the second descriptor through the tensor control module. Then the control circuit may read the content of the second descriptor from the second descriptor storage space and send the content of the second descriptor to the execution circuit. After receiving the content of the second descriptor, the execution circuit may compute the second data address of the target data; according to the first data address of the source data in the operand of the instruction, the execution circuit may read data from the first data address and write the data to the second data address, thereby completing the entire access process.

By adopting the above-mentioned method provided by the present disclosure, the descriptor can be used to complete the data access. In this way, there is no need to provide the data address by the instructions during each data access, thereby improving data access efficiency.

In some embodiments, the first processing instruction includes an operation instruction, where the control circuit is configured to:
  determine a data address of data corresponding to an operand of the first processing instruction in the data storage space according to the content of the received descriptor and the first processing instruction; and
  execute an operation corresponding to the first processing instruction according to the data address.

For example, when the first processing instruction is an operation instruction, the operation of tensor data can be implemented by the descriptor. When the operand of the operation instruction includes the identifier of the descriptor, the descriptor storage space of the descriptor can be determined by the tensor control module. Then the content of the descriptor is read from the descriptor storage space and sent to the execution circuit. After receiving the content of the descriptor, the execution circuit may determine the data address corresponding to the operand, and then read data from the data address for operations, so as to complete the entire operation process. By adopting the above-mentioned method, the descriptor can be used to read data during operations, and there is no need to provide the data address by instructions, thereby improving data operation efficiency.

According to the data processing method provided in the embodiments of the present disclosure, the descriptor indicating the shape of the tensor is introduced, so that the data address can be determined by the descriptor during the execution of the data processing instruction. The instruction generation method is simplified from the hardware side, thereby reducing the complexity of data access and improving the data access efficiency of the processor.

In some embodiments, the present disclosure provides an artificial intelligence chip including the above-mentioned data processing apparatus.

In some embodiments, the present disclosure provides a board card including the above-mentioned artificial intelligence chip.

Figure 4:
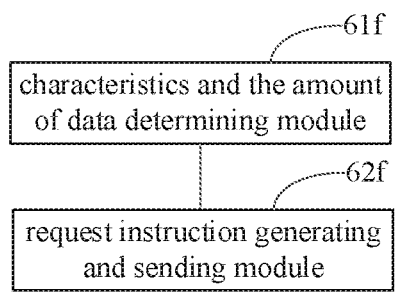
Figure 4:
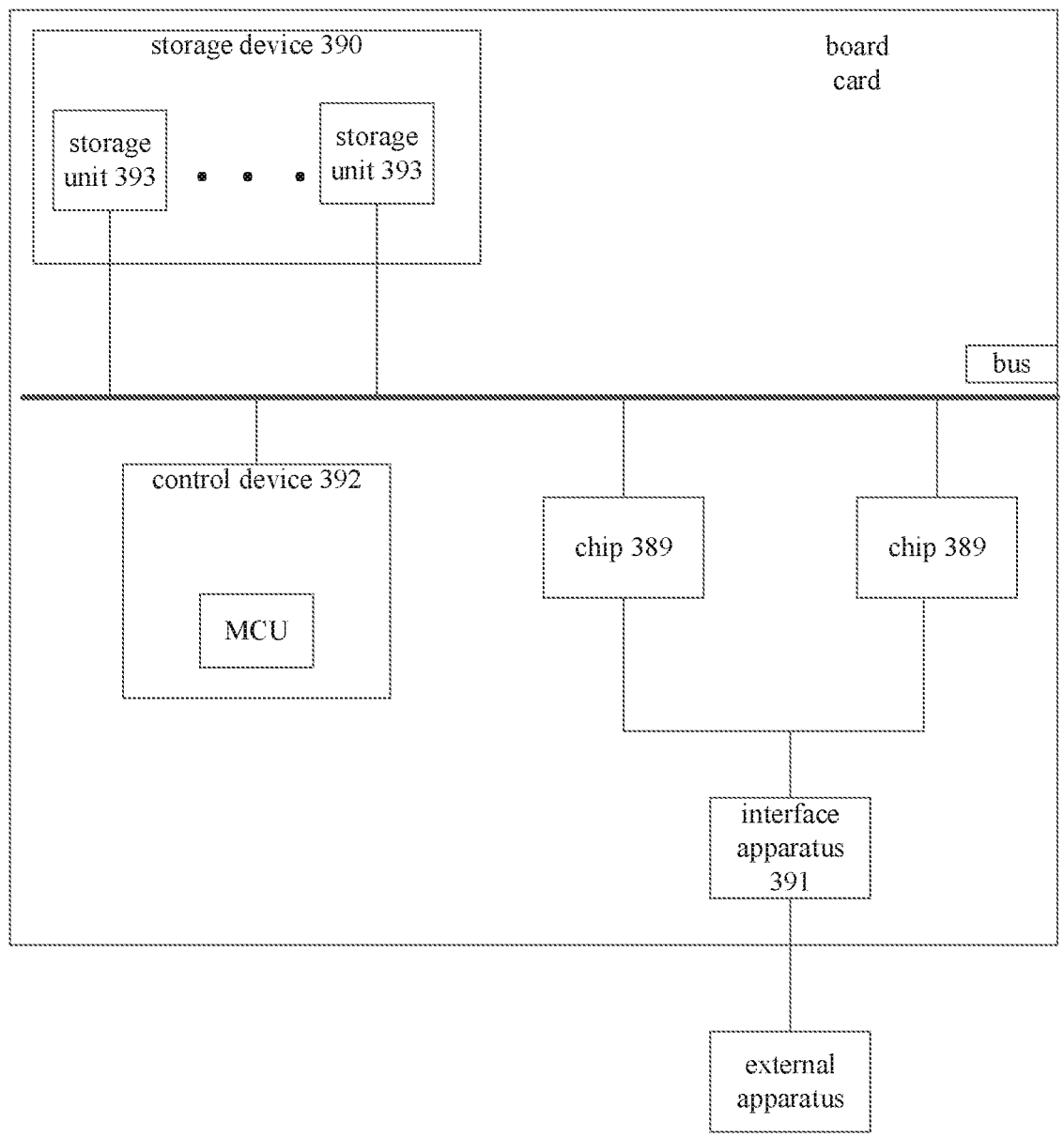

FIG. 4 shows a block diagram of a board card according to an embodiment of the present disclosure. As shown in FIG. 4, in addition to the above-mentioned artificial intelligence chip 389, the board card may further include other components, including but not limited to: a storage device 390, an interface apparatus 391, and a control device 392.

The storage device 390 is connected to the artificial intelligence chip through a bus, and is configured to store data. The storage device 390 may include a plurality of groups of storage units 393, where each group of the storage units is connected with the artificial intelligence chip through a bus. The descriptor storage space and data storage space described in this disclosure may be part of the storage device 390. It can be understood that each group of the storage units may be DDR SDRAM (Double Data Rate Synchronized Dynamic Random Access Memory).

DDR can double a speed of SDRAM without increasing a clock rate. DDR allows reading data on rising and falling edges of the clock pulse. DDR is twice as fast as standard SDRAM. In an embodiment, the storage device may include 4 groups of the storage units, where each group of the storage units may include a plurality of DDR4 particles (chips). In an embodiment, the inner part of the artificial intelligence chip may include four 72-bit DDR4 controllers, in which 64 bits of the four 72-bit DDR4 controllers are used for data transfer, and 8 bits of the four 72-bit DDR4 controllers are used for ECC check. It can be understood that when DDR4-3200 particles are used in each group of the storage units, the theoretical bandwidth of data transfer can reach 25600 MB/s.

In an embodiment, each group of the storage units may include a plurality of DDR SDRAMs arranged in parallel. DDR can transmit data twice in one clock cycle. A controller for controlling DDR is provided in the artificial intelligence chip, where the controller is used for controlling the data transfer and data storage of each storage unit.

The interface apparatus is electrically connected to the artificial intelligence chip, where the interface apparatus is configured to implement data transfer between the artificial intelligence chip and an external equipment (such as a server or a computer). For example, in an embodiment, the interface apparatus may be a standard PCIE interface, and data to be processed is transferred from the server to the chip through the standard PCIE interface to realize data transfer. Preferably, when a PCIE 3.0×16 interface is used for data transfer, the theoretical bandwidth can reach 16000 MB/s. In another embodiment, the interface apparatus may further include other interfaces. The present disclosure does not limit the specific types of the interfaces, as long as the interface units can implement data transfer. In addition, the computation result of the artificial intelligence chip is still transmitted back to an external equipment (such as a server) by the interface apparatus.

The control device is electrically connected to the artificial intelligence chip, where the control device is configured to monitor the state of the artificial intelligence chip. Specifically, the artificial intelligence chip may be electrically connected to the control device through an SPI interface, where the control device may include an MCU (Micro Controller Unit). The artificial intelligence chip may include a plurality of processing chips, a plurality of processing cores, or a plurality of processing circuits, and is capable of driving a plurality of loads. Therefore, the artificial intelligence chip can be in different working states such as multi-load state and light-load state. The operations of a plurality of processing chips, a plurality of processing cores and/or a plurality of processing circuits in the artificial intelligence chip can be regulated by the control device.

In some embodiments, the present disclosure provides an electronic device including the artificial intelligence chip. The electronic device includes a data processing apparatus, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable apparatus, a transportation means, a household electrical appliance, and/or a medical apparatus.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical apparatus may include a nuclear magnetic resonance spectrometer, a B-ultrasonic scanner, and/or an electrocardiograph.

A1. A data processing apparatus, comprising a control circuit and an execution circuit, wherein the control circuit includes a tensor control module, and the control circuit is configured to:
  when an operand of a decoded first processing instruction includes an identifier of a descriptor, determine a descriptor storage space corresponding to the descriptor by the tensor control module according to the identifier of the descriptor, wherein the descriptor indicates a shape of a tensor data;
  obtain content of the descriptor from the descriptor storage space; and
  send the content of the descriptor and the first processing instruction to the execution circuit, for the execution circuit to execute the first processing instruction according to the content of the descriptor.

A2. The data processing apparatus of A1, wherein the execution circuit is configured to:
  determine a data address of the tensor data corresponding to the operand of the first processing instruction in a data storage space according to the received content of the descriptor and the first processing instruction; and
  execute the first processing instruction according to the data address.

A3. The data processing apparatus of A2, wherein the execution circuit is further configured to:
  when the first processing instruction is a descriptor registration instruction, obtain a registration parameter of the descriptor in the first processing instruction, wherein the registration parameter includes at least one of the identifier of the descriptor, the shape of the tensor, and content of the tensor data indicated by the descriptor;
  determine, by the tensor control module, a first storage area in the descriptor storage space for storing the content of the descriptor, and a second storage area in the data storage space for storing the content of the tensor data indicated by the descriptor;
  determine the content of the descriptor according to the registration parameter of the descriptor and the second storage area, thus establishing a correspondence between the descriptor and the second storage area; and
  store the content of the descriptor into the first storage area.

A4. The data processing apparatus of any one of A1-A3, wherein the control circuit is further configured to:
  when the first processing instruction is a descriptor release instruction, obtain an identifier of the descriptor in the first processing instruction; and
  release, by the tensor control module, a first storage area storing the content of descriptor in the descriptor storage space and a second storage area storing the tensor data in the data storage space, according to the identifier of the descriptor.

A5. The data processing apparatus of any one of A1-A4, wherein the control circuit is further configured to:
  when the first processing instruction is a descriptor modification instruction, obtain a modification parameter of the descriptor in the first processing instruction, wherein the modification parameter includes at least one of the identifier of the descriptor, a tensor shape to be modified, and the content of the tensor data referenced by the descriptor;
  determine content to be updated of the descriptor by the tensor control module according to the modified parameter of the descriptor; and
  update the content of the descriptor in the descriptor storage space by the tensor control module according to the content to be updated.

A6. The data processing apparatus of any one of A1-A5, wherein the control circuit further includes a dependency determining module, wherein the control circuit is further configured to:
  determine whether there is a second processing instruction that has a dependency relationship with the first processing instruction according to the identifier of the descriptor, wherein the second processing instruction is prior to the first processing instruction in an instruction queue, wherein an operand of the second processing instruction has the same identifier of the descriptor; and
  block or cache the first processing instruction when there is a second processing instruction that has a dependency relationship with the first processing instruction.

A7. The data processing apparatus of any one of A1-A5, wherein the control circuit is further configured to:
  determine a current state of the descriptor according to the identifier of the descriptor by the tensor control module, wherein the current state of the descriptor includes an operable state or an inoperable state; and
  block or cache the first processing instruction when the descriptor is in the inoperable state.

A8. The data processing apparatus of A2, wherein the first processing instruction includes a data access instruction, and the operand includes source data and target data, wherein the control circuit is configured to:
  when at least one of the source data and the target data includes an identifier of a descriptor, by the tensor control module, determine a storage space of the descriptor;
  obtain content of the descriptor from the descriptor storage space; and
  send the content of the descriptor and the first processing instruction to the execution circuit;
  wherein the execution circuit is configured to:
  according to the content of the received descriptor and the first processing instruction, determine a first data address of the source data and/or a second data address of the target data, respectively; and
  read data from the first data address and write the data to the second data address.

A9. The data processing apparatus of A2, wherein the first processing instruction includes an operation instruction, wherein the execution circuit is configured to:
  determine a data address of data corresponding to the operand of the first processing instruction in the data storage space according to the received descriptor content and the first processing instruction; and execute an operation corresponding to the first processing instruction according to the data address.

A10. The data processing apparatus of any one of A1-A9, wherein the descriptor is used to indicate a shape of N-dimensional tensor data, wherein N is an integer greater than or equal to 0, and the content of the descriptor includes at least one shape parameter indicating the shape of the tensor data.

A11. The data processing apparatus of A10, wherein the descriptor is also used to indicate an address of N-dimensional tensor data, and the content of the descriptor further includes at least one address parameter indicating the address of the tensor data.

A12. The data processing apparatus of A11, wherein the address parameter of the tensor data includes a base address of a datum point of the descriptor in the data storage space of the tensor data, wherein the shape parameter of the tensor data includes at least one of following:

a size of the data storage space in at least one of N dimensions, a size of the storage area in at least one of N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor.

A13. The data processing apparatus of any one of A1-A12, wherein the control circuit is further configured to:

decode the received first processing instruction to obtain the decoded first processing instruction; wherein the decoded first processing instruction includes an operation code and one or more operands, wherein the operation code is used to indicate a processing type corresponding to the first processing instruction.

A14. The data processing apparatus of any one of A2-A13, wherein the descriptor storage space is a storage space in an internal memory of the control circuit, and the data storage space is a storage space in an internal memory of the control circuit or a storage space in an external memory connected to the control circuit.

A15. An artificial intelligence chip, comprising the data processing apparatus of any one of A1-A14.

A16. An electronic device, comprising the artificial intelligence chip of A15.

A17. A board card, comprising a storage device, an interface apparatus, a control device, and the artificial intelligence chip of A15, wherein the artificial intelligence chip is connected to the storage device, the control device, and the interface apparatus, respectively;

the storage device is configured to store data;

the interface apparatus is configured to implement data transfer between the artificial intelligence chip and an external equipment; and the control device is configured to monitor a state of the artificial intelligence chip.

A18. The board card of A17, wherein the storage device includes a plurality of groups of storage units, wherein each group of the storage units is connected with the artificial intelligence chip by a bus, and the storage units are DDR SDRAMs;

the chip includes a DDR controller configured to control data transfer and data storage of each storage unit; and the interface apparatus is a standard PCIE interface.

With the continuous development of AI (Artificial Intelligence) technology, the amount of data and data dimensions that need to be processed are increasing. In related arts, processors usually determine the data address by obtaining parameters of instructions, and then read and use data according to the data address. Therefore, relevant parameters (such as the relationship between data or between data dimensions, etc.) are used for data access, while generating instructions and sending the instructions to processors to complete the data access. The disclosed method reduces the processing efficiency of the processors.

One aspect of the present disclosure provides a data processing apparatus. FIG. 1$b$1 shows a block diagram of a data processing apparatus according to an embodiment of the present disclosure. As shown in FIG. 1$b$1, the data processing apparatus includes a control circuit 11$b$ and an execution circuit 12$b$, where the control circuit 11$b$ includes a tensor control module 111$b$, and the control circuit 11$b$ may be configured to:

determine that an operand of a first processing instruction includes an identifier of a descriptor, wherein content of the descriptor indicates a shape of tensor data on which the first processing instruction is to be executed;

determine a descriptor storage space corresponding to the descriptor according to the identifier of the descriptor;

obtain the content of the descriptor from the descriptor storage space; and determine a data address of the tensor data to be used as the operand of the first processing instruction in the data storage space according to the content of the descriptor.

The execution circuit is configured to execute the first processing instruction on the tensor data obtained from the data address.

According to the data processing apparatus provided in the present disclosure, by introducing the descriptor indicating the shape of the tensor and configuring the tensor control module in the control circuit, the content of the descriptor may be obtained by the tensor control module when the operand of the decoded processing instruction includes the identifier of the descriptor. Based on the identifier of the descriptor, the data address may be determined by the tensor control module, so that instructions can be executed on the date obtained from such data address. As a result, the complexity of data access can be reduced and the efficiency of data access can be improved.

For example, the data processing apparatus may be a processor, where the processor may include a general-purpose processor (such as a CPU (central processing unit), a GPU (graphics processor)) and a dedicated processor (such as an AI processor, a scientific computing processor, or a digital signal processor, etc.). This disclosure does not limit the type of the processor.

In some embodiments, the data processing apparatus includes the control circuit 11$b$ and the execution circuit 12$b$, where the control circuit 11$b$ is configured to control devices, for example, the control circuit 11$b$ may read an instruction from a memory or an externally input instruction, decode the instruction, and send a micro-operation control signal to corresponding components. The execution circuit 12$b$ is configured to execute specific instructions, where the execution circuit 12$b$ may be, for example, an ALU (arithmetic and logic unit), an MAU (memory access unit), an NFU (neural functional unit), etc. The present disclosure does not limit the specific hardware type of the execution circuit 12$b$.

In some embodiments, data processed by the data processing apparatus may include N-dimensional tensor data (N is an integer greater than or equal to 0, for example, N=1, 2, or 3). In the present disclosure, a descriptor (tensor descriptor) is introduced to indicate the shape of the tensor (N-dimensional tensor data), where the value of N can be determined according to a count of dimensions (orders) of the tensor data, and can also be set according to the usage of the tensor data. For example, when the value of N is 3, the tensor data is 3-dimensional tensor data, and the descriptor can be used to indicate the shape (such as offset, size, etc.) of the 3-dimensional tensor data in three dimensions. It should be understood that those skilled in the art can set the value of N according to actual needs, which is not limited in the present disclosure.

In some embodiments, the descriptor may include an identifier, content, and the like. The identifier of the descriptor may be used to distinguish the descriptor from other descriptors. For example, the identifier may be a serial number. The content of the descriptor may include at least one shape parameter (such as a size of each dimension of the tensor, etc.) representing the shape of the tensor data, and may also include at least one address parameter (such as a base address of a datum point) representing an address of the tensor data. The present disclosure does not limit the specific parameters included in the content of the descriptor.

By using the descriptor to describe the tensor data, the shape of the tensor data can be indicated, and related information such as the relationship among a plurality of pieces of tensor data can be determined accordingly, thus improving the efficiency of accessing tensor data.

In some embodiments, a tensor control module 111b may be provided in the control circuit 11b to implement operations associated with the descriptor, where the operations may include registration, modification, and release of the descriptor, reading and writing of the content of the descriptor, etc. The tensor control module 111b may be, for example, a TIU (Tensor interface Unit). The present disclosure does not limit the specific hardware type of the tensor control module. In this way, the operations associated with the descriptor can be implemented by special hardware, which further improves the access efficiency of tensor data.

In some embodiments, when the data processing apparatus receives the processing instruction, the data processing apparatus decodes the processing instruction through the control circuit 11b. The control circuit 11b is further configured to decode the received first processing instruction to obtain a decoded first processing instruction. The decoded first processing instruction includes an operation code and one or more operands, and the operation code is used to indicate a processing type corresponding to the first processing instruction.

In the present disclosure, after the first processing instruction is decoded by the control circuit 11b, a decoded first processing instruction (microinstruction) may be obtained. The first processing instruction may include a data access instruction, an operation instruction, a descriptor management instruction, a synchronization instruction, and the like. The present disclosure does not limit the specific type of the first processing instruction and the specific manner of decoding.

The decoded first processing instruction includes an operation code and one or more operands, where the operation code is used to indicate a processing type corresponding to the first processing instruction, and the operand is used to indicate data to be processed. For example, the instruction can be represented as: Add; A; B, where Add is an operation code, A and B are operands, and the instruction is used to add A and B. The present disclosure does not limit the number of operands involved in the operation and the format of the decoded instruction.

In some embodiments, the operand of the decoded first processing instruction includes the identifier of the descriptor. A storage space in which the descriptor is stored can be determined according to the identifier of the descriptor. The content (including information indicating the shape, the address, etc., of tensor data) of the descriptor can be obtained from the descriptor storage space. Then, according to the content of the descriptor, the data address of the data storage space corresponding to the operand may be determined by the tensor control module, and the first processing instruction may be executed by the tensor control module on the tensor data obtained according to the data address.

In other words, when the operand of the first processing instruction includes an identifier of the descriptor, the tensor control module may obtain the content of the descriptor from the descriptor storage space according to the identifier of the descriptor. Then, according to the content of the descriptor, the tensor control module may determine a data address of tensor data corresponding to the operand of the first processing instruction in the data storage space. The corresponding instruction can be executed on the tensor data obtained according to the data address.

By adopting the above-mentioned method provided by the present disclosure, the content of the descriptor can be obtained from the descriptor storage space, and then the data address can be obtained. In this way, it is not necessary to input the address through an instruction during each data access, thus improving the data access efficiency of the processor.

In some embodiments, the identifier and content of the descriptor can be stored in the descriptor storage space, where the descriptor storage space can be a storage space in an internal memory (such as a register, an on-chip SRAM, or other medium cache, etc.) of the control circuit. Similarly, the data storage space of the tensor data indicated by the descriptor may also be a storage space in the internal memory (such as an on-chip cache) of the control circuit or a storage space in an external memory (an off-chip memory) connected to the control circuit. The data address of the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the data storage space identified by the descriptor may be a fixed address. For example, a separate data storage space may be allocated for tensor data, where a start address of each piece of tensor data in the data storage space corresponds to one identifier of the descriptor. In this case, the control circuit can determine the data address of the data corresponding to the operand via the tensor control module according to the content of the descriptor, and then execute the first processing instruction.

In some embodiments, when the data address of the data storage space corresponding to the identifier of the descriptor is a variable address, the descriptor may be also used to indicate an address of N-dimensional tensor data, where the content of the descriptor may further include at least one address parameter representing the address of the tensor data. For example, if the tensor data is 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may vary from different datum points. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of the tensor data includes at least one of the followings: a size of the data storage space in at least one of the N dimensions, a size of the storage area of the tensor data in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area to which the tensor data is mapped in a 3-dimensional space.

It should be understood that those skilled in the art may select a shape parameter representing tensor data according to actual conditions, which is not limited in the present disclosure.

In some embodiments, registration, modification and release operations of the descriptor can be performed in response to management instructions of the descriptor, and corresponding operation codes are set for the management instructions. For example, a descriptor can be registered (created) through a descriptor registration instruction (TRCreat). As another example, various parameters (shape, address, etc.) of the descriptor can be modified through the descriptor modification instruction. As a further example, the descriptor can be released (deleted) through the descriptor release instruction (TRRelease). The present disclosure does not limit the types of the management instructions of the descriptor and the operation codes.

In some embodiments, the control circuit is further configured to:
when the first processing instruction is a descriptor registration instruction, obtain a registration parameter of the descriptor in the first processing instruction, wherein the registration parameter includes at least one of the identifier of the descriptor, the shape of the tensor data, and content of the tensor data referenced by the descriptor;
determine a first storage area in the descriptor storage space for storing the content of the descriptor, and a second storage area in the data storage space for storing the content of the tensor data indicated by the content of the descriptor;
determine the content of the descriptor indicate the second storage space, thus establishing a correspondence between the descriptor and the second storage area; and
store the content of the descriptor into the first storage area.

For example, the descriptor registration instruction may be used to register a descriptor, and the instruction may include a registration parameter of the descriptor. The registration parameter may include at least one of the identifier (ID) of the descriptor, the shape of the tensor, and the tensor data referenced by the descriptor. For example, the registration parameter may include an identifier TR0 and the shape of the tensor (a count of dimensions, a size of each dimension, an offset, a start data address, etc.). The present disclosure does not limit the specific content of the registration parameter.

In some embodiments, when the instruction is determined to be a descriptor registration instruction according to an operation code of the decoded first processing instruction, the corresponding descriptor may be created by the tensor control module in the control circuit according to the registration parameter in the first processing instruction.

In some embodiments, the first storage area in the descriptor storage space that stores the content of the descriptor and the second storage area in the data storage space that stores the tensor data indicated by the descriptor may be determined first.

In some embodiments, if at least one of the storage areas has been preset, the first storage area and/or the second storage area may be directly determined. For example, it is preset that the content of the descriptor and the content of the tensor data are stored in a same storage space, where the storage address of the content of the descriptor corresponding to the identifier TR0 of the descriptor is ADDR32-ADDR63, and the storage address of the content of the tensor data is ADDR64-ADDR1023. Accordingly, these two addresses can be directly determined as the first storage area and the second storage area.

In some embodiments, if there is no preset storage area, by the tensor control module, the first storage area may be allocated in the descriptor storage space for the content of the descriptor, and the second storage area may be allocated in the data storage space for the content of the tensor data, which is not limited in the present disclosure.

In some embodiments, according to the shape of the tensor in the registration parameter and the data address of the second storage area, the content of the descriptor can be determined to indicate the same. Therefore, during data processing, the corresponding data address can be determined according to the content of the descriptor. The content of the descriptor can be stored in the first storage area to complete the registration process of the descriptor.

For example, for the tensor data 23 shown in FIG. 2, the registration parameter may include the start address PA_start (base address) of the data storage space 21, an offset 25 (offset_x) in the X-axis direction, and an offset 24 (offset_y) in the Y-axis direction, the size in the X-axis direction (size_x), and the size in the Y-axis direction (as size_y). Based on the parameters, the content of the descriptor can be determined according to the formula $X$ direction: ori_x, offset_x, size_x $Y$ direction: ori_y, offset_y, size_y PA_start described above and stored in the first storage area, thereby completing the registration process of the descriptor.

By adopting the above-mentioned method provided by the present disclosure, the descriptor can be automatically created according to the descriptor registration instruction, and the correspondence between the descriptor and the data address of the tensor data can be implemented, so that the data address can be obtained through the content of the descriptor during data processing, and the data access efficiency of the processor can be improved.

In some embodiments, the control circuit is further configured to:
  when the first processing instruction is a descriptor release instruction, obtain the identifier of the descriptor in the first processing instruction; and
  release a first storage area storing the content of descriptor in the descriptor storage space and a second storage area storing the tensor data in the data storage space, according to the identifier of the descriptor.

For example, the descriptor release instruction may be used to release (delete) the descriptor in the descriptor storage space to free up the space occupied by the descriptor. The instruction may include at least the identifier of the descriptor.

In some embodiments, when the instruction is determined to be the descriptor release instruction according to the operation code of the decoded first processing instruction, the corresponding descriptor may be released by the tensor control module in the control circuit according to the identifier of the descriptor in the first processing instruction.

In some embodiments, according to the identifier of the descriptor, the tensor control module may release the storage area of the descriptor in the descriptor storage space and the storage area of the content of the tensor data in the data storage space indicated by the descriptor, so as to release each storage area occupied by the descriptor.

By adopting the above-mentioned method provided by the present disclosure, the space occupied by the descriptor can be released after the descriptor is used, the limited storage resources can be reused, thus the efficiency of resource utilization is improved.

In some embodiments, the control circuit is further configured to:
  when the first processing instruction is a descriptor modification instruction, obtain a modification parameter of the descriptor in the first processing instruction, wherein the modification parameter includes at least one of the identifier of the descriptor, a modified shape of the tensor, and content of the tensor data referenced by the descriptor;
  determine updated content of the descriptor according to the modification parameter of the descriptor; and
  update the content of the descriptor in the descriptor storage space or the content of the tensor data in the data storage space according to the updated content of the descriptor.

For example, the descriptor modification instruction can be used to modify various parameters of the descriptor, such as the identifier, the shape of the tensor, and the like. The descriptor modification instruction may include a modification parameter including at least one of the identifier of the descriptor, tensor shape to be modified, and the content of the tensor data indicated by the descriptor. The present disclosure does not limit the specific content of the modification parameter.

In some embodiments, when the instruction is determined to be a descriptor modification instruction according to the operation code of the decoded first processing instruction, the control circuit may determine the content of the descriptor to be updated according to the modification parameter in the first processing instruction by the tensor control module. For example, the dimension of a tensor may be changed from 3 dimensions to 2 dimensions, and the size of a tensor in one or more dimension directions may be also changed.

In some embodiments, after the content to be updated is determined, the tensor control module may update the content of the descriptor in the descriptor storage space and/or the content of tensor data in the data storage space in order to modify the tensor data and modify the content of the descriptor to indicate the shape of the modified tensor data. The present disclosure does not limit the scope of the content to be updated and the specific updating method.

By adopting the above-mentioned method provided by the present disclosure, when the tensor data indicated by the descriptor changes, the descriptor can be modified to indicate the changed tensor data, which improves the efficiency of resource utilization.

In some embodiments, the control circuit further includes a dependency determining module, wherein the control circuit is further configured to:
  determine whether there is a second processing instruction that has a dependency relationship with the first processing instruction according to the identifier of the descriptor, wherein the second processing instruction is prior to the first processing instruction in an instruction queue, wherein an operand of the second processing instruction has the same identifier of the descriptor; and
  block or cache the first processing instruction when there is the second processing instruction that has the dependency relationship with the first processing instruction.

For example, after the descriptor is set, a dependency determining module may be configured in the control circuit to determine the dependency between instructions according to the descriptor. In some embodiments, a dependency between two instructions may indicate relative execution order of the instructions. For example, if instruction A dependents from instruction B, instruction B has to be executed prior to instruction A. Accordingly, if the operand of the decoded first processing instruction includes the identifier of the descriptor, whether there is an instruction, among pre-instructions of the first processing instruction that has to be executed before the first processing instruction may be determined by the dependency determining module in the control circuit. A pre-instruction is an instruction prior to the first processing instruction in an instruction queue.

In this case, for instructions in the instruction queue prior to the first processing instruction, i.e., pre-instructions, the dependency determining module may search for the second processing instruction with the same identifier of the descriptor in the operand, and treat the second processing instruction as a processing instruction that has a dependency relationship with the first processing instruction. If the operand of the first processing instruction has identifiers of a plurality of descriptors, the dependency relationship corresponding to each descriptor may be respectively determined.

For example, if the first processing instruction is an operation instruction for the descriptor TR0, and the second processing instruction is a writing instruction for the descriptor TR0, the first processing instruction has a dependency relationship with the second processing instruction, and thus during the execution of the second processing instruction, the first processing instruction cannot be executed. For another example, if the second processing instruction includes a synchronization instruction (sync) with the first processing instruction, the first processing instruction also has a dependency relationship with the second processing instruction, and thus the first processing has to be executed after the second processing instruction is executed completely.

In some embodiments, if there is a second processing instruction that has a dependency relationship with the first processing instruction and has not been processed, the first processing instruction can be blocked, in other words, the execution of the first processing instruction and other instructions after the first processing instruction can be suspended until the second processing instruction is executed completely, and then the first processing instruction and other instructions after the first processing instruction can be executed.

In some embodiments, if there is a second processing instruction that has a dependency relationship with the first processing instruction and has not been processed, the first processing instruction can be cached, in other words, the first processing instruction is stored in a preset caching space without affecting the execution of other instructions. After the execution of the second processing instruction is completed, the first processing instruction in the caching space is then executed. The present disclosure does not limit the particular method of processing the first processing instruction in this case.

By adopting the above-mentioned method provided by the present disclosure, a dependency between instructions caused by the instruction type and/or by the synchronization instruction is determined by the dependency determining module, thereby ensuring the execution order of the instructions, and the accuracy of data processing.

In some embodiments, the control circuit is further configured to:
  determine a state of the descriptor according to the identifier of the descriptor, wherein the state of the descriptor includes an operable state or an inoperable state; and
  block or cache the first processing instruction when the descriptor is in the inoperable state.

For example, a correspondence table for the state of the descriptor may be stored in a tensor control module to display the current state of the descriptor, where the state of the descriptor includes the operable state or the inoperable state.

In some embodiments, in the case where the pre-instructions of the first processing instruction are processing (for example, writing or reading) the descriptor, the tensor control module may set the current state of the descriptor to the inoperable state. With the descriptor in the inoperable state, the first processing instruction cannot be executed but blocked or cached. Conversely, in the case where there is no pre-instruction that is currently processing the descriptor, the tensor control module may set the current state of the descriptor to the operable state. With the descriptor in the operable state, the first processing instruction can be executed.

In some embodiments, when the content of the descriptor is stored in a TR (Tensor Register), may be stored in the descriptor state look-up table can further store the usage state of TR As a result, the tensor control module may determine whether the TR is occupied or released, thus managing limited register resources.

By adopting the above-mentioned method provided by the present disclosure, the dependency between instructions can be determined according to the state of the descriptor, thereby ensuring the execution order of the instructions and accuracy of data processing.

In some embodiments, the first processing instruction includes a data access instruction, and the operand includes source data and target data.

The control circuit is further configured to:
  when at least one of the source data and the target data includes the identifier of the descriptor, determine the descriptor storage space;
  obtain the content of the descriptor from the descriptor storage space;
  determine a first data address of the source data or a second data address of the target data according to the content of the descriptor; and
  read the source data from the first data address and write the target data to the second data address.

For example, the operand of the data access instruction includes source data and target data, and the operand of the data access instruction is used to read data from the data address of the source data and write the data to the data address of the target data. When the first processing instruction is a data access instruction, the tensor data can be accessed through the descriptor. When at least one of the source data and the target data of the data access instruction includes the identifier of the descriptor, the descriptor storage space of the descriptor may be determined by the tensor control module.

In some embodiments, if the source data includes an identifier of a first descriptor, and the target data includes an identifier of a second descriptor, the control circuit may determine a first descriptor storage space of the first descriptor and a second descriptor storage space of the second descriptor through the tensor control module, and the control circuit may read the content of the first descriptor and the content of the second descriptor from the first descriptor storage space and the second descriptor storage space, respectively. And then, according to the content of the first descriptor and the content of the second descriptor, the first data address of the source data and the second data address of the target data are respectively determined by the tensor control module. Finally, data is read from the first data address and written to the second data address to complete the entire access process.

For example, the source data may be off-chip data to be read, and the identifier of the first descriptor of the source data is TR1. The target data is a piece of storage space on the chip, and the identifier of the second descriptor of the target data is TR2. The control circuit 11b may respectively obtain content D1 of the first descriptor and content D2 of the second descriptor obtained from the descriptor storage space according to the identifier 1 of the first descriptor of the source data and the identifier 2 of the second descriptor of the target data. In some embodiments, the content D1 of the first descriptor and the content D2 of the second descriptor can be structured as following formulas:

$$D1:\begin{cases} X \text{ direction: ori\_x1, offset\_x1, size\_x1} \\ Y \text{ direction: ori\_y1, offset\_y1, size\_y1} \\ \quad\quad\quad PA\_start1 \end{cases}$$

$$D2:\begin{cases} X \text{ direction: ori\_x2, offset\_x2, size\_x2} \\ Y \text{ direction: ori\_y2, offset\_y2, size\_y2} \\ \quad\quad\quad PA\_start2 \end{cases}$$

According to the content D1 of the first descriptor and the content D2 of the second descriptor, the control circuit 11b may obtain a start physical address PA3 of the source data and a start physical address PA4 of the target data via the tensor control module, which can be structured as follows in some embodiments:

$PA3=PA\_start1+(offset\_y-1)*ori\_x1+offset\_x1$ $PA4=PA\_start2+(offset\_y2-1)*ori\_x2+offset\_x2$ According to the start physical address PA3 of the source data and the start physical address PA4 of the target data, and the content D1 of the first descriptor and the content D2 of the second descriptor, the control circuit 11b may determine the first data address and the second data address through the tensor control module respectively, read data from the first data address and write the data to the second data address (via an IO path), so as to load tensor data indicated by D1 into a storage space indicated by D2.

In some embodiments, if only the source data includes the identifier of the first descriptor, the control circuit may determine the first descriptor storage space of the first descriptor through the tensor control module. Then the control circuit may read the content of the first descriptor from the first descriptor storage space. And then, the control circuit may compute the first data address of the source data using the tensor control module according to the content of the first descriptor. According to the second data address of the target data in the operand of the instruction, the control circuit may read data from the first data address and write the data to the second data address. The entire the entire access process is then finished.

In some embodiments, if only the target data includes the identifier of the second descriptor, the control circuit may determine the second descriptor storage space of the second descriptor using the tensor control module. Then the control circuit may read the content of the second descriptor from the second descriptor storage space. And then, the control circuit may compute the second data address of the target data using the tensor control module according to the content of the second descriptor. According to the first data address of the source data in the operand of the instruction, the control circuit may read data from the first data address and write the data to the second data address. The entire access process is then finished.

By adopting the above-mentioned method provided by the present disclosure, the descriptor can be used to complete the data access. In this way, there is no need to provide the data address by the instructions during each data access, thereby improving data access efficiency.

In some embodiments, the first processing instruction includes an operation instruction, and the control circuit 11 is configured to:
when the first processing instruction is an operation instruction, send the data address and the first processing instruction to the execution circuit, where the execution circuit is configured to:
execute an operation corresponding to the first processing instruction on the tensor data obtained from the data address.

For example, when the first processing instruction is an operation instruction, the operation of tensor data can be implemented via the descriptor. When the operand of the operation instruction includes the identifier of the descriptor, the control circuit may determine the descriptor storage space of the descriptor via the tensor control module, and read the content of the descriptor from the descriptor storage space. According to the content of the descriptor, the control circuit may compute the address of the data corresponding to the operand using the tensor control module, and then send the data address and the first processing instruction to the execution circuit. After receiving the data address, the execution circuit may read data from the data address to execute operations. The entire operation process then concludes.

For example, for the instruction Add; A; B, if operands A and B include identifiers TR3 and TR4 of the descriptors, respectively, the control circuit may determine the descriptor storage spaces corresponding to TR1 and TR2 using the tensor control module, and the control circuit may read the content (such as a shape parameter and an address parameter) of the descriptor storage spaces. According to the content of the descriptor, the control circuit may compute a data address of data A and a data address of data B using the tensor control module. For example, a data address 1 of A in a memory is ADDR64-ADDR127, and a data address 2 of B in the memory is ADDR1023-ADDR1087. And then, the control circuit may send the data address 1 and data address 2 and the Add instruction to the execution circuit. The execution circuit can read data from address 1 and address 2 respectively, execute an addition (Add) operation, and obtain an operation result (A+B).

By adopting the above-mentioned method, the descriptor can be used to read data during operations, and there is no need to provide the data address by instructions, thereby improving data operation efficiency.

According to the data processing method provided in the embodiments of the present disclosure, the descriptor indicating the shape of the tensor is introduced, so that the data address can be determined based on the descriptor during the execution of the data processing instruction. As a result, the instruction generation method is simplified from the hardware side, thereby reducing the complexity of data access and improving the data access efficiency of the processor.

In some embodiments, the present disclosure provides an artificial intelligence chip including the above-mentioned data processing apparatus.

FIG. 1b2 shows a flowchart of a data processing method according to an embodiment of the present disclosure. In some embodiments, the data processing method may be performed by data processing device as shown in FIG. 1. In step 1, control circuit 11b may determine that an operand of a first processing instruction includes an identifier of a descriptor. The first processing instruction may be executed on the operand, which may include, e.g., a tensor data. The content of the descriptor may indicate a shape of the tensor data on which the first processing instruction is to be executed. In step 2, control circuit 11b may determine a descriptor storage space corresponding to the descriptor according to the identifier of the descriptor. The descriptor storage space may store the content of the descriptor. In step 3, control circuit 11b may obtain the content of the descriptor from the descriptor storage space. In some embodiments, the content of the descriptor may indicate a data address of the tensor data to be used as the operand for executing the first processing instruction. In step 4, control circuit 11b may determine the data address of the tensor data in the data storage space according to the content of the descriptor. The data storage space may be in a same or different physical location in the memory as the descriptor storage space. The tensor data may be stored at the data address in the data storage space. In step 5, execution circuit 12b may execute the first processing instruction on the tensor data obtained from the data address. For example, the control circuit 11b may provide the data address and the first processing instruction to the execution circuit 12b, and according to the data address, the execution circuit 12b can obtain the tensor data stored at the data address and then perform the first processing instruction on the tensor data. Descriptions of embodiments above associated with the data processing device in connection with FIGS. 1-3 are also applicable to the data processor method in connection with FIG. 1b2, which will not be repeated here.

A1. A data processing apparatus, comprising a control circuit and an execution circuit, wherein the control circuit includes a tensor control module and is configured to:
  determine that an operand of a first processing instruction includes an identifier of a descriptor, wherein content of the descriptor indicates a shape of tensor data on which the first processing instruction is to be executed;
  determine a descriptor storage space corresponding to the descriptor according to the identifier of the descriptor;
  obtain the content of the descriptor from the descriptor storage space; and
  determine a data address of the tensor data to be used as the operand of the first processing instruction in the data storage space according to the content of the descriptor; and
an execution circuit configured to execute the first processing instruction on the tensor data obtained from the data address.

A2. The data processing apparatus of A1, wherein the control circuit is further configured to:
  when the first processing instruction is a descriptor registration instruction, obtain a registration parameter of the descriptor in the first processing instruction, wherein the registration parameter includes at least one of the identifier of the descriptor, the shape of the tensor data, and content of the tensor data referenced by the descriptor;
  determine a first storage area in the descriptor storage space for storing the content of the descriptor, and a second storage area in the data storage space for storing the content of the tensor data indicated by the content of the descriptor;
  determine the content of the descriptor indicate the second storage space, thus establishing a correspondence between the descriptor and the second storage area; and
  store the content of the descriptor into the first storage area.

A3. The data processing apparatus of A1 or A2, wherein the control circuit is further configured to:
  when the first processing instruction is a descriptor release instruction, obtain the identifier of the descriptor in the first processing instruction; and
  release a first storage area storing the content of descriptor in the descriptor storage space and a second storage area storing the tensor data in the data storage space, according to the identifier of the descriptor.

A4. The data processing apparatus of any one of A1-A3, wherein the control circuit is further configured to:
  when the first processing instruction is a descriptor modification instruction, obtain a modification parameter of the descriptor in the first processing instruction, wherein the modification parameter includes at least one of the identifier of the descriptor, a modified shape of the tensor, and content of the tensor data referenced by the descriptor;
  determine updated content of the descriptor according to the modification parameter of the descriptor; and
  update the content of the descriptor in the descriptor storage space or the content of the tensor data in the data storage space according to the updated content of the descriptor.

A5. The data processing apparatus of any one of A1-A4, wherein the control circuit further includes a dependency determining module, wherein the control circuit is further configured to:
  determine whether there is a second processing instruction that has a dependency relationship with the first processing instruction according to the identifier of the descriptor, wherein the second processing instruction is prior to the first processing instruction in an instruction queue, wherein an operand of the second processing instruction has the same identifier of the descriptor; and block or cache the first processing instruction when there is the second processing instruction that has the dependency relationship with the first processing instruction.

A6. The data processing apparatus of any one of A1-A5, wherein the control circuit is further configured to:
determine a state of the descriptor according to the identifier of the descriptor, wherein the state of the descriptor includes an operable state or an inoperable state; and
block or cache the first processing instruction when the descriptor is in the inoperable state.

A7. The data processing apparatus of any one of A1-A6, wherein the first processing instruction includes a data access instruction, and the operand includes source data and target data, wherein the control circuit is further configured to:
when at least one of the source data and the target data includes the identifier of the descriptor, determine the descriptor storage space;
obtain the content of the descriptor from the descriptor storage space;
determine a first data address of the source data or a second data address of the target data according to the content of the descriptor; and
read the source data from the first data address and write the target data to the second data address.

A8. The data processing apparatus of any one of A1-A7, the first processing instruction includes an operation instruction, wherein the control circuit is configured to:
when the first processing instruction is an operation instruction, send the data address and the first processing instruction to the execution circuit, wherein the execution circuit is configured to execute an operation corresponding to the first processing instruction according to the data address.

A9. The data processing apparatus of any one of A1-A8, wherein the descriptor is used to indicate a shape of N-dimensional tensor data, where N is an integer greater than or equal to 0, and the content of the descriptor includes at least one shape parameter indicating the shape of the tensor data.

A10. The data processing apparatus of A9, wherein the descriptor is also used to indicate an address of N-dimensional tensor data, and the content of the descriptor further includes at least one address parameter indicating the address of the tensor data.

A11. The data processing apparatus of A10, wherein the address parameter of the tensor data includes a base address of a datum point of the descriptor in the data storage space of the tensor data, wherein the shape parameter of the tensor data includes at least one of following:
a size of the data storage space in at least one of N dimensions, a size of the storage area in at least one of N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor.

A12. The data processing apparatus of any one of A1-A11, wherein the control circuit is further configured to:
decode the received first processing instruction to obtain the decoded first processing instruction; wherein
the decoded first processing instruction includes an operation code and one or more operands, where the operation code is used to indicate a processing type corresponding to the first processing instruction.

A13. The data processing apparatus of any one of A1-A12, wherein the descriptor storage space is a storage space in an internal memory of the control circuit, and the data storage space is a storage space in an internal memory of the control circuit or a storage space in an external memory connected to the control circuit.

A14. An artificial intelligence chip comprising the data processing apparatus of any one of A1-A13.

A15. An electronic device comprising the artificial intelligence chip of A14.

A16. A board card comprising a storage device, an interface apparatus, a control device, and the artificial intelligence chip of A14, wherein
the artificial intelligence chip is connected to the storage device, the control device, and the interface apparatus, respectively;
the storage device is configured to store data;
the interface apparatus is configured to implement data transfer between the artificial intelligence chip and an external equipment; and
the control device is configured to monitor a state of the artificial intelligence chip.

A17. The board card of A16, wherein
the storage device includes a plurality of groups of storage units, where each group of the storage units is connected with the artificial intelligence chip by a bus, and the storage units are DDR SDRAM;
the chip includes a DDR controller configured to control data transfer and data storage of each storage unit; and
the interface apparatus is a standard PCIE interface.

With the continuous development of artificial intelligence technology, the amount of data to be processed and data dimensions are increasing. In related arts, processors usually determine the data address by obtaining the parameters of the instructions, and then read and use data according to the data address, which reduces the processing efficiency of the processors.

One aspect of the present disclosure provides a data processing method. FIG. 1c shows a flowchart of a data processing method according to an embodiment of the present disclosure. The data processing method can be applied to a processor, where the processor may include a general-purpose processor (such as a CPU (central processing unit), a GPU (graphics processor)) and a dedicated processor (such as an AI processor, a scientific computing processor, or a digital signal processor, etc.). This disclosure does not limit the type of the processor to which the disclosed methods can be applied. As shown in FIG. 1c, the data processing method includes:
a step S11c: when a decoded processing instruction is a descriptor management instruction, obtaining a management parameter of the descriptor in the processing instruction, where the descriptor is used to indicate a shape of tensor.

The tensor may have various forms of data structure. In some embodiments, the tensor may have different dimensions, for example, a scalar can be viewed as a 0-dimensional tensor, a vector can be viewed as a one-dimensional tensor, and a matrix can be a tensor of two or more dimensions. The shape of a tensor indicates dimensions of the tensor, a size of each dimension of the tensor, and the like.

For example, the shape of a tensor:

$$\begin{bmatrix} 1 & 2 & 3 & 4 \\ 11 & 22 & 33 & 44 \end{bmatrix}$$

can be described by the descriptor as (2, 4). In other words, the tensor is represented as a 2-dimensional tensor by two parameters: the first parameter 2 corresponds to the size of a first dimension (column), and the second parameter 4 corresponds to the size of a second dimension (row). It should be noted that the present disclosure does not limit the manner in which the descriptor indicates the shape of the tensor. When tensor data is stored in a memory, the shape of the tensor data cannot be determined according to a data address (or storage area) of the tensor, and then related information such as the relationship between a plurality of pieces of tensor data cannot be determined, as a result, the processor is inefficient in accessing tensor data, and the data synchronization is also complicated. In this case, a descriptor can be introduced to indicate the shape of the tensor.

In some embodiments, the descriptor may include an identifier, content, and the like. The identifier of the descriptor may be used to distinguish descriptors. For example, the identifier may be a serial number. The content of the descriptor may be used to describe the shape of the tensor data, and the content of the descriptor may include at least one shape parameter (such as a size of each dimension of the tensor, etc.) representing the shape of the tensor data, and may also include at least one address parameter (such as a base address of a datum point) representing an address of the tensor data. The present disclosure does not limit the specific parameters included in the content of the descriptor.

In some embodiments, a descriptor management instruction may implement registration, modification, release, and other operations of the descriptor, and set corresponding operation codes for the management instructions. For example, a descriptor can be registered (created) through a descriptor registration instruction (TRCreat); various parameters (shape, address, etc.) of the descriptor can be modified through the descriptor modification instruction; and the descriptor can be released (deleted) through the descriptor release instruction (TRRelease). The present disclosure does not limit the type of the descriptor management instruction and the operation codes.

In some embodiments, the decoded processing instruction may include an operation code and one or more operands. The operation code is used to indicate the processing type corresponding to the processing instruction, and the operand is used to indicate the data to be processed. For the decoded processing instruction, the processing type of the processing instruction can be determined according to the operation code of the processing instruction. When the decoded processing instruction is a descriptor management instruction, a management parameter of the descriptor in the processing instruction can be obtained, where the management parameter may be used to indicate an operating parameter of the descriptor management instruction. For example, the management parameter of the descriptor registration instruction may include the identifier of the descriptor, the content of the tensor data indicated by the descriptor, etc. The present disclosure does not limit the specific content of the management parameter.

The data processing method further includes:
a step S12c: executing the processing instruction according to the management parameter.

In other words, the processing instruction may be executed according to the obtained management parameter. For example, when the processing instruction is a descriptor registration instruction, after the management parameter of the descriptor registration instruction is obtained, the descriptor registration instruction can be executed according to the management parameter to create a corresponding descriptor.

According to embodiments of the present disclosure, when the decoded processing instruction is a descriptor management instruction, the management parameter in the instruction can be obtained, and the processing instruction can be executed according to the management parameter, so that the descriptor can be managed through the descriptor management instruction, which may improve the processing efficiency of a processor on a descriptor.

In some embodiments, the descriptor is used to indicate a shape of N-dimensional tensor data, where N is an integer greater than or equal to 0, and the content of the descriptor includes at least one shape parameter indicating the shape of the tensor data.

In some embodiments, a descriptor may be used to indicate the shape of the N-dimensional tensor data, where the value of N can be determined according to a count of dimensions (orders) of the tensor data, and can also be set according to the usage of the tensor data. For example, when the tensor data is 3-dimensional tensor data, the value of N is 3 (determined according to the dimension), and the descriptor can be used to indicate the shape (such as offset, size, etc.) of the 3-dimensional tensor data in three dimensions. It should be understood that those skilled in the art can set the value of N according to actual needs, which is not limited in the present disclosure.

In some embodiments, the content of the descriptor may include at least one shape parameter (such as a size of each dimension of the tensor, etc.) representing the shape of the tensor data. The present disclosure does not limit the specific parameters included in the content of the descriptor.

In the embodiment, by using the descriptor to indicate the tensor data, the shape of the tensor data can be described, and related information such as the relationship among a plurality of pieces of tensor data can be determined accordingly, thus improving the efficiency of accessing tensor data.

In some embodiments, the identifier and content of the descriptor can be stored in the descriptor storage space, where the descriptor storage space can be a storage space in an internal memory (such as a register, an on-chip SRAM, or other medium cache, etc.) of the control circuit. Similarly, the data storage space of the tensor data indicated by the descriptor may also be a storage space in the internal memory (such as an on-chip cache) of the control circuit or a storage space in an external memory (an off-chip memory) connected to the control circuit. The data address of the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the storage area corresponding to the identifier of the descriptor may be a fixed address. For example, a separate storage space may be allocated for tensor data, where a start address of each piece of tensor data in the data storage space corresponds to one identifier of the descriptor. In this case, the data address of the tensor data indicated by the descriptor can be directly determined according to the identifier of the descriptor and corresponding relationships.

It should be understood that those skilled in the art can set the identifier and content of the descriptor and the specific method for storing the tensor data indicated by the descriptor according to actual needs, which is not limited in the present disclosure.

In some embodiments, the identifier of a descriptor, the content of the descriptor, and the tensor data indicated by that descriptor can be located close to each other in the memory, or can be stored in different areas of the memory distant from each other; the identifier of a descriptor, the content of the descriptor, and the tensor data indicated by that descriptor can be stored in an internal memory and/or an external memory, which makes the storage of descriptor and tensor data convenient and flexible, thereby improving processing the efficiency.

In some embodiments, the descriptor is also used to indicate an address of N-dimensional tensor data, and the content of the descriptor further includes at least one address parameter indicating the address of the tensor data.

In some embodiments, when the data address of the data storage space corresponding to the identifier of the descriptor is a variable address, the descriptor may be also used to indicate the address of N-dimensional tensor data, where the content of the descriptor may further include at least one address parameter representing the address of the tensor data. For example, if the tensor data is a 3-dimensional data, when the descriptor points to the address of the tensor data, the content of the descriptor may include an address parameter indicating the address of the tensor data, such as a start address of the tensor data, or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, a descriptor can be used to indicate the address of tensor data. Through the address of tensor data indicated by the descriptor, the relationship between a plurality of tensor data can be determined, thereby improving the access efficiency of the processor.

In some embodiments, the address parameter of the tensor data includes a base address of the datum point of the descriptor in the data storage space of the tensor data, where the base address may be different according to the change of the datum point. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the address parameter of the tensor data may include the base address corresponding to the datum point of the descriptor. Different datum points can be determined according to the operation and/or actual needs, and the corresponding base address is used in the content of the descriptor. As a result, the content of the descriptor is more in line with operation and/or usage requirements, and data processing efficiency can be improved.

In some embodiments, the shape parameter of a N-dimensional tensor data includes at least one of the followings: a size of the data storage space of the tensor data in at least one of the N dimensions, a size of the storage area in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area to which the tensor data is mapped in a 3-dimensional space.

It should be understood that those skilled in the art may select a shape parameter representing tensor data according to actual conditions, which is not limited in the present disclosure.

In some embodiments, the shape parameter of tensor data may include at least one of size, offset, position, and mapping relationship, different shape parameters can be used in the content of descriptor according to the operation and/or actual needs. As a result, the content of the descriptor is more in line with operation and/or usage requirements, and data processing efficiency can be improved.

In some embodiments, the descriptor management instruction includes a descriptor registration instruction, and the management parameter includes at least one of the identifier of the descriptor, the shape of the tensor data indicated by the descriptor, and the content of the tensor data indicated by the descriptor.

The data processing method further includes:

a step S12c: when the processing instruction is a descriptor registration instruction, registering a descriptor according to at least one of the identifier of the descriptor, the shape of the tensor data indicated by the descriptor, and the content of the tensor data indicated by the descriptor.

In some embodiments, the descriptor registration instruction may be used to register a descriptor, and the management parameter of the descriptor registration instruction may include at least one of the identifier (ID) of the descriptor, the shape of the tensor, and the content of the tensor data indicated by the descriptor. For example, the management parameter of the descriptor registration instruction may include an identifier TR0 and the shape of the tensor data (a count of dimensions, a size of each dimension, an offset, a start data address, etc.). The present disclosure does not limit the specific content of the management parameter.

In some embodiments, a descriptor may be registered according to at least one of the identifier of the descriptor, the shape of the tensor data indicated by the descriptor, and the content of the tensor data indicated by the descriptor.

For example, when the management parameter of the descriptor registration instruction includes the identifier TR0 of the descriptor, the description registration instruction can be executed according to TR0, and the descriptor TR0 can be registered, and the descriptor TR0 can be stored in the descriptor storage space (such as a register) corresponding to TR0.

In some embodiments, when the management parameter of the descriptor registration instruction includes the shape of the tensor data indicated by the descriptor, the content of the descriptor can be determined according to the shape of the tensor data indicated by the descriptor, and the content of the descriptor can be stored in the descriptor storage space, then the process of registering the descriptor can be completed. When the management parameter of the descriptor registration instruction also includes the identifier of the descriptor, after the content of the descriptor is determined, the content of the descriptor can be stored in the descriptor storage space corresponding to the identifier of the descriptor, then the process of registering the descriptor can be completed. If the identifier of the descriptor does not have a corresponding descriptor storage space, the content of the descriptor can be stored in the descriptor storage space, and the correspondence between the identifier of the descriptor and the descriptor storage space can be established, then the process of registering the descriptor can be completed.

In some embodiments, when the management parameter of the descriptor registration instruction includes the content of the tensor data indicated by the descriptor, the content of the descriptor can be determined according to the content of the tensor data indicated by the descriptor, and the correspondence between the content of the tensor data and the content of the descriptor can be established, and then the content of the descriptor can be stored in the descriptor storage space, then the process of registering the descriptor can be completed. When the management parameter also includes the identifier of the descriptor, after the content of the descriptor is determined, the content of the descriptor can be stored in the descriptor storage space corresponding to the identifier of the descriptor, then the process of registering the descriptor can be completed. If the identifier of the descriptor does not have a corresponding fixed descriptor storage space, the content of the descriptor can be stored in the descriptor storage space, and the correspondence between the identifier of the descriptor and the descriptor storage space can be established, then the process of registering the descriptor can be completed.

In some embodiments, the descriptor can also be registered according to the shape of the tensor data indicated by the descriptor and the content of the tensor data indicated by the descriptor, or the descriptor can also be registered according to the identifier of the descriptor, the shape of the tensor data indicated by the descriptor, and the content of the tensor data indicated by the descriptor. The present disclosure does not limit the combination mode and specific value of management parameters in the descriptor registration instruction.

In some embodiments, the descriptor registration instruction may include management parameters of a plurality of descriptors. For example, when the descriptor registration instruction may include identifiers TR0, TR1, and TR2 of the descriptors, the TR0, TR1, and TR2 can be registered respectively according to management parameters (at least one of the identifier of the descriptor, the shape of the tensor data indicated by the descriptor, and the content of the tensor data indicated by the descriptor). The registration process of each TR is the same or similar to the above registration process. In this way, a plurality of descriptors can be registered in batches according to a piece of instruction, which may improve the registration efficiency of the descriptor.

In some embodiments, the descriptor can be registered according to at least one of the identifier of the descriptor, the shape of the tensor data indicated by the descriptor, and the content of the tensor data indicated by the descriptor, so that the registration of the descriptor can satisfy a plurality of operations and/or actual needs, which can improve the processing efficiency of the descriptor.

In some embodiments, the registering a descriptor according to at least one of the identifier of the descriptor, the shape of the tensor data indicated by the descriptor, and the content of the tensor data indicated by the descriptor may include: determining a first storage area for the content of the descriptor in the descriptor storage space, and a second storage area for the tensor data indicated by the content of the descriptor in the data storage space; determining the content of the descriptor and establishing correspondence between the descriptor and the second storage area according to at least one of the identifier of the descriptor, the shape of the tensor data indicated by the descriptor, and the content of the tensor data indicated by the descriptor; and storing the content of the descriptor in the first storage area.

In some embodiments, before the descriptor is registered, the first storage area for the content of the descriptor in the descriptor storage space and the second storage area for the tensor data indicated by the content of the descriptor in the data storage space may be determined.

For example, if at least one of the storage areas has been preset, the first storage area and/or the second storage area may be directly determined. For example, it is preset that the content of the descriptor and the content of the tensor data are stored in a same storage space, and the storage address of the content of the descriptor corresponding to the identifier TR0 of the descriptor is ADDR32-ADDR63, and the storage address of the content of the tensor data is ADDR64-ADDR1023, then the two addresses can be directly determined as the first storage area and the second storage area.

In some embodiments, if there is no preset storage area, the first storage area may be allocated in the descriptor storage space for the content of the descriptor, and the second storage area may be allocated in the data storage space for the content of the tensor data. The storage area may be allocated through the control circuit or the tensor control module, which is not limited in the present disclosure.

In some embodiments, after the first storage area and the second storage area are determined, the content of the descriptor can be determined according to at least one of the identifier of the descriptor, the shape of the tensor data indicated by the descriptor, and the content of the tensor data indicated by the descriptor, and the correspondence between the descriptor and the second storage area can be established; and then the content of the descriptor can be stored in the first storage area, then the process of registering the descriptor can be completed.

For example, for the tensor data 23 shown in FIG. 2, the registration parameter may include a start address PA_start (base address) of the data storage space 21, an offset 25 (offset_x) in the X-axis direction, and an offset 24 (offset_y) in the Y-axis direction, a size in the X-axis direction (size_x), and a size in the Y-axis direction (as size_y). Based on the parameters, the content of the descriptor can be represented as the formula $$X \text{ direction: ori\_x, offset\_x, size\_x}$$
$$Y \text{ direction: ori\_y, offset\_y, size\_y}$$
$$PA\_start$$

and stored in the first storage area, thereby completing the registration process of the descriptor.

By adopting the above-mentioned method provided by the present disclosure, the descriptor can be automatically created according to the descriptor registration instruction, and the correspondence between the tensor data indicated by the descriptor and the data address can be realized, so that the data address can be obtained through the content of the descriptor during data processing, and the data access efficiency of the processor can be improved.

In some embodiments, the content of the tensor data indicated by the descriptor includes at least one of immediate data and data in a register.

In some embodiments, the content of the tensor data indicated by the descriptor may include immediate data, where the immediate data maybe tensor data that does not change during data processing. After the correspondence between the descriptor and the immediate data is established, the immediate data can be replaced by the descriptor during the data processing process. The content of the tensor data indicated by the descriptor may also include the data in the register. After the correspondence between the descriptor and the data in the register is established, a serial number of the register may be taken as an identifier of the descriptor.

In some embodiments, using a descriptor to indicate immediate data and data in a register may reduce the complexity of using the immediate data and the data in the register, thereby improving the efficiency of data processing.

In some embodiments, a descriptor management instruction may include a first descriptor release instruction, and the management parameter includes an identifier of the descriptor. The step S12c may include: when the processing instruction is a first descriptor release instruction, releasing the descriptor corresponding to the identifier according to the identifier of the descriptor. The first descriptor release instruction may be used to release (delete) a descriptor, and the management parameter of the first descriptor release instruction may include the identifier of the descriptor, where the identifier of the descriptor may be used to indicate the released descriptor.

In some embodiments, the management parameter of the first descriptor release instruction may include an identifier of at least one descriptor, in other words, the first descriptor release instruction may release one descriptor or simultaneously release a plurality of descriptors.

In some embodiments, the first descriptor release instruction may include identifiers of part of the descriptors, in other words, only part of the descriptors among current descriptors may be released, or the first descriptor release instruction may include identifiers of all descriptors, in other words, all the current descriptors may be released.

In some embodiments, when the processing instruction is the first descriptor release instruction, the descriptor corresponding to the identifier may be released according to the identifier of the descriptor. For example, when the management parameters of the first descriptor release instruction are TR2 and TR3, the first descriptor release instruction may release descriptors corresponding to TR2 and TR3 according to TR2 and TR3.

In some embodiments, descriptors can be released according to the identifiers of the descriptors. Part or all of the descriptors, and one or more descriptors can be released at the same time according to actual needs, so that the release mode of the descriptors can meet various processing requirements, thereby improving the release efficiency of the descriptors.

In some embodiments, the releasing the descriptor corresponding to the identifier according to the identifier of the descriptor may include: releasing the storage area of the descriptor in the descriptor storage space and the storage area of the content of the tensor data indicated by the descriptor in the data storage space, respectively.

In other words, when the descriptor corresponding to the identifier is released according to the identifier of the descriptor, the storage area occupied by the descriptor may be released at the same time. In other words, the storage area of the descriptor in the descriptor storage space and the storage area of the content of the tensor data indicated by the descriptor in the data storage space may be respectively released. In this way, the space occupied by the descriptor may be released after the descriptor is used, so that the limited storage resources can be reused, and the resource utilization efficiency is improved.

In some embodiments, the descriptor management instruction includes a second descriptor release instruction, and the management parameter includes an identifier of the descriptor, where the step S12c may include: when the processing instruction is a second descriptor release instruction, storing the content of the descriptor stored in the descriptor storage space in a designated storage space according to the identifier of the descriptor, and releasing the descriptor corresponding to the identifier. The second descriptor release instruction may be used to release (delete) a descriptor, and the management parameter of the second descriptor release instruction may include the identifier of the descriptor, where the identifier of the descriptor may be used to indicate the released descriptor.

In some embodiments, when the processing instruction is a second descriptor release instruction, according to the identifier of the descriptor, the content of the descriptor stored in the descriptor storage space is first stored in a designated storage space, and then the descriptor corresponding to the identifier of the descriptor is registered. In other words, the second descriptor release instruction may perform the release operation after the content of the released descriptor is stored. By storing the content of the descriptor first and then releasing the descriptor, the resources (such as the identifier of the descriptor, the storage space, etc.) occupied by the current descriptor may be released while the content of the descriptor that need to be used later is stored, thereby improving the resource utilization efficiency.

In some embodiments, the descriptor management instruction includes a descriptor modification instruction, and the management parameter includes at least one of the identifier of the descriptor, the content of the modified descriptor, and the content of the tensor data indicated by the descriptor. The step S12c may include: when the processing instruction is a descriptor modification instruction, determining the updated content of the descriptor according to the management parameter of the descriptor; according to the updated content, updating at least one of the identifier of the descriptor, the content of the descriptor in the descriptor storage space, and the content of tensor data in the data storage space.

For example, the descriptor modification instruction can be used to modify various parameters of the descriptor, such as the identifier of the descriptor, the shape of the tensor, and the like. The management parameters of the descriptor modification instruction may include at least one of the identifier of the descriptor, the content of the modified descriptor, and the content of the tensor data indicated by the descriptor. The present disclosure does not limit the specific content of the management parameters of the descriptor modification instruction.

In some embodiments, when the processing instruction is a descriptor modification instruction, the content of the updated descriptor can be determined according to the management parameters of the descriptor, for example, the dimension of the tensor may be changed from 3 dimensions to 2 dimensions, the size of the tensor data in one or more dimensional directions may be changed.

In some embodiments, after the content to be updated is determined, at least one of the identifier of the descriptor in the descriptor storage space, the content of the descriptor in the descriptor storage space, and the content of tensor data in the data storage space can be updated to modify the tensor data, so that the updated descriptor can indicate the modified tensor data. The present disclosure does not limit the scope of the content to be updated and the specific updating method.

By adopting the above-mentioned method provided by the present disclosure, when the tensor data indicated by the descriptor changes, the descriptor is directly modified to maintain the correspondence between the descriptor and the tensor data, which improves the efficiency of resource utilization.

It should be noted that although the above-mentioned embodiment is used as an example to introduce the data processing method as described above, those skilled in the art can understand that the present disclosure should not be limited thereto. In fact, users can flexibly set each step according to personal preference and/or actual application scenarios, as long as it conforms to the technical solution of the present disclosure.

FIG. 3a shows a block diagram of a data processing apparatus according to an embodiment of the present disclosure. As shown in FIG. 3a, the data processing apparatus includes:

a parameter obtaining module 31a configured to obtain, when a decoded processing instruction is a descriptor management instruction, a management parameter of the descriptor in the processing instruction, where the descriptor is used to indicate a shape of tensor; and an instruction executing module 32a configured to execute the processing instruction according to the management parameter.

In some embodiments, the descriptor management instruction includes a descriptor registration instruction, and the management parameter includes at least one of the identifier of the descriptor, the shape of the tensor data indicated by the descriptor, and the content of the tensor data indicated by the descriptor.

The instruction executing module 32a includes:
a register sub-module configured to register, when the processing instruction is a descriptor registration instruction, a descriptor according to at least one of the identifier of the descriptor, the shape of the tensor data indicated by the descriptor, and the content of the tensor data indicated by the descriptor.

In some embodiments, the register sub-module is further configured to:
determine a first storage area for the content of the descriptor in the descriptor storage space, and a second storage area for the tensor data indicated by the content of the descriptor in the data storage space;
determine the content of the descriptor and establish correspondence between the descriptor and the second storage area according to at least one of the identifier of the descriptor, the shape of the tensor data indicated by the descriptor, and the content of the tensor data indicated by the descriptor; and
store the content of the descriptor in the first storage area.

In some embodiments, the content of the tensor data indicated by the descriptor includes at least one kind of immediate data or data in a register.

In some embodiments, the instruction executing module 32a includes:
a first release sub-module configured to release, when the processing instruction is a first descriptor release instruction, the descriptor corresponding to the identifier according to the identifier of the descriptor.

In some embodiments, the first release sub-module is further configured to: release the storage area of the descriptor in the descriptor storage space and the storage area of the content of the tensor data indicated by the descriptor in the data storage space, respectively.

In some embodiments, the descriptor management instruction includes a second descriptor release instruction, and the management parameter includes an identifier of the descriptor. The instruction executing module 32a includes:
a storage space determining sub-module configured to store, when the processing instruction is a second descriptor release instruction, the content of the descriptor stored in the descriptor storage space in a designated storage space according to the identifier of the descriptor; and
a second release sub-module configured to release the descriptor corresponding to the identifier.

In some embodiments, the descriptor management instruction includes a descriptor modification instruction, and the management parameter includes at least one of the identifier of the descriptor, the content of the modified descriptor, and the content of the tensor data indicated by the descriptor.

The instruction executing module 32a includes:
an updated content determining sub-module configured to determine, when the processing instruction is a descriptor modification instruction, content to be updated of the descriptor according to the management parameter of the descriptor; and
a modifying sub-module configured to update, according to the content to be updated, at least one of the identifier of the descriptor, the content of the descriptor in the descriptor storage space, and the content of tensor data in the data storage space.

In some embodiments, the descriptor is used to indicate a shape of N-dimensional tensor data, where N is an integer greater than or equal to 0, and the content of the descriptor includes at least one shape parameter indicating the shape of the tensor data.

In some embodiments, the descriptor is also used to indicate an address of N-dimensional tensor data, and the content of the descriptor further includes at least one address parameter indicating the address of the tensor data.

In some embodiments, the address parameter of the tensor data includes a base address of a datum point of the descriptor in the data storage space of the tensor data.

In some embodiments, the shape parameter of the tensor data includes at least one of following: a size of the data storage space in at least one of N dimensions, a size of the storage area in at least one of N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor.

In some embodiments, the present disclosure provides an artificial intelligence chip including the above-mentioned data processing apparatus.

In some embodiments, the present disclosure further provides a board card including: a storage device, an interface apparatus, a control device, and the above-mentioned artificial intelligence chip. The artificial intelligence chip is connected to the storage device, the control device, and the interface apparatus respectively; the storage device is configured to store data; the interface apparatus is configured to implement data transfer between the artificial intelligence chip and an external equipment; and the control device is configured to monitor a state of the artificial intelligence chip.

In some embodiments, the storage device includes a plurality of groups of storage units, where each group of the storage units is connected with the artificial intelligence chip by a bus, and the storage units are DDR SDRAMs. The chip includes a DDR controller configured to control data transfer and data storage of each storage unit. The interface apparatus is a standard PCIE interface.

A1. A data processing method, comprising:
when a decoded processing instruction is a descriptor management instruction, obtaining a management parameter of the descriptor in the processing instruction, wherein the descriptor is used to indicate a shape of tensor; and
executing the processing instruction according to the management parameter.

A2. The data processing method of A1, wherein the descriptor management instruction includes a descriptor registration instruction, and the management parameter includes at least one of an identifier of the descriptor, a shape of tensor data indicated by the descriptor, and content of the tensor data indicated by the descriptor, wherein the executing the processing instruction according to the management parameter includes:
when the processing instruction is a descriptor registration instruction, registering a descriptor according to at least one of the identifier of the descriptor, the shape of the tensor data indicated by the descriptor, and the content of the tensor data indicated by the descriptor.

A3. The data processing method of A2, wherein the registering a descriptor according to at least one of the identifier of the descriptor, the shape of the tensor data indicated by the descriptor, and the content of the tensor data indicated by the descriptor includes:
determining a first storage area for the content of the descriptor in the descriptor storage space, and a second storage area for the tensor data indicated by the content of the descriptor in the data storage space;
determining the content of the descriptor and establishing correspondence between the descriptor and the second storage area according to at least one of the identifier of the descriptor, the shape of the tensor data indicated by the descriptor, and the content of the tensor data indicated by the descriptor; and
storing the content of the descriptor in the first storage area.

A4. The data processing method of A2 or A3, wherein the content of the tensor data indicated by the descriptor includes at least one kind of immediate data or data in a register.

A5. The data processing method of A1, wherein the descriptor management instruction includes a first descriptor release instruction, and the management parameter includes an identifier of the descriptor, wherein the executing the processing instruction according to the management parameter includes:
when the processing instruction is a first descriptor release instruction, releasing the descriptor corresponding to the identifier according to the identifier of the descriptor.

A6. The data processing method of A5, wherein the releasing the descriptor corresponding to the identifier according to the identifier of the descriptor includes:
releasing a storage area of the descriptor in the descriptor storage space and a storage area of the content of the tensor data indicated by the descriptor in the data storage space, respectively.

A7. The data processing method of A1, wherein the descriptor management instruction includes a second descriptor release instruction, and the management parameter includes an identifier of the descriptor, wherein the executing the processing instruction according to the management parameter includes:
when the processing instruction is a second descriptor release instruction, storing the content of the descriptor stored in the descriptor storage space in a designated storage space according to the identifier of the descriptor; and
releasing the descriptor corresponding to the identifier.

A8. The data processing method of A1, wherein the descriptor management instruction includes a descriptor modification instruction, and the management parameter includes at least one of the identifier of the descriptor, the content of the modified descriptor, and the content of the tensor data indicated by the descriptor, wherein the executing the processing instruction according to the management parameter includes:

when the processing instruction is a descriptor modification instruction, determining content to be updated of the descriptor according to the management parameter of the descriptor; and according to the content to be updated, updating at least one of the identifier of the descriptor, the content of the descriptor in the descriptor storage space, and the content of tensor data in the data storage space.

A9. The data processing method of any one of A1-A8, wherein the descriptor is used to indicate a shape of N-dimensional tensor data, wherein N is an integer greater than or equal to 0, and the content of the descriptor includes at least one shape parameter indicating the shape of the tensor data.

A10. The data processing method of A9, wherein the descriptor is also used to indicate an address of N-dimensional tensor data, and the content of the descriptor further includes at least one address parameter indicating the address of the tensor data.

A11. The data processing method of A10, wherein the address parameter of the tensor data includes a base address of a datum point of the descriptor in the data storage space of the tensor data.

A12. The data processing method of A11, wherein the shape parameter of the tensor data includes at least one of following:

a size of the data storage space in at least one of N dimensions, a size of the storage area in at least one of N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor.

A13. A data processing apparatus, comprising:

a parameter obtaining module configured to obtain, when a decoded processing instruction is a descriptor management instruction, a management parameter of the descriptor in the processing instruction, wherein the descriptor is used to indicate a shape of tensor; and an instruction executing module configured to execute the processing instruction according to the management parameter.

A14. The data processing apparatus of A13, wherein the descriptor management instruction includes a descriptor registration instruction, and the management parameter includes at least one of an identifier of the descriptor, a shape of tensor data indicated by the descriptor, and content of the tensor data indicated by the descriptor, wherein the instruction executing module includes:

a register sub-module configured to register, when the processing instruction is a descriptor registration instruction, a descriptor according to at least one of the identifier of the descriptor, the shape of the tensor data indicated by the descriptor, and the content of the tensor data indicated by the descriptor.

A15. The data processing apparatus of A14, wherein the register sub-module is further configured to:

determine a first storage area for the content of the descriptor in a descriptor storage space, and a second storage area for the tensor data indicated by the content of the descriptor in a data storage space;

determine the content of the descriptor and establish correspondence between the descriptor and the second storage area according to at least one of the identifier of the descriptor, the shape of the tensor data indicated by the descriptor, and the content of the tensor data indicated by the descriptor; and store the content of the descriptor in the first storage area.

A16. The data processing apparatus of A14 or A15, wherein the content of the tensor data indicated by the descriptor includes at least one kind of immediate data or data in a register.

A17. The data processing apparatus of A13, wherein the descriptor management instruction includes a first descriptor release instruction, and the management parameter includes the identifier of the descriptor, wherein the instruction executing module includes:

a first release sub-module configured to release, when the processing instruction is a first descriptor release instruction, the descriptor corresponding to the identifier according to the identifier of the descriptor.

A18. The data processing apparatus of A17, wherein the first release sub-module is further configured to:

release a storage area of the descriptor in the descriptor storage space and a storage area of the content of the tensor data indicated by the descriptor in the data storage space, respectively.

A19. The data processing apparatus of A13, wherein the descriptor management instruction includes a second descriptor release instruction, and the management parameter includes the identifier of the descriptor, wherein the instruction executing module includes:

a storage space determining sub-module configured to store, when the processing instruction is a second descriptor release instruction, the content of the descriptor stored in the descriptor storage space in a designated storage space according to the identifier of the descriptor; and a second release sub-module configured to release the descriptor corresponding to the identifier.

A20. The data processing apparatus of A13, wherein the descriptor management instruction includes a descriptor modification instruction, and the management parameter includes at least one of the identifier of the descriptor, the content of the modified descriptor, and the content of the tensor data indicated by the descriptor, wherein the instruction executing module includes:

an updated content determining sub-module configured to determine, when the processing instruction is a descriptor modification instruction, content to be updated of the descriptor according to the management parameter of the descriptor; and a modifying sub-module configured to update, according to the content to be updated, at least one of the identifier of the descriptor, the content of the descriptor in the descriptor storage space, and the content of tensor data in the data storage space.

A21. The data processing apparatus of any one of A13-A20, wherein the descriptor is used to indicate a shape of N-dimensional tensor data, wherein N is an integer greater than or equal to 0, and the content of the descriptor includes at least one shape parameter indicating the shape of the tensor data.

A22. The data processing apparatus of A21, wherein the descriptor is also used to indicate an address of N-dimensional tensor data, and the content of the descriptor further includes at least one address parameter indicating the address of the tensor data.

A23. The data processing apparatus of A22, wherein the address parameter of the tensor data includes a base address of a datum point of the descriptor in the data storage space of the tensor data.

A24. The data processing apparatus of A23, wherein the shape parameter of the tensor data includes at least one of following:
- a size of the data storage space in at least one of N dimensions, a size of the storage area in at least one of N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor.

A25. An artificial intelligence chip comprising the data processing apparatus of any one of A13-A24.

A26. An electronic device comprising the artificial intelligence chip of A25.

A27. A board card comprising a storage device, an interface apparatus, a control device, and the artificial intelligence chip of A25, wherein
- the artificial intelligence chip is connected to the storage device, the control device, and the interface apparatus, respectively;
- the storage device is configured to store data;
- the interface apparatus is configured to implement data transfer between the artificial intelligence chip and an external equipment; and
- the control device is configured to monitor a state of the artificial intelligence chip.

A28. The board card of A27, wherein
- the storage device includes a plurality of groups of storage units, where each group of the storage units is connected with the artificial intelligence chip by a bus, and the storage units are DDR SDRAMs;
- the chip includes a DDR controller configured to control data transfer and data storage of each storage unit; and
- the interface apparatus is a standard PCIE interface.

With the continuous development of the A1 (Artificial Intelligence) technology, it has gradually obtained wide application and worked well in the fields of image recognition, speech recognition, and natural language processing, and the like. However, as the complexity of A1 algorithms is growing, the amount of data and data dimensions that need to be processed are increasing, therefore, multi-core and/or multi-chip data are usually required for data processing. When data is synchronized between cores or chips, a synchronization method adopting the related-art may result in large synchronization overhead and low processing efficiency.

In some embodiments, the present disclosure provides a data synchronization method.

The data synchronization method provided by the present disclosure may be applied to any one processor of a processing system (for example, an artificial intelligence chip) including a plurality of processors (multi-core). The processor may be a general-purpose processor, such as a CPU (Central Processing Unit), or an IPU (Artificial Intelligence Processor) for performing artificial intelligence operations. Artificial intelligence operations may include machine learning operations, brain-like operations, and the like, where machine learning operations include neural network operations, k-means operations, support vector machine operations, and the like. The artificial intelligence processor may include, for example, one or a combination of GPU (Graphics Processing Unit), NPU (neural-network Processing Unit), DSP (Digital Signal Process), and Field-Programmable Gate Array (FPGA). The present disclosure does not limit the specific types of processors. In addition, the types of a plurality of processors in the processing system may be the same or different, which is not limited in the present disclosure.

In some embodiments, the processor mentioned in the present disclosure may include a plurality of processing units, and each processing unit can independently run all assigned tasks, such as convolution, pooling, or full connection. The present disclosure does not limit the processing unit and the tasks run by the processing unit.

FIG. 1$d$1 shows a schematic diagram of a processing system of a data synchronization method according to an embodiment of the present disclosure. As shown in FIG. 1$d$1, a processing system 100$d$ includes a plurality of processors 101 and a memory 102, where the plurality of processors 101 are used to execute instruction sequences, and the memory 102 is used to store data, which may include a RAM (Random Access Memory) and a register file. The plurality of processors 101 in the processing system 100$d$ can share part of a storage space, such as the RAM storage space and the register file, and can also have their own storage space at the same time.

FIG. 1$d$2 shows a flowchart of a data synchronization method according to an embodiment of the present disclosure. As shown in FIG. 1$d$2, the data synchronization method is applied to a first processor (any processor in the processing system), and the data synchronization method includes:
- a step S11$d$: determining synchronization information of tensor data according to a descriptor of the tensor data to be synchronized, where the descriptor is used to indicate a shape of the tensor data to be synchronized;
- a step S12$d$: generating a synchronization instruction according to the synchronization information of the tensor data; and
- a step S13$d$: sending the synchronization instruction to a second processor, where the synchronization instruction is used to instruct the second processor to obtain the tensor data to be synchronized according to the synchronization instruction.

For example, the tensor data to be synchronized may include N-dimensional tensor data (N is an integer greater than or equal to 0, for example, N=1, 2, or 3), where the tensor may have various forms of data composition, and the tensor may have different dimensions, for example, a scalar can be viewed as a 0-dimensional tensor, a vector can be viewed as a 1-dimensional tensor, and a matrix can be a tensor of two or more dimensions. The shape of a tensor includes dimensions of the tensor and a size of each dimension of each tensor and the like.

In this case, a descriptor (tensor descriptor) may be set to indicate the shape of the tensor (N-dimensional tensor data), where the value of N can be determined according to a count of dimensions (orders) of the tensor data, and can also be set according to the usage of the tensor data. For example, when the value of N is 3, the tensor data is 3-dimensional tensor data, and the descriptor can be used to indicate the shape (such as offset, size, etc.) of the 3-dimensional tensor data in three dimensions. It should be understood that those skilled in the art can set the value of N according to actual needs, which is not limited in the present disclosure.

In some embodiments, the descriptor may include an identifier, content, and the like. The identifier of the descriptor may be used to distinguish descriptors, for example, the identifier may be a serial number. The content of the descriptor may include at least one shape parameter (such as a size of each dimension of the tensor, etc.) representing the shape of the tensor data, and may also include at least one address parameter (such as a base address of a datum point) representing an address of the tensor data. The present disclosure does not limit the specific parameters included in the content of the descriptor.

By using the descriptor to indicate tensor data, the shape of tensor data can be represented, and related information such as the relationship among a plurality of pieces of tensor data can be determined, so as to improve the access efficiency of tensor data and reduce the complexity of data synchronization.

In some embodiments, during data processing, data synchronization between a plurality of processors (such as a plurality of cores of an artificial intelligence chip) may be executed, for example, an operation result of a processor A1 may be synchronized to a processor A2 as input data of another operation. In this case, a data synchronization mechanism based on the descriptor can be used to achieve data synchronization.

In some embodiments, the first processor is a sender for data synchronization, and the second processor is a receiver for data synchronization. When there is tensor data to be synchronized, in the step S11$d$, the first processor may determine the synchronization information of the tensor data (for example, an identifier, shape, source, storage address, and other information of tensor data); in the step S12$d$, the first processor may generate the synchronization instruction according to the synchronization information; and in the step S13$d$, the first processor may send the synchronization instruction to the second processor to be synchronized. The second processor may include a general-purpose processor (such as a CPU (central processing unit), a GPU (graphics processor)) and a dedicated processor (such as an AI processor, a scientific computing processor, or a digital signal processor, etc.). The type of the second processor may be the same as or different from the type of the first processor, and this disclosure does not limit the type of the second processor.

In some embodiments, the first processor can actively execute data synchronization on the second processor. For example, when the first processor completes an operation and obtains an operation result (tensor data), the first processor actively synchronizes data with the second processor that needs to use the operation result. In another example, the first processor may also synchronize data with the second processor in response to a synchronization request of the second processor, for example, when receiving a synchronization request instruction from the second processor, the first processor starts executing data synchronization on the second processor. The present disclosure does not limit the timing of the start of data synchronization.

In some embodiments, when the first processor determines that there is tensor data to be synchronized, the first processor may obtain the descriptor of the tensor data. The descriptor may be a registered (created) descriptor indicating the shape of the tensor data, or a new descriptor registered (created) according to the shape parameter of the tensor data, which is not limited in the present disclosure.

In some embodiments, according to the descriptor of the tensor data, the synchronization information of the tensor data can be determined. The synchronization information may include at least one of the identifier (for example, a serial number of data), shape, source, and storage address of the tensor data. According to the synchronization information of the tensor data, the synchronization instruction can be generated. If the second processor already has information (for example, a descriptor indicating the tensor data to be synchronized has been registered) of the tensor data, the synchronization instruction may only include part of the synchronization information, such as the identifier of the tensor data, and then the synchronization instruction may instruct the second processor to synchronize the tensor data according to the identifier of the tensor data; if the second processor does not have information of the tensor data, the synchronization instruction can include more synchronization information such as the identifier and the storage address, and then the synchronization instruction may instruct the second processor to synchronize the tensor data according to the corresponding information. The present disclosure does not limit the specific content included in the synchronization instruction.

In some embodiments, after the synchronization instruction is generated, the synchronization instruction may be sent to the second processor to instruct the second processor to obtain the tensor data to be synchronized according to the synchronization instruction. If the synchronization instruction includes the identifier of the tensor data, the second processor may determine the tensor data to be synchronized according to the identifier, and register or obtain the descriptor indicating the tensor data to be synchronized, and then obtain the tensor data indicated by the descriptor according to the content of the descriptor, thereby synchronizing the tensor data. If the synchronization instruction includes more synchronization information such as the identifier and storage address, the second processor can register the descriptor indicating the tensor data to be synchronized according to the synchronization information in the instruction, and obtain the tensor data indicated by the descriptor directly according to the content of the descriptor, thereby synchronizing the tensor data.

According to the data synchronization method provided in the embodiment of the present disclosure, by setting a descriptor indicating the shape of tensor data, the synchronization information of the tensor data may be determined according to the descriptor, and a synchronization instruction can be generated according to the synchronization information and sent to the second processor to instruct the second processor to obtain the tensor data to be synchronized according to the synchronization instruction, thereby reducing synchronization overhead without changing a structure of the synchronization instruction, and improving the efficiency of data synchronization.

In some embodiments, the synchronization information may include the storage address of the tensor data to be synchronized. The step S12$d$ may include: when the storage address of the tensor data to be synchronized is in a shared storage space, generating the synchronization instruction according to the storage address of the tensor data to be synchronized to instruct the second processor to obtain the tensor data to be synchronized from the shared storage space.

For example, a plurality of processors (cores) may have a shared storage space, for example, an off-chip memory can be accessed by both the first processor and the second processor. The shared storage space may be a storage space in which a plurality of cores (processors) can access data, or a storage space in which some cores (processors) can access data. The shared storage space for cores may be preset, and the present disclosure does not limit the specific method for setting the shared storage space.

In some embodiments, the storage address of the tensor data to be synchronized can be determined according to the content of the descriptor of the tensor data to be synchronized. If the storage address of the tensor data to be synchronized is in the shared storage space, the second processor can also access data from the shared storage space, and then the second processor can directly read the tensor data according to the storage address of the tensor data to achieve synchronization. In this case, the synchronization instruction may include the storage address of the tensor data to be synchronized, in other words, the synchronization instruction may be generated according to the storage address of the tensor data to be synchronized. After receiving the synchronization instruction, the second processor may parse the instruction to obtain the storage address of the tensor data; according to the storage address of the tensor data, the second processor may register (create) the descriptor of the tensor data to be synchronized, so that the content of the descriptor corresponds to the data address of the tensor data, and the tensor data to be synchronized can be obtained from the shared storage space, thereby achieving the entire synchronization process.

By adopting the above-mentioned data synchronization method provided by the present disclosure, unnecessary data transfer can be avoided, the amount of transmitted data can be reduced, and the synchronization efficiency can be improved.

In some embodiments, the synchronization information may include the storage address of the tensor data to be synchronized. The step S12d may include: when the storage address of the tensor data to be synchronized is in a non-shared storage space, storing the tensor data to be synchronized in the shared storage space; and according to the address of the tensor data to be synchronized in the shared storage space, generating the synchronization instruction to instruct the second processor to obtain the tensor data to be synchronized from the shared storage space.

For example, the first processor may have a non-shared storage space in which the first processor may access data, and the second processor cannot access the non-shared storage space of the first processor, so that the second processor cannot access data in the non-shared storage space. If the storage address of the tensor data to be synchronized is in the non-shared storage space, the second processor cannot directly obtain the tensor data. In this case, the first processor may transfer the tensor data to be synchronized and store the tensor data to be synchronized to the shared storage space, so that the second processor can access the tensor data. After the tensor data to be synchronized is transferred and stored into the shared storage space, if a descriptor indicating the tensor data to be synchronized is not registered in the first processor, or a descriptor indicating the tensor data in the non-shared storage space is registered and the descriptor cannot be modified (for example, the descriptor is being operated), the first processor may generate a descriptor of the tensor data to be synchronized, in other words, the first processor may register a new descriptor to indicate the tensor data in the shared storage space.

In some embodiments, the first processor may generate the synchronization instruction according to the address of the tensor data to be synchronized in the shared storage space. After receiving the synchronization instruction, the second processor may parse the instruction to obtain the storage address of the tensor data to be synchronized; according to the storage address of the tensor data, the second processor may register (create) the descriptor of the tensor data to be synchronized, so that the content of the descriptor corresponds to the data address of the tensor data, and the second processor may obtain the tensor data to be synchronized from the shared storage space, then the entire synchronization process can be completed.

By adopting the above-mentioned data synchronization method provided by the present disclosure, the tensor data to be synchronized in the non-shared storage space can be actively transferred and stored into the shared storage space, so that the second processor can obtain the tensor data to be synchronized, thereby reducing the amount of data transmitted between processors during synchronization, and improving the synchronization efficiency.

In some embodiments, the data synchronization method further includes: determining the descriptor of the tensor data to be synchronized according to the synchronization request instruction from the second processor.

For example, the first processor may execute data synchronization on the second processor in response to the synchronization request of the second processor. The synchronization request instruction received from the second processor may include information of the tensor data to be synchronized, such as data characteristics of the tensor data to be synchronized, and the like, where the data characteristics of the tensor data may include information such as the shape, source, and address of the tensor data. The present disclosure does not limit the specific content of the synchronization request instruction. According to the information in the synchronization request instruction, the first processor may determine the descriptor of the tensor data to be synchronized, and determine the synchronization information of the tensor data according to the descriptor, and then generate the synchronization instruction.

By adopting the above-mentioned data synchronization method provided by the present disclosure, the descriptor of the tensor data to be synchronized can be determined according to the synchronization request of the second processor to generate the synchronization instruction, thereby avoiding unnecessary data synchronization and improving the efficiency of data synchronization.

In some embodiments, the synchronization request instruction includes the data characteristics of the tensor data to be synchronized. The step of determining the descriptor of the tensor data to be synchronized according to the synchronization request instruction from the second processor may include:

parsing the synchronization request instruction to obtain the data characteristics of the tensor data to be synchronized; and determining the descriptor of the tensor data to be synchronized according to the data characteristics of the tensor data to be synchronized.

For example, if both the first processor and the second processor have information (data characteristics) of the tensor data to be synchronized, and the information is the same or has a correspondence, the synchronization request instruction may include the data characteristics, such as the identifier of the tensor data. The first processor may parse the synchronization request instruction from the second processor to obtain the data characteristics of the tensor data to be synchronized.

In some embodiments, the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, the address ADDR0-ADDR127), and the shape of the tensor data may be a specified shape (for example, the tensor data may be a 20*10 two-dimensional tensor). Those skilled in the art can set the data characteristics of the tensor data to be synchronized according to the actual situation, which is not limited in the present disclosure.

In some embodiments, according to the data characteristics, the first processor may determine the tensor data to be synchronized, and determine the descriptor of the tensor data to be synchronized, for example, the first processor may directly obtain a descriptor or register a corresponding descriptor. According to the descriptor of the tensor data to be synchronized, the synchronization information of the tensor data may be determined, and then the synchronization instruction may be generated and sent to instruct the second processor to synchronize the tensor data.

By adopting the above-mentioned data synchronization method provided by the present disclosure, the descriptor of the tensor data to be synchronized can be determined according to the data characteristics in the request instruction, so as to achieve the synchronization of the tensor data. In this way, there is no need to transfer tensor data itself during synchronization, which reduces the amount of transferred data and synchronization overhead, and improves processing efficiency.

FIG. 3b1 shows a flowchart of a data synchronization method according to an embodiment of the present disclosure. The data synchronization method may be applied to the second processor. As shown in FIG. 3b1, the data synchronization method may include:

a step S21b: parsing a synchronization instruction from a first processor to obtain synchronization information of tensor data to be synchronized;

a step S22b: determining a descriptor of the tensor data to be synchronized according to the synchronization information of the tensor data to be synchronized, where the descriptor is used to indicate a shape of the tensor data to be synchronized; and a step S23b: obtaining the tensor data to be synchronized according to the descriptor of the tensor data to be synchronized.

For example, the first processor (sender) can actively execute data synchronization on a second processor (receiver). For example, when the first processor completes an operation and obtains an operation result (tensor data), the first processor actively executes data synchronization on the second processor that needs to use the operation result.

In some embodiments, when receiving the synchronization instruction from the first processor, the second processor may parse the synchronization instruction to obtain the synchronization information (such as an identifier, shape, and storage address of the tensor data) of the tensor data to be synchronized.

In some embodiments, if the synchronization instruction includes only the identifier of the descriptor, the second processor may internally search for the tensor data corresponding to the identifier of the tensor data and/or the descriptor corresponding to the tensor data, and then obtain the tensor data to be synchronized according to the content of the descriptor, thereby achieving synchronization of the tensor data.

In some embodiments, if the synchronization instruction includes the shape and storage address of the tensor data, the second processor may register a descriptor indicating the tensor data to be synchronized according to the shape and storage address of the tensor data, and obtain the tensor data to be synchronized according to the content of the descriptor, so as to realize the synchronization of the tensor data.

According to the data synchronization method provided by the present disclosure, by setting a descriptor indicating the shape of the tensor data, the descriptor of the tensor data may be determined according to the synchronization information of the tensor data to be synchronized in the synchronization instruction, and then the tensor data may be obtained, finally the synchronization of the tensor data may be completed, which could reduce the synchronization overhead and the complexity of data synchronization, and improve the efficiency of data synchronization.

In some embodiments, the synchronization information includes the storage address of the tensor data to be synchronized. The data synchronization method further includes:

a step S22b: determining the identifier of the descriptor of the tensor data to be synchronized and/or the content of the descriptor according to the storage address of the tensor data to be synchronized; and a step S23b: according to the content of the descriptor of the tensor data to be synchronized, obtaining the tensor data to be synchronized from the shared storage space.

For example, if the storage address of the tensor data to be synchronized is in the shared storage space, the second processor can access the data from the shared storage space. In this case, the synchronization instruction may include the storage address of the tensor data to be synchronized. After receiving the synchronization instruction, the second processor may parse the instruction to obtain the storage address of the tensor data to be synchronized; according to the storage address of the tensor data, the second processor may create or modify the descriptor corresponding to the tensor data. According to the content of the descriptor, the second processor may obtain the tensor data to be synchronized from the shared storage space, thereby achieving the entire synchronization process.

By adopting the above-mentioned data synchronization method provided by the present disclosure, unnecessary data transfer can be avoided, the times of accessing tensor data can be reduced, the processing efficiency of synchronization can be improved, and the instruction compatibility during transfer and processing process can be realized.

FIG. 3b2 shows a flowchart of a data synchronization method according to an embodiment of the present disclosure. The data synchronization method can be applied to a second processor.

As shown in FIG. 3b2, the data synchronization method includes:

a step S31b: when there is tensor data to be synchronized, generating a synchronization request instruction, where the synchronization request instruction is used to instruct a first processor to determine a descriptor of the tensor data to be synchronized, and the descriptor is used to indicate a shape of the tensor data to be synchronized; and a step S32b: sending the synchronization request instruction to the first processor.

For example, when there is tensor data to be synchronized in the second processor, the second processor may actively send the synchronization request instruction to the first processor to obtain the tensor data to be synchronized. The second processor may generate the synchronization request instruction according to the information of the tensor data to be synchronized, for example, the data characteristics of the tensor data to be synchronized. The present disclosure does not limit the specific content of the synchronization request instruction. According to the information in the synchronization request instruction, the first processor may determine the descriptor of the tensor data to be synchronized, and then generate the synchronization instruction.

By adopting the above-mentioned data synchronization method provided by the present disclosure, the synchronization request can be issued actively when synchronization is needed, which may improve the efficiency of data synchronization.

In some embodiments, the synchronization request instruction includes the data characteristics of the tensor data to be synchronized, so that the first processor can determine the tensor data to be synchronized, where the data characteristics of tensor data may include the identifier, shape, source, and address of the tensor data. Those skilled in the art can set the data characteristics of the tensor data to be synchronized according to the actual situation, which is not limited in the present disclosure.

In some embodiments, the data synchronization method further includes:

parsing the synchronization instruction from the first processor to obtain the synchronization information of the tensor data to be synchronized;

determining the descriptor of the tensor data to be synchronized according to the synchronization information of the tensor data to be synchronized; and obtaining the tensor data to be synchronized according to the descriptor of the tensor data to be synchronized.

For example, when receiving the synchronization instruction from the first processor, the second processor may parse the synchronization instruction to obtain the synchronization information (such as an identifier, shape, and storage address of the tensor data) of the tensor data to be synchronized.

In some embodiments, if the synchronization instruction includes only the identifier of the descriptor, the second processor may internally search for the tensor data corresponding to the identifier of the tensor data and/or the descriptor corresponding to the tensor data, and then obtain the tensor data to be synchronized according to the content of the descriptor, thereby achieving synchronization of the tensor data.

In some embodiments, if the synchronization instruction includes the shape and storage address of the tensor data, the second processor may register a descriptor indicating the tensor data to be synchronized according to the shape and storage address of the tensor data, and obtain the tensor data to be synchronized according to the content of the descriptor, so as to realize the synchronization of the tensor data.

By adopting the above-mentioned data synchronization method provided by the present disclosure, the complexity of data synchronization can be reduced, and the efficiency of data synchronization can be improved.

In some embodiments, the synchronization information includes the storage address of the tensor data to be synchronized.

The step of determining the descriptor of the tensor data to be synchronized according to the synchronization information of the tensor data to be synchronized may include: determining the identifier of the descriptor of the tensor data to be synchronized and/or the content of the descriptor according to the storage address of the tensor data to be synchronized. The step of obtaining the tensor data to be synchronized according to the descriptor of the tensor data to be synchronized may include: according to the content of the descriptor of the tensor data to be synchronized, obtaining the tensor data to be synchronized from the shared storage space.

For example, if the storage address of the tensor data to be synchronized is in the shared storage space, the second processor can access the data from the shared storage space. In this case, the synchronization instruction may include the storage address of the tensor data to be synchronized. After receiving the synchronization instruction, the second processor may parse the instruction to obtain the storage address of the tensor data to be synchronized; according to the storage address of the tensor data, the second processor may create or modify the descriptor corresponding to the tensor data. According to the content of the descriptor, the second processor may obtain the tensor data to be synchronized from the shared storage space, thereby achieving the entire synchronization process.

By adopting the above-mentioned data synchronization method provided by the present disclosure, unnecessary data transfer can be avoided, the times of accessing tensor data can be reduced, the processing efficiency of synchronization can be improved, and the instruction compatibility during transfer and processing process can be realized.

In some embodiments, the identifier and content of the descriptor can be stored in the descriptor storage space, where the descriptor storage space can be a storage space in an internal memory (such as a register, an on-chip SRAM, or other medium cache, etc.) of the processor. The data storage space of the tensor data indicated by the descriptor may be a storage space in the internal memory (such as an on-chip cache) of the processor or a storage space in an external memory (an off-chip memory) connected to the processor. The data address in the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the data storage space corresponding to the descriptor may be a fixed address. For example, a separate data storage space may be allocated for the tensor data, and a start address of each piece of tensor data in the data storage space corresponds to an identifier of the descriptor. In this case, the processor can determine the data address of the tensor data according to the content of the descriptor.

In some embodiments, when the data address of the data storage space corresponding to the identifier of the descriptor is a variable address, the descriptor may be also used to indicate the address of N-dimensional tensor data, where the content of the descriptor may further include at least one address parameter representing the address of the tensor data. For example, if the tensor data is 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may vary from different datum points. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of the tensor data includes at least one of the followings: a size of the data storage space of the tensor data in at least one of N dimensions, a size of the storage area in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area where the tensor data is mapped in a 3-dimensional space.

It should be understood that those skilled in the art may select a shape parameter representing tensor data according to actual conditions, which is not limited in the present disclosure.

It should be noted that, for the sake of simple description, the above method embodiments are all described as a series of action combinations. However, those skilled in the art should be aware that the present disclosure is not limited by the described action order, because according to the present disclosure, certain steps may be executed in another order or executed simultaneously. Those skilled in the art should also be aware that the embodiments described in the specification are alternative embodiments and that the actions and modules involved are not necessary in the present disclosure.

It should be further noted that although the steps in the flow charts are shown in sequence as indicated by the arrows, these steps are not necessarily executed in the order indicated by the arrows. Unless specifically stated in the present disclosure, the execution of these steps is not strictly limited in order, and these steps may be executed in other orders. In addition, at least part of the steps in in the flow charts may include a plurality of sub-steps or stages. These sub-steps or stages are not necessarily executed at the same time, but may be executed at different times. The execution of these sub-steps or stages is not necessarily performed sequentially, but may be performed alternately with other steps or at least a part of the sub-steps or stages of other steps.

FIG. 3b3 shows a block diagram of a data synchronization apparatus according to an embodiment of the present disclosure. The data synchronization apparatus is applied to the first processor. As shown in FIG. 3b3, the data synchronization apparatus includes:

a first information determining module 51b configured to determine synchronization information of tensor data according to a descriptor of the tensor data to be synchronized, where the descriptor is used to indicate a shape of the tensor data to be synchronized;

a first instruction generating module 52b configured to generate a synchronization instruction according to the synchronization information of the tensor data; and a first instruction sending module 53b configured to send the synchronization instruction to a second processor, where the synchronization instruction is used to instruct the second processor to obtain the tensor data to be synchronized according to the synchronization instruction.

In some embodiments, the synchronization information includes a storage address of the tensor data to be synchronized. The first instruction generating module includes: a first generating sub-module configured to, when the storage address of the tensor data to be synchronized is in a shared storage space, generate the synchronization instruction according to the storage address of the tensor data to be synchronized, so as to instruct the second processor to obtain the tensor data to be synchronized from the shared storage space.

In some embodiments, the synchronization information includes the storage address of the tensor data to be synchronized. The first instruction generating module includes: a transferring sub-module configured to, when the storage address of the tensor data to be synchronized is in a non-shared storage space, store the tensor data to be synchronized in the shared storage space; and a second generating sub-module configured to, according to the address of the tensor data to be synchronized in the shared storage space, generate the synchronization instruction, so as to instruct the second processor to obtain the tensor data to be synchronized from the shared storage space.

In some embodiments, the data synchronization apparatus further includes: a first descriptor determining module configured to, according to the synchronization request instruction from the second processor, determine the descriptor of the tensor data to be synchronized.

In some embodiments, the synchronization request instruction includes data characteristics of the tensor data to be synchronized. The first descriptor determining module includes: an instruction parsing sub-module configured to parse the synchronization request instruction to obtain the data characteristics of the tensor data to be synchronized; and a first descriptor determining sub-module configured to determine the descriptor of the tensor data to be synchronized according to the data characteristics of the tensor data to be synchronized.

FIG. 3b4 shows a block diagram of a data synchronization apparatus according to an embodiment of the present disclosure. The data synchronization apparatus is applied to a second processor. As shown in FIG. 3b4, the data synchronization apparatus includes:
- a second information determining module 61b configured to parse a synchronization instruction from a first processor to obtain synchronization information of tensor data to be synchronized;
- a second descriptor determining module 62b configured to determine a descriptor of the tensor data to be synchronized according to the synchronization information of the tensor data to be synchronized, where the descriptor is used to indicate a shape of the tensor data to be synchronized; and
- a first data obtaining module 63b configured to obtain the tensor data to be synchronized according to the descriptor of the tensor data to be synchronized.

In some embodiments, the synchronization information includes a storage address of the tensor data to be synchronized. The second descriptor determining module includes: a first determining sub-module configured to determine the identifier of the descriptor of the tensor data to be synchronized and/or the content of the descriptor according to the storage address of the tensor data to be synchronized. The first data obtaining module includes: a first data obtaining sub-module configured to, according to the content of the descriptor of the tensor data to be synchronized, obtain the tensor data to be synchronized from the shared storage space.

FIG. 3b5 shows a block diagram of a data synchronization apparatus according to an embodiment of the present disclosure. The data synchronization apparatus is applied to a second processor. As shown in FIG. 3b5, the data synchronization apparatus includes:
- a second instruction generating module 71b configured to, when there is tensor data to be synchronized, generate a synchronization request instruction, where the synchronization request instruction is used to instruct a first processor to determine a descriptor of the tensor data to be synchronized, and the descriptor is used to indicate a shape of the tensor data to be synchronized; and
- a second instruction sending module 72b configured to send the synchronization request instruction to the first processor.

In some embodiments, the synchronization request instruction includes data characteristics of the tensor data to be synchronized.

In some embodiments, the data synchronization apparatus further includes: a third information determining module configured to parse the synchronization instruction from the first processor to obtain the synchronization information of the tensor data to be synchronized; a third descriptor determining module configured to determine the descriptor of the tensor data to be synchronized according to the synchronization information of the tensor data to be synchronized; and a second data obtaining module configured to obtain the tensor data to be synchronized according to the descriptor of the tensor data to be synchronized.

In some embodiments, the synchronization information includes a storage address of the tensor data to be synchronized. The third descriptor determining module includes: a second determining sub-module configured to determine the identifier of the descriptor of the tensor data to be synchronized and/or the content of the descriptor according to the storage address of the tensor data to be synchronized. The second data obtaining module includes a second data obtaining sub-module configured to, according to the content of the descriptor of the tensor data to be synchronized, obtain the tensor data to be synchronized from the shared storage space.

It should be understood that the apparatus embodiment described above is only schematic, and the apparatus provided in the present disclosure may be implemented in other manners. For example, division of the units/modules is only logical function division and another division manner may be adopted during practical implementation. For example, a plurality of units or components may be combined or integrated into another system or some characteristics may be neglected or not performed.

In addition, unless otherwise specified, each functional unit/module in the embodiments of the disclosure may be integrated into a unit/module, each unit/module may also physically exist independently, and two or more units/modules may also be integrated into one unit/module. The integrated unit/module may be implemented in the form of hardware or a software functional unit/module.

If the integrated unit/module is implemented in the form of hardware, the hardware may be a digital circuit, an analogue circuit, and the like. The physical implementation of hardware may include, but is not limited to, a transistor, a memristor, and the like. Unless otherwise specified, the artificial intelligence processor may be any appropriate hardware processor, such as CPU, GPU, FPGA, DSP, ASIC, and the like. Unless otherwise specified, the storage unit may be any proper magnetic storage medium or magneto-optic storage medium, for example, an RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), an HMC (Hybrid Memory Cube), and the like.

If being implemented in the form of a software program module and sold or used as an independent product, the integrated unit/module may be stored in a computer-readable memory. Based on such an understanding, all or part of the technical solutions may be embodied in form of software product. The computer software product is stored in a memory, including a plurality of instructions configured to enable a computer device (which may be a PC, a server, a network device, or the like) to perform all or part of the operations of the method in each embodiment of the application. The memory may include various media capable of storing program codes such as a U disk, a mobile hard disk, a read-only memory (ROM), a random access memory (RAM), a magnetic disk, or an optical disk.

In some embodiments, the present disclosure provides an artificial intelligence chip including the above-mentioned data synchronization apparatus.

In some embodiments, the present disclosure provides a board card including a storage device, an interface apparatus, a control device, and the above-mentioned artificial intelligence chip. The artificial intelligence chip is connected to the storage device, the control device, and the interface apparatus, respectively; the storage device is configured to store data; the interface apparatus is configured to implement data transfer between the artificial intelligence chip and an external equipment; and the control device is configured to monitor a state of the artificial intelligence chip.

In the above-mentioned embodiments, the description of each embodiment has its own focus. For parts that are not described in detail in an embodiment, please refer to related descriptions of other embodiments. The technical features of the above-mentioned embodiments may be combined arbitrarily. In order to make the description concise, not all possible combinations of the various technical features in the above-mentioned embodiments are described. However, as long as there is no contradiction in the combinations of these technical features, they should be regarded as the scope of this specification.

The foregoing may be better understood according to the following articles:

A1. A data synchronization method applied to a first processor, comprising:
  determining synchronization information of tensor data according to a descriptor of the tensor data to be synchronized, wherein the descriptor is used to indicate a shape of the tensor data to be synchronized;
  generating a synchronization instruction according to the synchronization information of the tensor data; and
  sending the synchronization instruction to a second processor, wherein the synchronization instruction is used to instruct the second processor to obtain the tensor data to be synchronized according to the synchronization instruction.

A2. The data synchronization method of A1, wherein the synchronization information includes a storage address of the tensor data to be synchronized, wherein the generating a synchronization instruction according to the synchronization information of the tensor data includes:
  when the storage address of the tensor data to be synchronized is in a shared storage space, generating the synchronization instruction according to the storage address of the tensor data to be synchronized, so as to instruct the second processor to obtain the tensor data to be synchronized from the shared storage space.

A3. The data synchronization method of A1 or A2, wherein the synchronization information includes the storage address of the tensor data to be synchronized, wherein the generating a synchronization instruction according to the synchronization information of the tensor data includes:
  when the storage address of the tensor data to be synchronized is in a non-shared storage space, storing the tensor data to be synchronized in the shared storage space; and
  according to the address of the tensor data to be synchronized in the shared storage space, generating the synchronization instruction to instruct the second processor to obtain the tensor data to be synchronized from the shared storage space.

A4. The data synchronization method of any one of A1-A3, further comprising:
  determining the descriptor of the tensor data to be synchronized according to a synchronization request instruction from the second processor.

A5. The data synchronization method of A4, wherein the synchronization request instruction includes data characteristics of the tensor data to be synchronized, wherein the determining the descriptor of the tensor data to be synchronized according to the synchronization request instruction from the second processor includes:
  parsing the synchronization request instruction to obtain the data characteristics of the tensor data to be synchronized; and
  determining the descriptor of the tensor data to be synchronized according to the data characteristics of the tensor data to be synchronized.

A6. A data synchronization method applied to a second processor, comprising:
  parsing a synchronization instruction from a first processor to obtain synchronization information of tensor data to be synchronized;
  determining a descriptor of the tensor data to be synchronized according to the synchronization information of the tensor data to be synchronized, wherein the descriptor is used to indicate a shape of the tensor data to be synchronized; and
  obtaining the tensor data to be synchronized according to the descriptor of the tensor data to be synchronized.

A7. The data synchronization method of A6, wherein the synchronization information includes a storage address of the tensor data to be synchronized, wherein
  the determining a descriptor of the tensor data to be synchronized according to the synchronization information of the tensor data to be synchronized includes: determining an identifier of the descriptor of the tensor data to be synchronized and/or content of the descriptor according to the storage address of the tensor data to be synchronized; and
  the obtaining the tensor data to be synchronized according to the descriptor of the tensor data to be synchronized includes: according to the content of the descriptor of the tensor data to be synchronized, obtaining the tensor data to be synchronized from a shared storage space.

A8. A data synchronization method applied to a second processor, comprising:
  when there is tensor data to be synchronized, generating a synchronization request instruction, wherein the synchronization request instruction is used to instruct a first processor to determine a descriptor of the tensor data to be synchronized, and the descriptor is used to indicate a shape of the tensor data to be synchronized; and
  sending the synchronization request instruction to the first processor.

A9. The data synchronization method of A8, wherein the synchronization request instruction includes data characteristics of the tensor data to be synchronized.

A10. The data synchronization method of A8 or A9, further comprising:
  parsing a synchronization instruction from the first processor to obtain synchronization information of the tensor data to be synchronized;
  determining the descriptor of the tensor data to be synchronized according to the synchronization information of the tensor data to be synchronized; and obtaining the tensor data to be synchronized according to the descriptor of the tensor data to be synchronized.

A11. The data synchronization method of A10, wherein the synchronization information includes a storage address of the tensor data to be synchronized, wherein
the determining the descriptor of the tensor data to be synchronized according to the synchronization information of the tensor data to be synchronized includes: determining an identifier of the descriptor of the tensor data to be synchronized and/or content of the descriptor according to the storage address of the tensor data to be synchronized; and
the obtaining the tensor data to be synchronized according to the descriptor of the tensor data to be synchronized includes: according to the content of the descriptor of the tensor data to be synchronized, obtaining the tensor data to be synchronized from a shared storage space.

A12. A data synchronization apparatus applied to a first processor, comprising:
a first information determining module configured to determine synchronization information of tensor data according to a descriptor of the tensor data to be synchronized, wherein the descriptor is used to indicate a shape of the tensor data to be synchronized;
a first instruction generating module configured to generate a synchronization instruction according to the synchronization information of the tensor data; and
a first instruction sending module configured to send the synchronization instruction to a second processor, where the synchronization instruction is used to instruct the second processor to obtain the tensor data to be synchronized according to the synchronization instruction.

A13. The data synchronization apparatus of A12, wherein the synchronization information includes a storage address of the tensor data to be synchronized, wherein the first instruction generating module includes:
a first generating sub-module configured to, when the storage address of the tensor data to be synchronized is in a shared storage space, generate the synchronization instruction according to the storage address of the tensor data to be synchronized, so as to instruct the second processor to obtain the tensor data to be synchronized from the shared storage space.

A14. The data synchronization apparatus of A12 or A13, wherein the synchronization information includes the storage address of the tensor data to be synchronized, wherein the first instruction generating module includes:
a transferring sub-module configured to, when the storage address of the tensor data to be synchronized is in a non-shared storage space, store the tensor data to be synchronized in the shared storage space; and
a second generating sub-module configured to, according to the address of the tensor data to be synchronized in the shared storage space, generate the synchronization instruction to instruct the second processor to obtain the tensor data to be synchronized from the shared storage space.

A15. The data synchronization apparatus of any one of A12-A14, further comprising:
a first descriptor determining module configured to, according to synchronization request instruction from the second processor, determine the descriptor of the tensor data to be synchronized.

A16. The data synchronization apparatus of A15, wherein the synchronization request instruction includes data characteristics of the tensor data to be synchronized, wherein the first descriptor determining module includes:
an instruction parsing sub-module configured to parse the synchronization request instruction to obtain the data characteristics of the tensor data to be synchronized; and
a first descriptor determining sub-module configured to determine the descriptor of the tensor data to be synchronized according to the data characteristics of the tensor data to be synchronized.

A17. A data synchronization apparatus applied to a second processor, comprising:
a second information determining module configured to parse a synchronization instruction from a first processor to obtain synchronization information of tensor data to be synchronized;
a second descriptor determining module configured to determine a descriptor of the tensor data to be synchronized according to the synchronization information of the tensor data to be synchronized, where the descriptor is used to indicate a shape of the tensor data to be synchronized; and
a first data obtaining module configured to obtain the tensor data to be synchronized according to the descriptor of the tensor data to be synchronized.

A18. The data synchronization apparatus of A17, wherein the synchronization information includes a storage address of the tensor data to be synchronized, wherein
the second descriptor determining module includes: a first determining sub-module configured to determine an identifier of the descriptor of the tensor data to be synchronized and/or content of the descriptor according to the storage address of the tensor data to be synchronized; and
the first data obtaining module includes: a first data obtaining sub-module configured to, according to the content of the descriptor of the tensor data to be synchronized, obtain the tensor data to be synchronized from a shared storage space.

A19. A data synchronization apparatus applied to a second processor, comprising:
a second instruction generating module configured to, when there is tensor data to be synchronized, generate a synchronization request instruction, where the synchronization request instruction is used to instruct a first processor to determine a descriptor of the tensor data to be synchronized, and the descriptor is used to indicate a shape of the tensor data to be synchronized; and
a second instruction sending module configured to send the synchronization request instruction to the first processor.

A20. The data synchronization apparatus of A19, wherein the synchronization request instruction includes data characteristics of the tensor data to be synchronized.

A21. The data synchronization apparatus of A19 or A20, further comprising:
a third information determining module configured to parse the synchronization instruction from the first processor to obtain synchronization information of the tensor data to be synchronized;
a third descriptor determining module configured to determine the descriptor of the tensor data to be synchronized according to the synchronization information of the tensor data to be synchronized; and a second data obtaining module configured to obtain the tensor data to be synchronized according to the descriptor of the tensor data to be synchronized.

A22. The data synchronization apparatus of A21, wherein the synchronization information includes a storage address of the tensor data to be synchronized, wherein the third descriptor determining module includes: a second determining sub-module configured to determine an identifier of the descriptor of the tensor data to be synchronized and/or content of the descriptor according to the storage address of the tensor data to be synchronized; and the second data obtaining module includes: a second data obtaining sub-module configured to, according to the content of the descriptor of the tensor data to be synchronized, obtain the tensor data to be synchronized from a shared storage space.

A23. An artificial intelligence chip, comprising the data synchronization apparatus of any one of A12-A22.

A24. An electronic device, comprising the artificial intelligence chip of A23.

A25. A board card, comprising a storage device, an interface apparatus, a control device, and the artificial intelligence chip of A23, wherein the artificial intelligence chip is connected to the storage device, the control device, and the interface apparatus, respectively;

the storage device is configured to store data;

the interface apparatus is configured to implement data transfer between the artificial intelligence chip and an external equipment; and the control device is configured to monitor a state of the artificial intelligence chip.

A26. The board card of A25, wherein the storage device includes a plurality of groups of storage units, wherein each group of the storage units is connected with the artificial intelligence chip by a bus, and the storage units are DDR SDRAMs;

the chip includes a DDR controller configured to control data transfer and data storage of each storage unit; and the interface apparatus is a standard PCIE interface.

With the continuous development of the AI (Artificial Intelligence) technology, it has gradually obtained wide application and worked well in the fields of image recognition, speech recognition, and natural language processing, and the like. However, as the complexity of AI algorithms is growing, the amount of data and data dimensions that need to be processed are increasing, therefore, multi-core and/or multi-chip data are usually required for data processing. When data is synchronized between cores or chips, a synchronization method adopting the related-art may result in large synchronization overhead and low processing efficiency.

In some embodiments, the present disclosure provides a data synchronization method.

Figure 1E:
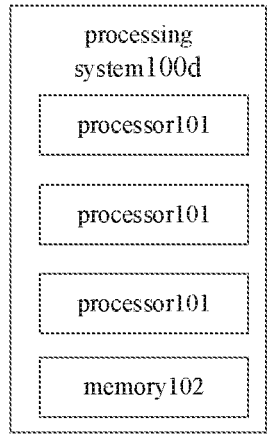
FIG. 1e shows a flowchart of a data synchronization method according to an embodiment of the present disclosure.
Figure 1E:
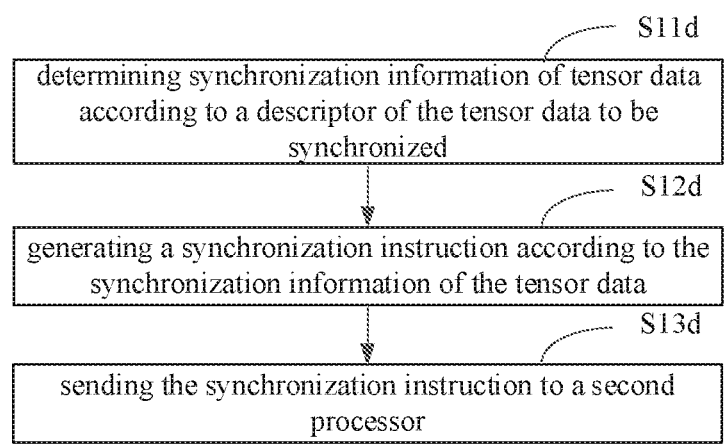
Figure 1E:
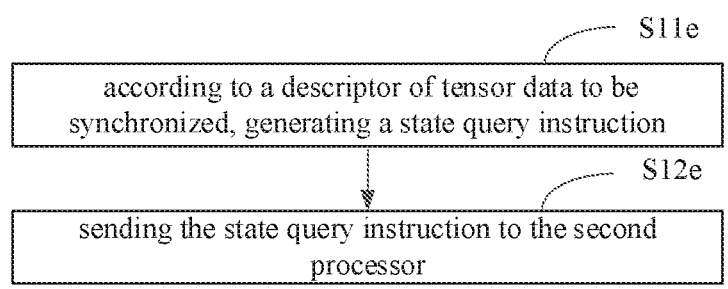
Figure 1F:
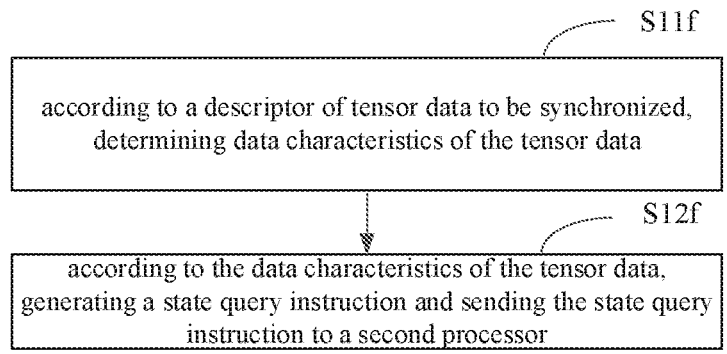
FIG. 1f shows a flowchart of a data synchronization method according to an embodiment of the present disclosure.

FIG. 1e shows a flowchart of a data synchronization method according to an embodiment of the present disclosure. As shown in FIG. 1e, the data synchronization method is applied to a first processor (any processor in a processing system), and the method includes:

a step S11e: according to a descriptor of tensor data to be synchronized, generating a state query instruction, where the descriptor is used to indicate a shape of the tensor data to be synchronized, and the state query instruction is used to instruct a second processor to determine the amount of tensor data to be synchronized and generate a synchronization state instruction, where the state query instruction includes an identifier of the descriptor and/or content of the descriptor;

a step S12e: sending the state query instruction to the second processor.

For example, the data to be synchronized may include N-dimensional tensor data (N is an integer greater than or equal to 0, for example, N=1, 2, or 3).

In some embodiments, during data processing, data synchronization between a plurality of processors (such as a plurality of cores of an artificial intelligence chip) may be executed, for example, an operation result of a processor A1 may be synchronized to a processor A2 as input data of another operation. In this case, a data synchronization mechanism based on the descriptor can be used to achieve data synchronization.

In some embodiments, since a non-shared storage space of each processor allocated to the tensor data to be synchronized may be limited, the tensor data cannot be synchronized at the same time. In this case, part of tensor data can be synchronized firstly, and repeated many times until all of the tensor data are synchronized.

In some embodiments, the first processor among a plurality of processors may be set as the sender of data to be synchronized, and the second processor may be set as the receiver of data synchronization. Both the first processor and the second processor are any of the plurality of processors, and the second processor may be of the same type or different from the first processor. The present disclosure does not limit the type of the first processor and the type of the second processor.

In some embodiments, when there is tensor data to be synchronized in the sender of data to be synchronized, for example, when the first processor completes an operation to obtain the result (tensor data) of the operation, the sender can query the state of the receiver to determine the amount of data that can be contained in the non-shared storage space of the receiver allocated to the tensor data, so that part of tensor data can be synchronized. The first processor among a plurality of processors may be set as the sender of data to be synchronized, and the second processor may be set as the receiver of data synchronization. Both the first processor and the second processor are any of the plurality of processors, and the second processor may be of the same type or different from the first processor. The present disclosure does not limit the type of the first processor and the type of the second processor.

In some embodiments, in the step S11, the first processor may generate the state query instruction according to the descriptor of the tensor data to be synchronized. The state query instruction may include an identifier of the descriptor of the tensor data to be synchronized and/or content of the descriptor, and the state query instruction is used to instruct the second processor to determine and reply its own state (the amount of data that can be synchronized among the tensor data).

In some embodiments, in the step S12e, the first processor may send the state query instruction to the second processor. After receiving the state query instruction, the second processor may parse the instruction to determine the identifier of the descriptor and/or the content of the descriptor. According to the identifier of the descriptor and/or the content of the descriptor, the second processor may determine the tensor data to be synchronized, and then determine the space that can be allocated to the tensor data, and determine the amount of data that can be synchronized among the tensor data. According to the amount of data that can be synchronized among the tensor data and descriptor, the second processor can generate and send a synchronization state instruction, so that the first processor can determine the descriptor of the tensor data to be synchronized and the amount of data that can be synchronized of this time.

By adopting the above-mentioned data synchronization method provided by the present disclosure, the sender of data to be synchronized may actively query the state of the receiver, so that part of data can be synchronized between the sender and the receiver, thereby improving the efficiency of data synchronization.

In some embodiments, the data synchronization method further includes:

when the synchronization state instruction is received from the second processor, determining first sub-data of the tensor data according to the descriptor of the tensor data in the synchronization state instruction and the amount of data that can be synchronized, where the amount of the first sub-data corresponds to the amount of data that can be synchronized; and according to the first sub-data, generating a descriptor synchronization instruction and sending the descriptor synchronization instruction to the second processor to instruct the second processor to obtain the first sub-data.

For example, when receiving the synchronization state instruction from the second processor, the first processor may parse the instruction to obtain the content of the instruction (for example, the identifier of the descriptor, the amount of data that can be synchronized, etc.). According to the identifier of the descriptor, the descriptor of the tensor data to be synchronized can be determined, so as to determine the tensor data to be synchronized; and the part of data that can be synchronized this time (the first sub-data) is determined from the tensor data according to the amount of data that can be synchronized. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization state instruction may also include a range of part of tensor data to be synchronized, such as the content of the descriptor of the part of sub-data or a range of a storage address of the part of sub-data, so as to determine the part of data to be synchronized. The first processor may directly determine the first sub-data to be synchronized according to the range of the part of data.

In some embodiments, the first processor may generate a descriptor synchronization instruction according to the first sub-data and send the descriptor synchronization instruction to the second processor. The descriptor synchronization instruction may include the identifier of the descriptor of the tensor data to be synchronized and the first sub-data. After receiving the descriptor synchronization instruction, the second processor may parse the descriptor synchronization instruction to determine the descriptor of the tensor data to be synchronized and the first sub-data of the tensor data, determine the tensor data to be synchronized according to the descriptor, and store the first sub-data of the tensor data in its own non-shared storage space.

By adopting the above-mentioned data synchronization method provided by the present disclosure, the tensor data can be determined according to the descriptor in the synchronization state instruction, the sub-data synchronized this time can be determined according to the amount of data that can be synchronized of the receiver, and the descriptor synchronization instruction can be generated and sent according to the sub-data, so that the receiver can obtain the sub-data synchronized this time, thereby reducing the synchronization overhead and improving the efficiency of data synchronization.

In some embodiments, the synchronization state instruction includes the identifier of the descriptor. The step of determining first sub-data of the tensor data according to the descriptor of the tensor data in the synchronization state instruction and the amount of data that can be synchronized when the synchronization state instruction is received from the second processor includes:

parsing the synchronization state instruction to obtain the identifier of the descriptor and the amount of data that can be synchronized; and according to the identifier of the descriptor, determining the descriptor of the tensor data to be synchronized.

For example, the synchronization state instruction may include the identifier of the descriptor (for example, the identifier is TR1) and the amount of data that can be synchronized. The first processor may parse the synchronization state instruction to obtain the identifier of the descriptor and the amount of data that can be synchronized, and then determine the descriptor of the tensor data to be synchronized according to the identifier of the descriptor.

By adopting the above-mentioned data synchronization method provided by the present disclosure, the amount of data transmitted during synchronization can be reduced, and the processing efficiency can be improved.

In some embodiments, the step of determining first sub-data of the tensor data according to the descriptor of the tensor data in the synchronization state instruction and the amount of data that can be synchronized when the synchronization state instruction is received from the second processor includes:

determining the tensor data and second sub-data to be synchronized among the tensor data according to the descriptor of the tensor data; and determining the first sub-data according to the second sub-data and the amount of data that can be synchronized in the synchronization state instruction.

For example, the state of data among the tensor data may be set, where the data that has been synchronized may be set to a synchronized state, and the data that has not been synchronized may be set to a to-be-synchronized state. In this case, when receiving the synchronization state instruction from the second processor, the first processor may determine the tensor data to be synchronized according to the descriptor; according to the state of the data among the tensor data, the first processor may determine the second sub-data in the to-be-synchronized state; and according to the second sub-data and the amount of data that can be synchronized indicated by the synchronization state instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing a state of the first sub-data of the tensor data from a to-be synchronized state to a synchronized state.

For example, after the first processor generates the descriptor synchronization instruction according to the first sub-data of the tensor data and sends the descriptor synchronization instruction to the second processor to make the second processor synchronize the first sub-data of the tensor data, the first processor can change the state of data among the tensor data, in other words, the first processor can change the state of the first sub-data from the to-be synchronized state to the synchronized state. In this way, when the state of the second processor is queried next time and the synchronization state instruction of the second processor is received, data to be synchronized next time can be determined from part of data in the to-be-synchronized state, thereby avoiding repeated data synchronization and improving data synchronization efficiency.

FIG. 3c shows a flowchart of a data synchronization method according to an embodiment of the present disclosure. As shown in FIG. 3cd, the data synchronization method is applied to a second processor, and the method includes:
  a step S31c: when a state query instruction is received from a first processor, determining a descriptor of tensor data to be synchronized, where the descriptor is used to indicate a shape of the tensor data to be synchronized;
  a step S32c: determining the amount of data that can be synchronized among the tensor data according to the descriptor of the tensor data;
  a step S33c: according to the descriptor of the tensor data and the amount of data that can be synchronized, generating a synchronization state instruction, where the synchronization state instruction is used to instruct the first processor to determine first sub-data of the tensor data, and the amount of the first sub-data corresponds to the amount of data that can be synchronized; and
  a step S34c: sending the synchronization state instruction to the first processor.

For example, when there is tensor data to be synchronized in a sender of data to be synchronized, the sender may query the state of the receiver. The first processor (sender) may generate and send the state query instruction, and when the second processor receives the state query instruction in step S31c, the second processor may parse the state query instruction to determine the descriptor of the tensor data to be synchronized.

In some embodiments, in the step S32c, the second processor may determine the tensor data to be synchronized according to the descriptor, and determine the amount of data that can be contained in the non-shared storage space of the second processor allocated to the tensor data, i.e., the amount of data can be synchronized, so that part of tensor data can be synchronized.

In some embodiments, in the step S33c, the second processor may generate and send a synchronization state instruction to the first processor according to the determined amount of data that can be synchronized and the descriptor of the tensor data to instruct the first processor to determine the descriptor of the tensor data to be synchronized and the amount of data that can be synchronized this time. After determining the part of the data that can be synchronized this time (i.e., the first sub-data), the first processor may generate the descriptor synchronization instruction and send the descriptor synchronization instruction to the second processor in step S34c, where the descriptor synchronization instruction may include the identifier of the descriptor of the tensor data to be synchronized and the first sub-data.

By adopting the above-mentioned data synchronization method provided by the present disclosure, the sender may query the state of the receiver; after receiving the state query instruction, the receiver determines and responds to its own state (i.e., the amount of data that can be synchronized). In this way, part of tensor data can be synchronized through interaction, which may improve the efficiency of data synchronization.

In some embodiments, the data synchronization method further includes:
  when the descriptor synchronization instruction is received from the first processor, determining the descriptor of the tensor data to be synchronized and first sub-data of the tensor data; and
  according to the descriptor of the tensor data, storing the first sub-data of the tensor data.

For example, when receiving the descriptor synchronization instruction, the second processor may parse the instruction to determine the descriptor of the tensor data to be synchronized and the first sub-data of the tensor data to be synchronized this time; and then the second processor may determine the tensor data to be synchronized according to the descriptor, and store the first sub-data of the tensor data in its own non-shared storage space.

By adopting the above-mentioned data synchronization method provided by the present disclosure, the receiver can determine the descriptor according to the descriptor synchronization instruction and obtain sub-data synchronized this time, thereby reducing synchronization overhead and improving the efficiency of data synchronization.

In some embodiments, the receiver of data synchronization can issue a synchronization request for part of tensor data, in other words, the receiver sends a descriptor synchronization request instruction, where the descriptor synchronization request instruction may determine the descriptor of the tensor data to be synchronized and the amount of data that can be synchronized among the tensor data, i.e., the amount of data that can be contained in the non-shared storage space of the receiver allocated to the tensor data.

In some embodiments, the present disclosure provides a data synchronization method applied to a first processor, including:
  when a descriptor synchronization request instruction is received from a second processor, determining a descriptor of tensor data to be synchronized and the amount of data that can be synchronized among the tensor data, where the descriptor is used to indicate a shape of the tensor data to be synchronized;

determining first sub-data of the tensor data according to the descriptor of the tensor data and the amount of data that can be synchronized, where the amount of the first sub-data corresponds to the amount of data that can be synchronized; and according to the first sub-data, generating a descriptor synchronization instruction and sending the descriptor synchronization instruction to the second processor to instruct the second processor to obtain the first sub-data.

In some embodiments, when receiving the descriptor synchronization request instruction from the second processor, the first processor may parse the instruction to obtain content of the instruction (for example, an identifier of the descriptor of the tensor data to be synchronized, data characteristics of the tensor data to be synchronized, the amount of data that can be synchronized, and the like), thereby determining the descriptor of the tensor data to be synchronized and the amount of data that can be synchronized.

In some embodiments, the first processor may determine the tensor data to be synchronized according to the descriptor, and determine the part of data that can be synchronized this time from the tensor data according to the amount of data that can be synchronized, i.e., the first sub-data. The amount of the first sub-data may correspond to the amount of data that can be synchronized, for example, the amount of the first sub-data may less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the first processor may generate a descriptor synchronization instruction according to the first sub-data and send the descriptor synchronization instruction to the second processor, where the descriptor synchronization instruction may include the identifier of the descriptor of the tensor data to be synchronized and the first sub-data of the tensor data. After receiving the descriptor synchronization instruction, the second processor may parse the instruction to determine the descriptor of the tensor data to be synchronized and the first sub-data of the tensor data, determine the tensor data to be synchronized according to the descriptor, and store the first sub-data of the tensor data in its own non-shared storage space.

According to the above-mentioned data synchronization method provided by the present disclosure, by setting the descriptor indicating the shape of the tensor data, the tensor data can be determined according to the descriptor in the descriptor synchronization request instruction. The sub-data synchronized this time can be determined according to the amount of data that can be synchronized of the receiver, and the descriptor synchronization instruction can be generated and sent according to the sub-data, so that the receiver can obtain the sub-data synchronized this time. In this way, the synchronization overhead can be reduced and the efficiency of data synchronization can be improved.

In some embodiments, the descriptor synchronization request instruction may include the identifier of the descriptor. The step of, when a descriptor synchronization request instruction is received from a second processor, determining a descriptor of tensor data to be synchronized and the amount of data that can be synchronized among the tensor data includes:

parsing the descriptor synchronization request instruction to obtain the identifier of the descriptor and the amount of data that can be synchronized; and determining the descriptor of the tensor data to be synchronized according to the identifier of the descriptor.

For example, if a descriptor indicating the tensor data to be synchronized are registered in the first processor and the second processor, the descriptor synchronization instruction may only include the identifier of the descriptor (for example, the descriptor synchronization instruction may be represented as Send TR1 when the identifier of the descriptor is TR1) and the amount of data that can be synchronized. The first processor may parse the descriptor synchronization request instruction to obtain the identifier of the descriptor and the amount of data that can be synchronized, and then determine the descriptor of the tensor data to be synchronized according to the identifier of the descriptor. In this way, the amount of data transmitted during synchronization can be reduced, and the processing efficiency can be improved.

In some embodiments, the descriptor synchronization request instruction includes the data characteristics of the tensor data to be synchronized. The step of, when a descriptor synchronization request instruction is received from a second processor, determining a descriptor of tensor data to be synchronized and the amount of data that can be synchronized among the tensor data includes:

parsing the descriptor synchronization request instruction to obtain the data characteristics of the tensor data to be synchronized and the amount of data that can be synchronized; and determining the descriptor of the tensor data according to the data characteristics of the tensor data.

For example, if the identifier of the descriptor already registered in the first processor does not correspond to the identifier of the descriptor of the tensor data determined in the descriptor synchronization request instruction, the descriptor synchronization instruction may include the data characteristics of the tensor data to be synchronized, where the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, an address ADDR0-ADDR127), and the shape of the tensor data may be a specified shape (for example, the tensor data may be a 20*10 two-dimensional tensor). Those skilled in the art can set the data characteristics of the tensor data to be synchronized according to the actual situation, which is not limited in the present disclosure.

In some embodiments, according to the data characteristics, the first processor may determine the tensor data to be synchronized, and determine the descriptor of the tensor data to be synchronized, for example, the first processor may directly obtain a descriptor or register a corresponding descriptor. According to the descriptor of the tensor data to be synchronized, the tensor data may be determined, and then the sub-data to be synchronized this time may be determined according to the amount of data that can be synchronized.

By adopting the above-mentioned data synchronization method provided by the present disclosure, the descriptor of the tensor data to be synchronized can be determined according to the data characteristics in the descriptor synchronization request instruction, so as to achieve the synchronization of part of the tensor data. In this way, there is no need to transfer tensor data itself during synchronization, which reduces the amount of transferred data and synchronization overhead, and improves processing the efficiency.

In some embodiments, the step of determining first sub-data of the tensor data according to the descriptor of the tensor data and the amount of data that can be synchronized includes:

determining the tensor data and second sub-data in a to-be-synchronized state among the tensor data according to the descriptor of the tensor data; and determining the first sub-data according to the second sub-data and the amount of data that can be synchronized.

For example, the state of data among the tensor data may be set, where the data that has been synchronized may be set to a synchronized state, and the data that has not been synchronized may be set to a to-be-synchronized state. In this case, when receiving the descriptor synchronization request instruction from the second processor, the first processor may determine the tensor data to be synchronized according to the descriptor; according to the state of the data among the tensor data, the first processor may determine the second sub-data in the to-be-synchronized state; and according to the second sub-data and the amount of data that can be synchronized indicated by the descriptor synchronization request instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing the state of the first sub-data of the tensor data from the to-be synchronized state to the synchronized state.

For example, after the first processor generates the descriptor synchronization instruction according to the first sub-data of the tensor data and sends the descriptor synchronization instruction to the second processor to make the second processor synchronize the first sub-data of the tensor data, the first processor can change the state of data among the tensor data, in other words, the first processor can change the state of the first sub-data from the to-be synchronized state to the synchronized state. In this way, when the synchronization state request of the second processor is received, data to be synchronized next time can be determined from part of data in the to-be-synchronized state, thereby avoiding repeated data synchronization and improving data synchronization efficiency.

In some embodiments, the present disclosure further provides a data synchronization method applied to a second processor, including:

generating a descriptor synchronization request instruction according to a descriptor of tensor data to be synchronized and the amount of data that can be synchronized among the tensor data, where the descriptor is used to indicate a shape of the tensor data to be synchronized, the descriptor synchronization request instruction is used to instruct a first processor to determine the descriptor of the tensor data to be synchronized and first sub-data of the tensor data according to the descriptor synchronization request instruction, and the amount of the first sub-data corresponds to the amount of data that can be synchronized; and sending the descriptor synchronization request instruction to the first processor.

For example, the second processor among a plurality of processors may be set to be a receiver of data synchronization, and the second processor may issue the synchronization request for part of the tensor data. In the step S31c, when there is tensor data to be synchronized in the second processor, the second processor can determine the descriptor of the tensor data and the amount of data that can be contained in the non-shared storage space of the second processor allocated to the tensor data, i.e., the amount of data can be synchronized. According to the descriptor of the tensor data and the amount of data that can be synchronized, the second processor may generate a descriptor synchronization request instruction and send the instruction in the step S32c. The descriptor synchronization request instruction may include at least one of an identifier of the descriptor, content of the descriptor, and data characteristic of the tensor data, and the descriptor synchronization request instruction is used to instruct the first processor to determine the descriptor of the tensor data to be synchronized and the first sub-data of the tensor data.

In some embodiments, when receiving the descriptor synchronization request instruction, the first processor may parse the instruction to determine the descriptor of the tensor data to be synchronized and the amount of data that can be synchronized; the first processor may determine the tensor data to be synchronized according to the descriptor; and the first processor may determine the part of data that can be synchronized this time from the tensor data according to the amount of data that can be synchronized, i.e., the first sub-data. The amount of the first sub-data may correspond to the amount of data that can be synchronized, for example, the amount of the first sub-data may less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the descriptor synchronization request instruction may also include a range of part of tensor data to be synchronized, such as the content of the descriptor of the part of sub-data or a range of a storage address of the part of sub-data, so as to determine the part of data to be synchronized.

By adopting the above-mentioned data synchronization method provided by the present disclosure, the receiver can issue a synchronization request for part of the tensor data, so that the sender can determine the sub-data to be synchronized this time, thereby improving the efficiency of data synchronization.

In some embodiments, the data synchronization method further includes:

when a descriptor synchronization instruction is received from a first processor, determining a descriptor of tensor data to be synchronized and first sub-data of the tensor data; and storing the first sub-data of the tensor data according to the descriptor of the tensor data.

For example, the first processor may generate and send a descriptor synchronization instruction according to the descriptor of the tensor data and the first sub-data. When receiving the descriptor synchronization instruction, the second processor may parse the instruction to determine the descriptor of the tensor data to be synchronized and the first sub-data of the tensor data synchronized this time; and then the second processor may determine the tensor data to be synchronized according to the descriptor, and store the first sub-data of the tensor data in its own non-shared storage space.

By adopting the above-mentioned data synchronization method provided by the present disclosure, the receiver can determine the descriptor according to the descriptor synchronization instruction and obtain sub-data synchronized this time, thereby reducing synchronization overhead and improving the efficiency of data synchronization.

In some embodiments, the identifier and content of the descriptor can be stored in the descriptor storage space, where the descriptor storage space can be a storage space in an internal memory (such as a register, an on-chip SRAM, or other medium cache, etc.) of the processor. The data storage space of the tensor data indicated by the descriptor may be a storage space in the internal memory (such as an on-chip cache) of the processor or a storage space in an external memory (an off-chip memory) connected to the processor. The data address in the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the data storage space corresponding to the descriptor may be a fixed address. For example, a separate data storage space may be allocated for the tensor data, and a start address of each piece of tensor data in the data storage space corresponds to an identifier of the descriptor. In this case, the processor can determine the data address of the tensor data according to the content of the descriptor.

In some embodiments, when the data address of the data storage space corresponding to the identifier of the descriptor is a variable address, the descriptor may be also used to indicate the address of N-dimensional tensor data, where the content of the descriptor may further include at least one address parameter representing the address of the tensor data. For example, if the tensor data is a 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may vary from different datum points. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of the tensor data includes at least one of the followings: a size of the data storage space of the tensor data in at least one of N dimensions, a size of the storage area in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area where the tensor data is mapped in a 3-dimensional space.

It should be understood that those skilled in the art may select a shape parameter representing tensor data according to actual conditions, which is not limited in the present disclosure.

By adopting the above-mentioned data synchronization method provided by the present disclosure, when the space of the receiver of data synchronization is insufficient, part of tensor data can be synchronized firstly, and repeated many times until all of the tensor data are synchronized, which can avoid the problems of overall synchronization failure or synchronization delay of tensor data in the case of insufficient space, and improve the efficiency of data synchronization. In addition, the descriptor indicating the shape of the tensor data is set, and the tensor data is determined according to the descriptor during the data synchronization process, thereby reducing synchronization overhead and reducing the complexity of data access.

It should be noted that, for the sake of simple description, the above method embodiments are all described as a series of action combinations. However, those skilled in the art should be aware that the present disclosure is not limited by the described action order, because according to the present disclosure, certain steps may be executed in another order or executed simultaneously. Those skilled in the art should also be aware that the embodiments described in the specification are alternative embodiments and that the actions and modules involved are not necessary in the present disclosure.

It should be further noted that although the steps in the flow charts are shown in sequence as indicated by the arrows, these steps are not necessarily executed in the order indicated by the arrows. Unless specifically stated in the present disclosure, the execution of these steps is not strictly limited in order, and these steps may be executed in other orders. In addition, at least part of the steps in in the flow charts may include a plurality of sub-steps or stages. These sub-steps or stages are not necessarily executed at the same time, but may be executed at different times. The execution of these sub-steps or stages is not necessarily performed sequentially, but may be performed alternately with other steps or at least a part of the sub-steps or stages of other steps.

FIG. 3c2 shows a block diagram of a data synchronization apparatus according to an embodiment of the present disclosure. The data synchronization apparatus is applied to a first processor. As shown in FIG. 3c2, the data synchronization apparatus includes:

a query instruction generating module 51c configured to, according to a descriptor of tensor data to be synchronized, generate a state query instruction, where the descriptor is used to indicate a shape of the tensor data to be synchronized, and the state query instruction is used to instruct a second processor to determine the amount of tensor data to be synchronized and generate a synchronization state instruction, where the state query instruction includes an identifier of the descriptor and/or content of the descriptor; and a query instruction sending module 52c configured to send the state query instruction to the second processor.

In some embodiments, the data synchronization apparatus further includes:

a sub-data determining module configured to, when the synchronization state instruction is received from the second processor, determine first sub-data of the tensor data according to the descriptor of the tensor data in the synchronization state instruction and the amount of data that can be synchronized, where the amount of the first sub-data corresponds to the amount of data that can be synchronized; and a synchronization instruction generating and sending module configured to, according to the first sub-data, generate a descriptor synchronization instruction and send the descriptor synchronization instruction to the second processor to instruct the second processor to obtain the first sub-data.

In some embodiments, the synchronization state instruction includes an identifier of the descriptor, where the sub-data determining module includes:

a parsing sub-module configured to parse the synchronization state instruction to obtain the identifier of the descriptor and the amount of data that can be synchronized; and a descriptor determining sub-module configured to determine the descriptor of the tensor data to be synchronized according to the identifier of the descriptor.

In some embodiments, the sub-data determining module includes:

a first determining sub-module configured to determine the tensor data and second sub-data to be synchronized among the tensor data according to the descriptor of the tensor data; and a second determining sub-module configured to determine the first sub-data according to the second sub-data and the amount of data that can be synchronized in the synchronization state instruction.

In some embodiments, the data synchronization apparatus further includes:

a state changing module configured to change a state of the first sub-data of the tensor data from a to-be synchronized state to a synchronized state.

FIG. 3c3 shows a block diagram of a data synchronization apparatus according to an embodiment of the present disclosure. The data synchronization apparatus is applied to a second processor. As shown in FIG. 3c3, the data synchronization apparatus includes:

a query instruction receiving module 61c configured to, when a state query instruction is received from a first processor, determine a descriptor of tensor data to be synchronized, where the descriptor is used to indicate a shape of the tensor data to be synchronized;

a data amount determining module 62c configured to, determine the amount of data that can be synchronized among the tensor data according to the descriptor of the tensor data;

a state instruction generating module 63c configured to, according to the descriptor of the tensor data and the amount of data that can be synchronized, generate a synchronization state instruction, where the synchronization state instruction is used to instruct the first processor to determine first sub-data of the tensor data, and the amount of the first sub-data corresponds to the amount of data that can be synchronized; and a state instruction sending module 64c configured to send the synchronization state instruction to the first processor.

In some embodiments, the data synchronization apparatus further includes:

a synchronization instruction receiving module configured to, when the descriptor synchronization instruction is received from the first processor, determine the descriptor of the tensor data to be synchronized and first sub-data of the tensor data; and a data storing module configured to store the first sub-data of the tensor data according to the descriptor of the tensor data.

It should be understood that the apparatus embodiment described above is only schematic, and the apparatus provided in the present disclosure may be implemented in other manners. For example, division of the units/modules is only logical function division and another division manner may be adopted during practical implementation. For example, a plurality of units or components may be combined or integrated into another system or some characteristics may be neglected or not performed.

In addition, unless otherwise specified, each functional unit/module in the embodiments of the disclosure may be integrated into a unit/module, each unit/module may also physically exist independently, and two or more units/modules may also be integrated into one unit/module. The integrated unit/module may be implemented in the form of hardware or a software functional unit/module.

If the integrated unit/module is implemented in the form of hardware, the hardware may be a digital circuit, an analogue circuit, and the like. The physical implementation of hardware may include, but is not limited to, a transistor, a memristor, and the like. Unless otherwise specified, the artificial intelligence processor may be any appropriate hardware processor, such as CPU, GPU, FPGA, DSP, ASIC, and the like. Unless otherwise specified, the storage unit may be any proper magnetic storage medium or magneto-optic storage medium, for example, an RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), an HMC (Hybrid Memory Cube), and the like.

If being implemented in the form of a software program module and sold or used as an independent product, the integrated unit/module may be stored in a computer-readable memory. Based on such an understanding, all or part of the technical solutions may be embodied in form of software product. The computer software product is stored in a memory, including a plurality of instructions configured to enable a computer device (which may be a PC, a server, a network device, or the like) to perform all or part of the operations of the method in each embodiment of the application. The memory may include various media capable of storing program codes such as a U disk, a mobile hard disk, a read-only memory (ROM), a random access memory (RAM), a magnetic disk, or an optical disk.

In some embodiments, the present disclosure provides an artificial intelligence chip including the above-mentioned data synchronization apparatus.

In some embodiments, the present disclosure provides a board card including a storage device, an interface apparatus, a control device, and the above-mentioned artificial intelligence chip. The artificial intelligence chip is connected to the storage device, the control device, and the interface apparatus, respectively; the storage device is configured to store data; the interface apparatus is configured to implement data transfer between the artificial intelligence chip and an external equipment; and the control device is configured to monitor a state of the artificial intelligence chip.

In the above-mentioned embodiments, the description of each embodiment has its own focus. For parts that are not described in detail in an embodiment, please refer to related descriptions of other embodiments. The technical features of the above-mentioned embodiments may be combined arbitrarily. In order to make the description concise, not all possible combinations of the various technical features in the above-mentioned embodiments are described. However, as long as there is no contradiction in the combinations of these technical features, they should be regarded as the scope of this specification.

The foregoing may be better understood according to the following articles:

A1. A data synchronization method applied to a first processor, comprising:

according to a descriptor of tensor data to be synchronized, generating a state query instruction, wherein the descriptor is used to indicate a shape of the tensor data to be synchronized, and the state query instruction is used to instruct a second processor to determine the amount of tensor data to be synchronized and generate a synchronization state instruction, wherein the state query instruction includes an identifier of the descriptor and/or content of the descriptor; and sending the state query instruction to the second processor.

A2. The data synchronization method of A1, further comprising:

when the synchronization state instruction is received from the second processor, determining first sub-data of the tensor data according to the descriptor of the tensor data in the synchronization state instruction and the amount of data that can be synchronized, wherein the amount of the first sub-data corresponds to the amount of data that can be synchronized; and according to the first sub-data, generating a descriptor synchronization instruction and sending the descriptor synchronization instruction to the second processor to instruct the second processor to obtain the first sub-data.

A3. The data synchronization method of A2, wherein the synchronization state instruction includes the identifier of the descriptor, wherein the determining first sub-data of the tensor data according to the descriptor of the tensor data in the synchronization state instruction and the amount of data that can be synchronized when the synchronization state instruction is received from the second processor includes:

parsing the synchronization state instruction to obtain the identifier of the descriptor and the amount of data that can be synchronized; and according to the identifier of the descriptor, determining the descriptor of the tensor data to be synchronized.

A4. The data synchronization method of A2 or A3, wherein the determining first sub-data of the tensor data according to the descriptor of the tensor data in the synchronization state instruction and the amount of data that can be synchronized when the synchronization state instruction is received from the second processor includes:

determining the tensor data and second sub-data to be synchronized among the tensor data according to the descriptor of the tensor data; and determining the first sub-data according to the second sub-data and the amount of data that can be synchronized in the synchronization state instruction.

A5. The data synchronization method of any one of A2-A4, further comprising:

changing a state of the first sub-data of the tensor data from a to-be synchronized state to a synchronized state.

A6. A data synchronization method applied to a second processor, comprising:

when a state query instruction is received from a first processor, determining a descriptor of tensor data to be synchronized, wherein the descriptor is used to indicate a shape of the tensor data to be synchronized;

determining the amount of data that can be synchronized among the tensor data according to the descriptor of the tensor data;

according to the descriptor of the tensor data and the amount of data that can be synchronized, generating a synchronization state instruction, wherein the synchronization state instruction is used to instruct the first processor to determine first sub-data of the tensor data, and the amount of the first sub-data corresponds to the amount of data that can be synchronized; and sending the synchronization state instruction to the first processor.

A7. The data synchronization method of A6, further comprising:

when the descriptor synchronization instruction is received from the first processor, determining the descriptor of the tensor data to be synchronized and first sub-data of the tensor data; and according to the descriptor of the tensor data, storing the first sub-data of the tensor data.

A8. A data synchronization apparatus applied to a first processor, comprising:

a query instruction generating module configured to, according to a descriptor of tensor data to be synchronized, generate a state query instruction, wherein the descriptor is used to indicate a shape of the tensor data to be synchronized, and the state query instruction is used to instruct a second processor to determine the amount of tensor data to be synchronized and generate a synchronization state instruction, wherein the state query instruction includes an identifier of the descriptor and/or content of the descriptor; and a query instruction sending module configured to send the state query instruction to the second processor.

A9. The data synchronization apparatus of A8, further comprising:

a sub-data determining module configured to, when the synchronization state instruction is received from the second processor, determine first sub-data of the tensor data according to the descriptor of the tensor data in the synchronization state instruction and the amount of data that can be synchronized, wherein the amount of the first sub-data corresponds to the amount of data that can be synchronized; and a synchronization instruction generating and sending module configured to, according to the first sub-data, generate a descriptor synchronization instruction and send the descriptor synchronization instruction to the second processor to instruct the second processor to obtain the first sub-data.

A10. The data synchronization apparatus of A9, wherein the synchronization state instruction includes an identifier of the descriptor, wherein the sub-data determining module includes:

a parsing sub-module configured to parse the synchronization state instruction to obtain the identifier of the descriptor and the amount of data that can be synchronized; and a descriptor determining sub-module configured to determine the descriptor of the tensor data to be synchronized according to the identifier of the descriptor.

A11. The data synchronization apparatus of A9 or A10, wherein the sub-data determining module includes:

a first determining sub-module configured to determine the tensor data and second sub-data to be synchronized among the tensor data according to the descriptor of the tensor data; and a second determining sub-module configured to determine the first sub-data according to the second sub-data and the amount of data that can be synchronized in the synchronization state instruction.

A12. The data synchronization apparatus of any one of A9-A11, further comprising:

a state changing module configured to change a state of the first sub-data of the tensor data from a to-be synchronized state to a synchronized state.

A13. A data synchronization apparatus applied to a second processor, comprising:

a query instruction receiving module configured to, when a state query instruction is received from a first processor, determine a descriptor of tensor data to be synchronized, wherein the descriptor is used to indicate a shape of the tensor data to be synchronized;

a determining module of the amount of data configured to, determine the amount of data that can be synchronized among the tensor data according to the descriptor of the tensor data; a state instruction generating module configured to, according to the descriptor of the tensor data and the amount of data that can be synchronized, generate a synchronization state instruction, wherein the synchronization state instruction is used to instruct the first processor to determine first sub-data of the tensor data, and the amount of the first sub-data corresponds to the amount of data that can be synchronized; and a state instruction sending module configured to send the synchronization state instruction to the first processor.

A14. The data synchronization apparatus of A13, further comprising:

a synchronization instruction receiving module configured to, when the descriptor synchronization instruction is received from the first processor, determine the descriptor of the tensor data to be synchronized and first sub-data of the tensor data; and a data storing module configured to store the first sub-data of the tensor data according to the descriptor of the tensor data.

A15. An artificial intelligence chip comprising the data synchronization apparatus of any one of A8-A14.

A16. An electronic device comprising the artificial intelligence chip of A15.

A17. A board card comprising a storage device, an interface apparatus, a control device, and the artificial intelligence chip of A15, wherein the artificial intelligence chip is connected to the storage device, the control device, and the interface apparatus, respectively;

the storage device is configured to store data;

the interface apparatus is configured to implement data transfer between the artificial intelligence chip and an external equipment; and the control device is configured to monitor a state of the artificial intelligence chip.

A18. The board card of A17, wherein the storage device includes a plurality of groups of storage units, wherein each group of the storage units is connected with the artificial intelligence chip by a bus, and the storage units are DDR SDRAMs;

the chip includes a DDR controller configured to control data transfer and data storage of each storage unit; and the interface apparatus is a standard PCIE interface.

With the continuous development of the A1 (Artificial Intelligence) technology, it has gradually obtained wide application and worked well in the fields of image recognition, speech recognition, and natural language processing, and the like. However, as the complexity of A1 algorithms is growing, the amount of data and data dimensions that need to be processed are increasing, therefore, multi-core and/or multi-chip data are usually required for data processing. When data is synchronized between cores or chips, a synchronization method adopting the related-art may result in large synchronization overhead and low processing efficiency.

In some embodiments, the present disclosure provides a data synchronization method.

FIG. 1$f$ shows a flowchart of a data synchronization method according to an embodiment of the present disclosure. As shown in FIG. 1$f$, the data synchronization method is applied to a first processor (any processor in a processing system), and the method includes:

a step S11$f$: according to a descriptor of tensor data to be synchronized, determining data characteristics of the tensor data, where the descriptor is used to indicate a shape of the tensor data to be synchronized; and a step S12$f$: according to the data characteristics of the tensor data, generating a state query instruction and sending the state query instruction to a second processor, where the state query instruction is used to instruct the second processor to determine the amount of tensor data to be synchronized and generate a synchronization state instruction.

For example, the data to be synchronized may include N-dimensional tensor data (N is an integer greater than or equal to 0, for example, N=1, 2, or 3).

In some embodiments, during data processing, data synchronization between a plurality of processors (such as a plurality of cores of an artificial intelligence chip) may be executed, for example, an operation result of a processor A1 may be synchronized to a processor A2 as input data of another operation. In this case, a data synchronization mechanism based on the descriptor can be used to achieve data synchronization.

In some embodiments, since a non-shared storage space of each processor allocated to the tensor data to be synchronized may be limited, the tensor data cannot be synchronized at the same time. In this case, part of tensor data can be synchronized firstly, and repeated many times until all of the tensor data are synchronized.

In some embodiments, when there is tensor data to be synchronized in a sender of data to be synchronized, for example, when an operation is completed and an operation result (tensor data) is obtained, the sender can query the state of the receiver to determine the amount of data that can be contained in the non-shared storage space of the receiver allocated to the tensor data, so that part of tensor data can be synchronized.

In some embodiments, the first processor among a plurality of processors may be set as the sender of data to be synchronized, and the second processor may be set as the receiver of data synchronization. Both the first processor and the second processor are any of the plurality of processors, and the second processor may be of the same type or different from the first processor. The present disclosure does not limit the type of the first processor and the type of the second processor.

In some embodiments, when the first processor determines that there is tensor data to be synchronized, the first processor may obtain the descriptor of the tensor data. The descriptor may be a registered (created) descriptor indicating the shape of the tensor data, or a new descriptor registered (created) according to the shape parameter of the tensor data, which is not limited in the present disclosure.

In some embodiments, in the step S11$f$, according to the descriptor of the tensor data, the first processor may determine the data characteristics of the tensor data. The data characteristics may include at least one of the identifier (for example, a serial number of data), shape, source, and storage address of the tensor data.

In some embodiments, the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, an address ADDR1-ADDR127), and the shape of the tensor data may be a specified shape (for example, the tensor data may be a 20*10 two-dimensional tensor). Those skilled in the art can set the data characteristics of the tensor data to be synchronized according to the actual situation, which is not limited in the present disclosure.

In some embodiments, in the step S12$f$, according to the data characteristics of the tensor data, the first processor may generate a state query instruction and send the state query instruction to the second processor. If the second processor already has information (for example, a descriptor indicating the tensor data to be synchronized has been registered) of the tensor data, the state query instruction may only include part of the data characteristics, such as the identifier of the tensor data, and then the state query instruction may instruct the second processor to determine the descriptor of the tensor data to be synchronized according to the identifier of the tensor data; if the second processor does not have information of the tensor data, the synchronization instruction can include more data characteristics, such as the identifier and storage address of the tensor data, and then the synchronization instruction may instruct the second processor to determine the descriptor of the tensor data to be synchronized. The present disclosure does not limit the specific content included in the state query instruction.

In some embodiments, if the state query instruction includes the identifier of the tensor data, the second processor may determine the tensor data to be synchronized according to the identifier, and register or obtain the descriptor indicating the tensor data to be synchronized. If the state query instruction includes more data characteristics (the identifier and storage address, etc.), the second processor can register the descriptor indicating the tensor data to be synchronized according to the data characteristics in the instruction.

In some embodiments, after determining the descriptor of the tensor data to be synchronized, the second processor may determine the space that can be allocated to the tensor data corresponding to the descriptor, and determine the amount of data that can be synchronized among the tensor data. According to the amount of data that can be synchronized and the data characteristics, the second processor can generate and send a synchronization state instruction, so that the first processor can determine the tensor data to be synchronized and the amount of data that can be synchronized this time.

According to the above-mentioned data synchronization method provided by the present disclosure, by setting the descriptor indicating the shape of the tensor data, the sender can determine the data characteristics of the tensor data according to the descriptor, and generate and send the state query instruction according to the data characteristics to instruct the receiver to feedback its own state (i.e., the amount of data that can be synchronized) according to the state query instruction, therefore, part of tensor data can be synchronized, the synchronization overhead can be reduced without changing the instruction structure, and the efficiency of data synchronization can be improved.

In some embodiments, the data synchronization method further includes:
- when the synchronization state instruction is received from the second processor, parsing the synchronization state instruction to determine the data characteristics of the tensor data to be synchronized and the amount of data that can be synchronized;
- determining the descriptor of the tensor data to be synchronized according to the data characteristics;
- determining first sub-data of the tensor data according to the descriptor and the amount of data that can be synchronized, where the amount of the first sub-data corresponds to the amount of data that can be synchronized; and
- according to the first sub-data, generating a synchronization instruction and sending the synchronization instruction to the second processor to instruct the second processor to obtain the first sub-data.

For example, when receiving the synchronization state instruction from the second processor, the first processor may parse the instruction to obtain content of the instruction, i.e., the data characteristics of the tensor data to be synchronized and the amount of data that can be synchronized. According to the data characteristics, the descriptor of the tensor data to be synchronized can be determined, and then the tensor data to be synchronized can be determined; and the part of data that can be synchronized this time (the first sub-data) is determined from the tensor data according to the amount of data that can be synchronized. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization state instruction may also include a range of part of tensor data to be synchronized, such as a range of a storage address of the part of sub-data, so as to determine the part of data to be synchronized. The first processor may directly determine the first sub-data to be synchronized according to the range of the part of data.

In some embodiments, the first processor may generate a synchronization instruction according to the first sub-data and send the synchronization instruction to the second processor. The synchronization instruction may include the data characteristics of the tensor data to be synchronized and the first sub-data. After receiving the synchronization instruction, the second processor may parse the synchronization instruction to determine the data characteristics of the tensor data to be synchronized and the first sub-data of the tensor data, determine the descriptor according to the data characteristics, and store the first sub-data of the tensor data in its own non-shared storage space.

By adopting the above-mentioned data synchronization method provided by the present disclosure, the descriptor of the tensor data and the amount of data that can be synchronized can be determined according to the synchronization state instruction from the sender; the sub-data synchronized this time can be determined according to the amount of data that can be synchronized; and the synchronization instruction can be generated and sent according to the sub-data, so that the receiver can obtain the sub-data synchronized this time, thereby reducing the synchronization overhead and improving the efficiency of data synchronization.

In some embodiments, the step of determining the first sub-data of the tensor data according to the descriptor and the amount of data that can be synchronized includes:
- according to the descriptor, determining the tensor data to be synchronized and second sub-data in a to-be-synchronized state among the tensor data; and
- determining the first sub-data according to the second sub-data and the amount of data that can be synchronized.

For example, the state of data among the tensor data may be set, where the data that has been synchronized may be set to a synchronized state, and the data that has not been synchronized may be set to a to-be-synchronized state. In this case, when receiving the synchronization state instruction from the second processor, the first processor may determine the second sub-data in the to-be-synchronized state according to the state of the data among the tensor data; and according to the second sub-data and the amount of data that can be synchronized indicated by the synchronization state instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing a state of the first sub-data of the tensor data from a to-be synchronized state to a synchronized state.

For example, after the first processor generates the synchronization instruction according to the first sub-data of the tensor data and sends the descriptor synchronization instruction to the second processor to make the second processor synchronize the first sub-data of the tensor data, the first processor can change the state of data among the tensor data, in other words, the first processor can change the state of the first sub-data from the to-be synchronized state to the synchronized state. In this way, when the state of the second processor is queried next time and the synchronization state instruction of the second processor is received, data to be synchronized next time can be determined from part of data in the to-be-synchronized state, thereby avoiding repeated data synchronization and improving data synchronization efficiency.

FIG. 3$d$1 shows a flowchart of a data synchronization method according to an embodiment of the present disclosure. As shown in FIG. 3$d$1, the data synchronization method is applied to a second processor, and the method includes:
- a step S31$d$: when a state query instruction is received from a first processor, parsing the state query instruction to obtain data characteristics of tensor data to be synchronized;
- a step S32$d$: determining a descriptor of the tensor data to be synchronized according to the data characteristics, where the descriptor is used to indicate a shape of the tensor data to be synchronized;
- a step S33$d$: determining the amount of data that can be synchronized among the tensor data according to the descriptor of the tensor data; and
- a step S34$d$: according to the data characteristics of the tensor data and the amount of data that can be synchronized, generating a synchronization state instruction and sending the synchronization state instruction to the first processor, where the synchronization state instruction is used to instruct the first processor to determine first sub-data of the tensor data, and the amount of the first sub-data corresponds to the amount of data that can be synchronized.

For example, when there is tensor data to be synchronized in a sender of data to be synchronized, the sender may query the state of the receiver. The first processor (sender) may generate and send the state query instruction, and when the second processor receives the state query instruction in step S31$d$, the second processor may parse the state query instruction to determine the data characteristics of the tensor data to be synchronized, where the data characteristics may include at least one of the identifier (for example, a serial number of data), shape, source, and storage address of the tensor data.

In some embodiments, in the step S32$d$, the second processor may determine the descriptor of the tensor data to be synchronized according to the data characteristics. The descriptor may be a registered (created) descriptor indicating the shape of the tensor data, or a new descriptor registered (created) according to the shape parameter of the tensor data, which is not limited in the present disclosure.

In some embodiments, in the step S33$d$, the second processor may determine the tensor data to be synchronized according to the descriptor, and determine the amount of data that can be contained in the non-shared storage space of the second processor allocated to the tensor data, i.e., the amount of data that can be synchronized, so that part of tensor data can be synchronized.

In some embodiments, in the step S34$d$, the second processor may generate and send a synchronization state instruction to the first processor according to the determined amount of data that can be synchronized and the data characteristics of the tensor data, so as to instruct the first processor to determine the amount of data that can be synchronized this time. After determining the part of data (i.e., the first sub-data) that can be synchronized this time, the first processor may generate a synchronization instruction and send the synchronization instruction to the second processor. The synchronization instruction may include the data characteristics of the tensor data to be synchronized and the first sub-data of the tensor data.

By adopting the above-mentioned data synchronization method provided by the present disclosure, the sender may query the state of the receiver; after receiving the state query instruction, the receiver determines and responds to its own state (i.e., the amount of data that can be synchronized). In this way, part of tensor data can be synchronized through interaction, which may improve the efficiency of data synchronization.

In some embodiments, the data synchronization method further includes:
- when a synchronization instruction is received from the first processor, parsing the synchronization instruction to obtain the data characteristics of the tensor data to be synchronized and the first sub-data of the tensor data;
- determining the descriptor of the tensor data according to the data characteristics; and
- storing the first sub-data of the tensor data according to the descriptor of the tensor data.

For example, when receiving the synchronization instruction, the second processor may parse the instruction to determine the data characteristics of the tensor data to be synchronized and the first sub-data of the tensor data to be synchronized this time; according to the data characteristics, the second processor may determine the descriptor of the tensor data to be synchronized, and according to the descriptor, the second processor may determine the tensor data to be synchronized, and then store the first sub-data of the tensor data in its own non-shared storage space.

By adopting the above-mentioned data synchronization method provided by the present disclosure, the receiver can determine the descriptor according to the synchronization instruction and obtain sub-data synchronized this time, thereby reducing synchronization overhead and improving the efficiency of data synchronization.

In some embodiments, the receiver of data synchronization can issue a synchronization request for part of tensor data, in other words, the receiver sends a descriptor synchronization request instruction, where the descriptor synchronization request instruction may determine the descriptor of the tensor data to be synchronized and the amount of data that can be synchronized among the tensor data, i.e., the amount of data that can be contained in the non-shared storage space of the receiver allocated to the tensor data.

In some embodiments, the present disclosure provides a data synchronization method applied to a first processor, including:
- when a synchronization request instruction is received from a second processor, parsing the synchronization request instruction to obtain data characteristics of tensor data to be synchronized and the amount data that can be synchronized among the tensor data;

determining a descriptor of the tensor data to be synchronized according to the data characteristics, where the descriptor is used to indicate a shape of the tensor data to be synchronized;

determining first sub-data of the tensor data according to the descriptor of the tensor data and the amount of data that can be synchronized, where the amount of the first sub-data corresponds to the amount of data that can be synchronized; and according to the first sub-data, generating a synchronization instruction and sending the synchronization instruction to the second processor to instruct the second processor to obtain the first sub-data.

For example, the receiver of data synchronization can issue a synchronization request for part of tensor data, in other words, the receiver sends a synchronization request instruction, where the descriptor synchronization request instruction may determine the data characteristics of the tensor data to be synchronized and the amount of data that can be synchronized among the tensor data, i.e., the amount of data that can be contained in the non-shared storage space of the receiver allocated to the tensor data.

In some embodiments, the first processor among a plurality of processors may be set as the sender of data to be synchronized, and the second processor may be set as the receiver of data synchronization. Both the first processor and the second processor are any of the plurality of processors, and the second processor may be of the same type or different from the first processor. The present disclosure does not limit the type of the first processor and the type of the second processor.

In some embodiments, when receiving the synchronization request instruction from the second processor, the first processor may parse the instruction to obtain content of the instruction, i.e., the data characteristics of the tensor data to be synchronized and the amount of data that can be synchronized, where the data characteristics may include at least one of the identifier (for example, a serial number of data), shape, source, and storage address of the tensor data.

In some embodiments, the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, an address ADDR0-ADDR127), and the shape of the tensor data may be a specified shape (for example, the tensor data may be a 20*10 two-dimensional tensor). Those skilled in the art can set the data characteristics of the tensor data to be synchronized according to the actual situation, which is not limited in the present disclosure.

In some embodiments, the first processor may determine the descriptor of the tensor data to be synchronized according to the data characteristics, and determine the tensor data to be synchronized according to the descriptor, and then determine the part of data that can be synchronized this time from the tensor data according to the amount of data that can be synchronized, i.e., the first sub-data. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization request instruction may also include a range of part of tensor data to be synchronized, such as a range of a storage address of the part of sub-data, so as to determine the part of data to be synchronized. The first processor may directly determine the first sub-data to be synchronized according to the range of the part of data.

In some embodiments, the first processor may generate a synchronization instruction according to the first sub-data and send the synchronization instruction to the second processor. The synchronization instruction may include the data characteristics of the tensor data to be synchronized and the first sub-data. After receiving the synchronization instruction, the second processor may parse the synchronization instruction to determine the data characteristics and the first sub-data, determine the descriptor according to the data characteristics, and determine the tensor data to be synchronized according to the descriptor, and then store the first sub-data of the tensor data in its own non-shared storage space.

By adopting the above-mentioned data synchronization method provided by the present disclosure, the receiver may issue a synchronization request instruction to actively request the synchronization of part of the data, and the sender may determine the sub-data synchronized this time according to the amount of data that can be synchronized received from the receiver. According to the sub-data, the synchronization instruction may be generated and sent, so that the receiver can obtain the sub-data synchronized this time, thereby reducing the synchronization overhead without changing the instruction structure and improving the efficiency of data synchronization.

In some embodiments, the step of determining first sub-data of the tensor data according to the descriptor of the tensor data and the amount of data that can be synchronized includes:

determining the tensor data and second sub-data in a to-be-synchronized state among the tensor data according to the descriptor of the tensor data; and determining the first sub-data according to the second sub-data and the amount of data that can be synchronized.

For example, the state of data among the tensor data may be set, where the data that has been synchronized may be set to a synchronized state, and the data that has not been synchronized may be set to a to-be-synchronized state. In this case, when receiving the synchronization request instruction from the second processor, the first processor may determine the second sub-data in the to-be-synchronized state according to the state of the data among the tensor data; and according to the second sub-data and the amount of data that can be synchronized indicated by the synchronization state instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing a state of the first sub-data of the tensor data from a to-be synchronized state to a synchronized state.

For example, after the first processor generates and sends the synchronization instruction according to the first sub-data of the tensor data, so that the second processor can synchronize the first sub-data of the tensor data, the first processor may change a state of data among the tensor data, in other words, the first processor can change the state of the first sub-data from the to-be synchronized state to the synchronized state. In this way, when receiving the synchronization request instruction from the second processor next time, the first processor can determine data to be synchronized next time from part of data in the to-be-synchronized state, thereby avoiding repeated data synchronization and improving data synchronization efficiency.

In some embodiments, the present disclosure provides a data synchronization method applied to a second processor, including:

according to a descriptor of tensor data to be synchronized, determining data characteristics of the tensor data and the amount of data that can be synchronized among the tensor data, where the descriptor is used to indicate a shape of the tensor data to be synchronized; and according to the data characteristics of the tensor data and the amount of data that can be synchronized, generating a synchronization request instruction and sending the synchronization request instruction to the first processor, where the synchronization request instruction is used to instruct the first processor to determine the tensor data to be synchronized and first sub-data of the tensor data according to the synchronization request instruction, and the amount of the first sub-data corresponds to the amount of data that can be synchronized.

For example, a receiver of data to be synchronized (i.e., the second processor) may issue a synchronization request for part of the tensor data. When there is tensor data to be synchronized in the second processor, the descriptor of the tensor data can be determined. The descriptor may be a registered (created) descriptor indicating the shape of the tensor data, or a new descriptor registered (created) according to the shape parameter of the tensor data, which is not limited in the present disclosure.

In some embodiments, the second processor may determine the data characteristics of the tensor data according to the descriptor, where the data characteristics may include at least one of the identifier (for example, a serial number of data), shape, source, and storage address of the tensor data. In addition, the second processor can determine the amount of data that can be contained in the non-shared storage space of the second processor allocated to the tensor data, i.e., the amount of data can be synchronized.

In some embodiments, according to the data characteristics of the tensor data and the amount of data that can be synchronized, the second processor may generate a synchronization request instruction and send the instruction, where the synchronization request instruction is used to instruct the first processor to determine the tensor data to be synchronized and the first sub-data of the tensor data.

In some embodiments, when receiving the synchronization request instruction, a receiver of data to be synchronized (i.e., the first processor) may parse the instruction to determine the data characteristics of the tensor data to be synchronized and the amount of data that can be synchronized, according to the data characteristics, the receiver may determine the descriptor of the tensor data to be synchronized; according to the descriptor, the receiver may determine the tensor data to be synchronized, and determine the part of data that can be synchronized this time among the tensor data according to the amount of data that can be synchronized, i.e., the first sub-data. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization request instruction may also include a range of part of tensor data to be synchronized, such as content of the descriptor of the part of sub-data and a range of a storage address of the part of sub-data, so as to determine the part of data to be synchronized.

By adopting the above-mentioned data synchronization method provided by the present disclosure, the receiver may issue a synchronization request for part of the tensor data, so that the sender can determine the sub-data synchronized this time, thereby improving the efficiency of data synchronization.

In some embodiments, the data synchronization method further includes:

when a synchronization instruction is received from a first processor, parsing the synchronization instruction to obtain data characteristics of tensor data to be synchronized and first sub-data of the tensor data;

determining the descriptor of the tensor data according to the data characteristics; and storing the first sub-data of the tensor data according to the descriptor of the tensor data.

For example, the first processor may generate and send the synchronization instruction according to the data characteristics of the tensor data and the first sub-data. When receiving the synchronization instruction, the second processor may parse the instruction to determine the data characteristics of the tensor data to be synchronized and the first sub-data of the tensor data synchronized this time; according to the data characteristics, the second processor may determine the descriptor, and then determine the tensor data to be synchronized according to the descriptor; and the second processor may store the first sub-data of the tensor data in its own non-shared storage space.

By adopting the above-mentioned data synchronization method provided by the present disclosure, according to the synchronization instruction, the receiver can determine the descriptor and obtain the sub-data synchronized this time, thereby reducing the synchronization overhead, improving the efficiency of data synchronization, and achieving instruction compatibility during instruction transfer and processing.

In some embodiments, the identifier and content of the descriptor can be stored in the descriptor storage space, where the descriptor storage space can be a storage space in an internal memory (such as a register, an on-chip SRAM, or other medium cache, etc.) of the processor. The data storage space of the tensor data indicated by the descriptor may be a storage space in the internal memory (such as an on-chip cache) of the processor or a storage space in an external memory (an off-chip memory) connected to the processor. The data address in the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the data storage space corresponding to the descriptor may be a fixed address. For example, a separate data storage space may be allocated for the tensor data, and a start address of each piece of tensor data in the data storage space corresponds to an identifier of the descriptor. In this case, the processor can determine the data address of the tensor data according to the content of the descriptor.

In some embodiments, when the data address of the data storage space corresponding to the identifier of the descriptor is a variable address, the descriptor may be also used to indicate the address of N-dimensional tensor data, where the content of the descriptor may further include at least one address parameter representing the address of the tensor data. For example, if the tensor data is a 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may vary from different datum points. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of the tensor data includes at least one of the followings: a size of the data storage space of the tensor data in at least one of N dimensions, a size of the storage area in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area where the tensor data is mapped in a 3-dimensional space.

It should be understood that those skilled in the art may select a shape parameter representing tensor data according to actual conditions, which is not limited in the present disclosure.

By adopting the above-mentioned data synchronization method provided by the present disclosure, when the space of the receiver of data synchronization is insufficient, part of tensor data can be synchronized firstly, and repeated many times until all of the tensor data are synchronized, which can avoid the problems of overall synchronization failure or synchronization delay of tensor data in the case of insufficient space, and improve the efficiency of data synchronization. In addition, the descriptor indicating the shape of the tensor data is set, and the tensor data is determined according to the descriptor during the data synchronization process, thereby reducing synchronization overhead and reducing the complexity of data access, and achieving the instruction compatibility during transfer and processing process.

It should be noted that, for the sake of simple description, the above method embodiments are all described as a series of action combinations. However, those skilled in the art should be aware that the present disclosure is not limited by the described action order, because according to the present disclosure, certain steps may be executed in another order or executed simultaneously. Those skilled in the art should also be aware that the embodiments described in the specification are alternative embodiments and that the actions and modules involved are not necessary in the present disclosure.

It should be further noted that although the steps in the flow charts are shown in sequence as indicated by the arrows, these steps are not necessarily executed in the order indicated by the arrows. Unless specifically stated in the present disclosure, the execution of these steps is not strictly limited in order, and these steps may be executed in other orders. In addition, at least part of the steps in in the flow charts may include a plurality of sub-steps or stages. These sub-steps or stages are not necessarily executed at the same time, but may be executed at different times. The execution of these sub-steps or stages is not necessarily performed sequentially, but may be performed alternately with other steps or at least a part of the sub-steps or stages of other steps.

FIG. 3*d*2 shows a block diagram of a data synchronization apparatus according to an embodiment of the present disclosure. The data synchronization apparatus is applied to a first processor. As shown in FIG. 3*d*2, the data synchronization apparatus includes:
- a characteristic determining module 51*d* configured to, according to a descriptor of tensor data to be synchronized, determine data characteristics of the tensor data, where the descriptor is used to indicate a shape of the tensor data to be synchronized; and
- a query instruction generating and sending module 52*d* configured to, according to the data characteristics of the tensor data, generate a state query instruction and send the state query instruction to a second processor, where the state query instruction is used to instruct the second processor to determine the amount of tensor data to be synchronized and generate a synchronization state instruction.

In some embodiments, the data synchronization apparatus further includes:
- a state instruction parsing module configured to, when the synchronization state instruction is received from the second processor, parse the synchronization state instruction to determine the data characteristics of the tensor data to be synchronized and the amount of data that can be synchronized;
- a first descriptor determining module configured to determine the descriptor of the tensor data to be synchronized according to the data characteristics;
- a data determining module configured to determine first sub-data of the tensor data according to the descriptor and the amount of data that can be synchronized, where the amount of the first sub-data corresponds to the amount of data that can be synchronized; and
- a synchronization instruction generating and sending module configured to, according to the first sub-data, generate a synchronization instruction and send the synchronization instruction to the second processor to instruct the second processor to obtain the first sub-data.

In some embodiments, the data determining module includes:
- a first determining sub-module configured to, according to the descriptor, determine the tensor data to be synchronized and the second sub-data in a to-be-synchronized state among the tensor data; and
- a second determining sub-module configured to determine the first sub-data according to the second sub-data and the amount of data that can be synchronized.

In some embodiments, the data synchronization apparatus includes:
- a state changing module configured to change a state of the first sub-data of the tensor data from a to-be synchronized state to a synchronized state.

FIG. 3*d*3 shows a block diagram of a data synchronization apparatus according to an embodiment of the present disclosure. The data synchronization apparatus is applied to a second processor. As shown in FIG. 3*d*3, the data synchronization apparatus includes:
- a query instruction parsing module 61*d* configured to, when a state query instruction is received from a first processor, parse the state query instruction to obtain data characteristics of tensor data to be synchronized;
- a second descriptor determining module 62*d* configured to determine a descriptor of the tensor data to be synchronized according to the data characteristics, where the descriptor is used to indicate a shape of the tensor data to be synchronized;
- a determining module 63*d* of the amount of data configured to determine the amount of data that can be synchronized among the tensor data according to the descriptor of the tensor data; and
- a state instruction generating and sending module 64*d* configured to, according to the data characteristics of the tensor data and the amount of data that can be synchronized, generate a synchronization state instruction and sending the synchronization state instruction to the first processor, where the synchronization state instruction is used to instruct the first processor to determine first sub-data of the tensor data, and the amount of the first sub-data corresponds to the amount of data that can be synchronized.

In some embodiments, the data synchronization apparatus further includes:
- a synchronization instruction parsing module configured to, when a synchronization instruction is received from the first processor, parse the synchronization instruction to obtain the data characteristics of the tensor data to be synchronized and the first sub-data of the tensor data;
- a third descriptor determining module configured to determine the descriptor of the tensor data according to the data characteristics; and
- a data storing module configured to store the first sub-data of the tensor data according to the descriptor of the tensor data.

It should be understood that the apparatus embodiment described above is only schematic, and the apparatus provided in the present disclosure may be implemented in other manners. For example, division of the units/modules is only logical function division and another division manner may be adopted during practical implementation. For example, a plurality of units or components may be combined or integrated into another system or some characteristics may be neglected or not performed.

In addition, unless otherwise specified, each functional unit/module in the embodiments of the disclosure may be integrated into a unit/module, each unit/module may also physically exist independently, and two or more units/modules may also be integrated into one unit/module. The integrated unit/module may be implemented in the form of hardware or a software functional unit/module.

If the integrated unit/module is implemented in the form of hardware, the hardware may be a digital circuit, an analogue circuit, and the like. The physical implementation of hardware may include, but is not limited to, a transistor, a memristor, and the like. Unless otherwise specified, the artificial intelligence processor may be any appropriate hardware processor, such as CPU, GPU, FPGA, DSP, ASIC, and the like. Unless otherwise specified, the storage unit may be any proper magnetic storage medium or magneto-optic storage medium, for example, an RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), an HMC (Hybrid Memory Cube), and the like.

If being implemented in the form of a software program module and sold or used as an independent product, the integrated unit/module may be stored in a computer-readable memory. Based on such an understanding, all or part of the technical solutions may be embodied in form of software product. The computer software product is stored in a memory, including a plurality of instructions configured to enable a computer device (which may be a PC, a server, a network device, or the like) to perform all or part of the operations of the method in each embodiment of the application. The memory may include various media capable of storing program codes such as a U disk, a mobile hard disk, a read-only memory (ROM), a random access memory (RAM), a magnetic disk, or an optical disk.

In some embodiments, the present disclosure provides an artificial intelligence chip including the above-mentioned data synchronization apparatus.

In some embodiments, the present disclosure provides a board card including a storage device, an interface apparatus, a control device, and the above-mentioned artificial intelligence chip. The artificial intelligence chip is connected to the storage device, the control device, and the interface apparatus, respectively; the storage device is configured to store data; the interface apparatus is configured to implement data transfer between the artificial intelligence chip and an external equipment; and the control device is configured to monitor a state of the artificial intelligence chip.

In the above-mentioned embodiments, the description of each embodiment has its own focus. For parts that are not described in detail in an embodiment, please refer to related descriptions of other embodiments. The technical features of the above-mentioned embodiments may be combined arbitrarily. In order to make the description concise, not all possible combinations of the various technical features in the above-mentioned embodiments are described. However, as long as there is no contradiction in the combinations of these technical features, they should be regarded as the scope of this specification.

The foregoing may be better understood according to the following articles:

A1. A data synchronization method applied to a first processor, comprising:
  according to a descriptor of tensor data to be synchronized, determining data characteristics of the tensor data, wherein the descriptor is used to indicate a shape of the tensor data to be synchronized; and
  according to the data characteristics of the tensor data, generating a state query instruction and sending the state query instruction to a second processor, wherein the state query instruction is used to instruct the second processor to determine the amount of tensor data to be synchronized and generate a synchronization state instruction.

A2. The data synchronization method of A1, further comprising:
  when the synchronization state instruction is received from the second processor, parsing the synchronization state instruction to determine data characteristics of the tensor data to be synchronized and the amount of data that can be synchronized;
  determining the descriptor of the tensor data to be synchronized according to the data characteristics;
  determining first sub-data of the tensor data according to the descriptor and the amount of data that can be synchronized, wherein the amount of the first sub-data corresponds to the amount of data that can be synchronized; and
  according to the first sub-data, generating a synchronization instruction and sending the synchronization instruction to the second processor to instruct the second processor to obtain the first sub-data.

A3. The data synchronization method of A2, wherein the determining first sub-data of the tensor data according to the descriptor and the amount of data that can be synchronized includes:
  according to the descriptor, determining the tensor data to be synchronized and second sub-data in a to-be-synchronized state among the tensor data; and
  determining the first sub-data according to the second sub-data and the amount of data that can be synchronized.

A4. The data synchronization method of A2 or A3, further comprising:
  changing a state of the first sub-data of the tensor data from a to-be synchronized state to a synchronized state.

A5. A data synchronization method applied to a second processor, comprising:
  when a state query instruction is received from a first processor, parsing the state query instruction to obtain data characteristics of tensor data to be synchronized;
  determining a descriptor of the tensor data to be synchronized according to the data characteristics, wherein the descriptor is used to indicate a shape of the tensor data to be synchronized;
  determining the amount of data that can be synchronized among the tensor data according to the descriptor of the tensor data; and
  according to the data characteristics of the tensor data and the amount of data that can be synchronized, generating a synchronization state instruction and sending the synchronization state instruction to the first processor, wherein the synchronization state instruction is used to instruct the first processor to determine first sub-data of the tensor data, and the amount of the first sub-data corresponds to the amount of data that can be synchronized.

A6. The data synchronization method of A5, further comprising:
when a synchronization instruction is received from the first processor, parsing the synchronization instruction to obtain the data characteristics of the tensor data to be synchronized and the first sub-data of the tensor data;
determining the descriptor of the tensor data according to the data characteristic; and
storing the first sub-data of the tensor data according to the descriptor of the tensor data.

A7. A data synchronization apparatus applied to a first processor, comprising:
a characteristic determining module configured to, according to a descriptor of tensor data to be synchronized, determine data characteristics of the tensor data, wherein the descriptor is used to indicate a shape of the tensor data to be synchronized; and
a query instruction generating and sending module configured to, according to the data characteristics of the tensor data, generate a state query instruction and send the state query instruction to a second processor, wherein the state query instruction is used to instruct the second processor to determine the amount of tensor data to be synchronized and generate a synchronization state instruction.

A8. The data synchronization apparatus of A7, further comprising:
a state instruction parsing module configured to, when the synchronization state instruction is received from the second processor, parse the synchronization state instruction to determine the data characteristics of the tensor data to be synchronized and the amount of data that can be synchronized;
a first descriptor determining module configured to determine the descriptor of the tensor data to be synchronized according to the data characteristics;
a data determining module configured to determine first sub-data of the tensor data according to the descriptor and the amount of data that can be synchronized, wherein the amount of the first sub-data corresponds to the amount of data that can be synchronized; and
a synchronization instruction generating and sending module configured to, according to the first sub-data, generate a synchronization instruction and send the synchronization instruction to the second processor to instruct the second processor to obtain the first sub-data.

A9. The data synchronization apparatus of A8, wherein the data determining module includes:
a first determining sub-module configured to, according to the descriptor, determine the tensor data to be synchronized and the second sub-data in a to-be-synchronized state among the tensor data;
a second determining sub-module configured to determine the first sub-data according to the second sub-data and the amount of data that can be synchronized.

A10. The data synchronization apparatus of A8 or A9, further comprising:
a state changing module configured to change a state of the first sub-data of the tensor data from a to-be synchronized state to a synchronized state.

A11. A data synchronization apparatus applied to a second processor, comprising:
a query instruction parsing module configured to, when a state query instruction is received from a first processor, parse the state query instruction to obtain data characteristics of tensor data to be synchronized;
a second descriptor determining module configured to determine a descriptor of the tensor data to be synchronized according to the data characteristics, wherein the descriptor is used to indicate a shape of the tensor data to be synchronized;
a data amount determining module configured to determine the amount of data that can be synchronized among the tensor data according to the descriptor of the tensor data; and
a state instruction generating and sending module configured to, according to the data characteristics of the tensor data and the amount of data that can be synchronized, generate a synchronization state instruction and send the synchronization state instruction to the first processor, wherein the synchronization state instruction is used to instruct the first processor to determine first sub-data of the tensor data, and the amount of the first sub-data corresponds to the amount of data that can be synchronized.

A12. The data synchronization apparatus of A11, further comprising:
a synchronization instruction parsing module configured to, when a synchronization instruction is received from the first processor, parse the synchronization instruction to obtain the data characteristics of the tensor data to be synchronized and the first sub-data of the tensor data;
a third descriptor determining module configured to determine the descriptor of the tensor data according to the data characteristics; and
a data storing module configured to store the first sub-data of the tensor data according to the descriptor of the tensor data.

A13. An artificial intelligence chip, comprising the data synchronization apparatus of any one of A7-A12.

A14. An electronic device, comprising the artificial intelligence chip of A13.

A15. A board card, comprising a storage device, an interface apparatus, a control device, and the artificial intelligence chip of A13, wherein
the artificial intelligence chip is connected to the storage device, the control device, and the interface apparatus, respectively;
the storage device is configured to store data;
the interface apparatus is configured to implement data transfer between the artificial intelligence chip and an external equipment; and
the control device is configured to monitor a state of the artificial intelligence chip.

A16. The board card of A15, wherein
the storage device includes a plurality of groups of storage units, wherein each group of the storage units is connected with the artificial intelligence chip by a bus, and the storage units are DDR SDRAMs;
the chip includes a DDR controller configured to control data transfer and data storage of each storage unit; and
the interface apparatus is a standard PCIE interface.

With the continuous development of the AI (Artificial Intelligence) technology, it has gradually obtained wide application and worked well in the fields of image recognition, speech recognition, and natural language processing, and the like. However, as the complexity of AI algorithms is growing, the amount of data and data dimensions that need to be processed are increasing, therefore, multi-core and/or multi-chip data are usually required for data processing. When data is synchronized between cores or chips, a synchronization method adopting the related-art may result in large synchronization overhead and low processing efficiency.

Figure 1G:
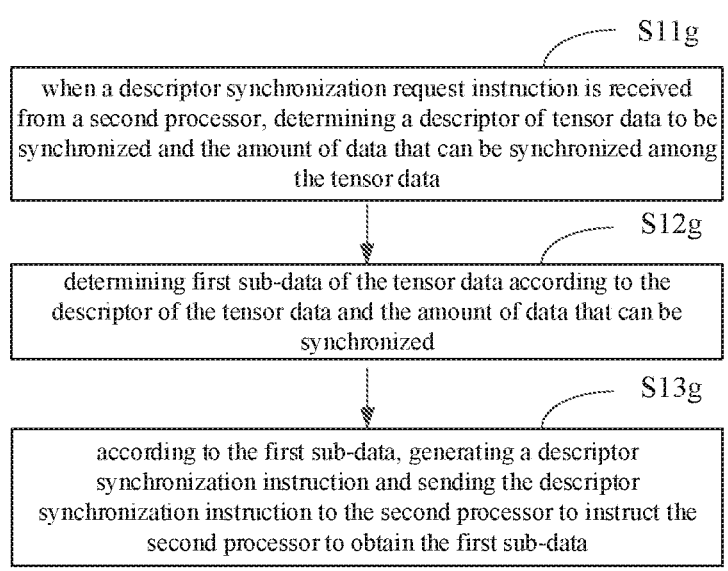
FIG. 1g shows a flowchart of a data synchronization method according to an embodiment of the present disclosure.

In some embodiments, the present disclosure provides a data synchronization method. FIG. 1g shows a flowchart of a data synchronization method according to an embodiment of the present disclosure. As shown in FIG. 1g, the data synchronization method is applied to a first processor (any processor in a processing system), and the method includes:

a step S11g: when a descriptor synchronization request instruction is received from a second processor, determining a descriptor of tensor data to be synchronized and the amount of data that can be synchronized among the tensor data, where the descriptor is used to indicate a shape of the tensor data to be synchronized;

a step S12g: determining first sub-data of the tensor data according to the descriptor of the tensor data and the amount of data that can be synchronized, where the amount of the first sub-data corresponds to the amount of data that can be synchronized; and a step S13g: according to the first sub-data, generating a descriptor synchronization instruction and sending the descriptor synchronization instruction to the second processor to instruct the second processor to obtain the first sub-data.

For example, the data to be synchronized may include N-dimensional tensor data (N is an integer greater than or equal to 0, for example, N=1, 2, or 3).

In some embodiments, during data processing, data synchronization between a plurality of processors (such as a plurality of cores of an artificial intelligence chip) may be executed, for example, an operation result of a processor A1 may be synchronized to a processor A2 as input data of another operation. In this case, a data synchronization mechanism based on the descriptor can be used to achieve data synchronization.

In some embodiments, since a non-shared storage space of each processor allocated to the tensor data to be synchronized may be limited, the tensor data cannot be synchronized at the same time. In this case, part of tensor data can be synchronized firstly, and repeated many times until all of the tensor data are synchronized.

In some embodiments, the receiver of data synchronization can issue a synchronization request for part of tensor data, in other words, the receiver sends a descriptor synchronization request instruction, where the descriptor synchronization request instruction may determine the descriptor of the tensor data to be synchronized and the amount of data that can be synchronized among the tensor data, i.e., the amount of data that can be contained in the non-shared storage space of the receiver allocated to the tensor data.

In some embodiments, the first processor among a plurality of processors may be set as the sender of data to be synchronized, and the second processor may be set as the receiver of data synchronization. Both the first processor and the second processor are any of the plurality of processors, and the second processor may be of the same type or different from the first processor. The present disclosure does not limit the type of the first processor and the type of the second processor.

In some embodiments, in the step S11g, when receiving the descriptor synchronization request instruction from the second processor, the first processor may parse the instruction to obtain content of the instruction (for example, an identifier of the descriptor of the tensor data to be synchronized, data characteristics of the tensor data to be synchronized, the amount of data that can be synchronized, and the like), thereby determining the descriptor of the tensor data to be synchronized and the amount of data that can be synchronized.

In some embodiments, in the step S12g, the first processor may determine the tensor data to be synchronized according to the descriptor, and determine the part of data that can be synchronized this time from the tensor data according to the amount of data that can be synchronized, i.e., the first sub-data. The amount of the first sub-data may correspond to the amount of data that can be synchronized, for example, the amount of the first sub-data may less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, in the step S13g, the first processor may generate a descriptor synchronization instruction according to the first sub-data and send the descriptor synchronization instruction to the second processor, where the descriptor synchronization instruction may include the identifier of the descriptor of the tensor data to be synchronized and the first sub-data of the tensor data. After receiving the descriptor synchronization instruction, the second processor may parse the instruction to determine the descriptor of the tensor data to be synchronized and the first sub-data of the tensor data, determine the tensor data to be synchronized according to the descriptor, and store the first sub-data of the tensor data in its own non-shared storage space.

According to the above-mentioned data synchronization method provided by the present disclosure, by setting the descriptor indicating the shape of the tensor data, the tensor data can be determined according to the descriptor in the descriptor synchronization request instruction. The sub-data synchronized this time can be determined according to the amount of data that can be synchronized of the receiver, and the descriptor synchronization instruction can be generated and sent according to the sub-data, so that the receiver can obtain the sub-data synchronized this time. In this way, the synchronization overhead can be reduced and the efficiency of data synchronization can be improved.

In some embodiments, the descriptor synchronization request instruction may include an identifier of the descriptor. The step S11g includes:

parsing the descriptor synchronization request instruction to obtain the identifier of the descriptor and the amount of data that can be synchronized; and determining the descriptor of the tensor data to be synchronized according to the identifier of the descriptor.

For example, if a descriptor indicating the tensor data to be synchronized are registered in the first processor and the second processor, the descriptor synchronization instruction may only include the identifier of the descriptor (for example, the descriptor synchronization instruction may be represented as Send TR1 when the identifier of the descriptor is TR1) and the amount of data that can be synchronized. The first processor may parse the descriptor synchronization request instruction to obtain the identifier of the descriptor and the amount of data that can be synchronized, and then determine the descriptor of the tensor data to be synchronized according to the identifier of the descriptor. In this way, the amount of data transmitted during synchronization can be reduced, and the processing efficiency can be improved.

In some embodiments, the descriptor synchronization request instruction includes the data characteristics of the tensor data to be synchronized. The step S11g includes:

parsing the descriptor synchronization request instruction to obtain the data characteristics of the tensor data to be synchronized and the amount of data that can be synchronized; and determining the descriptor of the tensor data according to the data characteristics of the tensor data.

For example, if the identifier of the descriptor already registered in the first processor does not correspond to the identifier of the descriptor of the tensor data determined in the descriptor synchronization request instruction, the descriptor synchronization instruction may include the data characteristics of the tensor data to be synchronized, where the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, an address ADDR0-ADDR127), and the shape of the tensor data may be a specified shape (for example, the tensor data may be a 20*10 two-dimensional tensor). Those skilled in the art can set the data characteristics of the tensor data to be synchronized according to the actual situation, which is not limited in the present disclosure.

In some embodiments, according to the data characteristics, the first processor may determine the tensor data to be synchronized, and determine the descriptor of the tensor data to be synchronized, for example, the first processor may directly obtain a descriptor or register a corresponding descriptor. According to the descriptor of the tensor data to be synchronized, the tensor data may be determined, and then the sub-data to be synchronized this time may be determined according to the amount of data that can be synchronized.

By adopting the above-mentioned data synchronization method provided by the present disclosure, the descriptor of the tensor data to be synchronized can be determined according to the data characteristics in the descriptor synchronization request instruction, so as to achieve the synchronization of part of the tensor data. In this way, there is no need to transfer tensor data itself during synchronization, which reduces the amount of transferred data and synchronization overhead, and improves processing the efficiency.

In some embodiments, the step S12g includes:

determining the tensor data and second sub-data in a to-be-synchronized state among the tensor data according to the descriptor of the tensor data; and determining the first sub-data according to the second sub-data and the amount of data that can be synchronized.

For example, the state of data among the tensor data may be set, where the data that has been synchronized may be set to a synchronized state, and the data that has not been synchronized may be set to a to-be-synchronized state. In this case, when receiving the descriptor synchronization request instruction from the second processor, the first processor may determine the tensor data to be synchronized according to the descriptor; according to the state of the data among the tensor data, the first processor may determine the second sub-data in the to-be-synchronized state; and according to the second sub-data and the amount of data that can be synchronized indicated by the descriptor synchronization request instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing the state of the first sub-data of the tensor data from the to-be synchronized state to the synchronized state.

For example, after the first processor generates the descriptor synchronization instruction according to the first sub-data of the tensor data and sends the descriptor synchronization instruction to the second processor to make the second processor synchronize the first sub-data of the tensor data, the first processor can change the state of data among the tensor data. In other words, the first processor can change the state of the first sub-data from the to-be synchronized state to the synchronized state. In this way, when the synchronization state request of the second processor is received, data to be synchronized next time can be determined from part of data in the to-be-synchronized state, thereby avoiding repeated data synchronization and improving data synchronization efficiency.

FIG. 3e1 shows a flowchart of a data synchronization method according to an embodiment of the present disclosure. As shown in FIG. 3e1, the data synchronization method is applied to a second processor, and the data synchronization method includes:

a step S31e: generating a descriptor synchronization request instruction according to a descriptor of tensor data to be synchronized and the amount of data that can be synchronized among the tensor data, where the descriptor is used to indicate a shape of the tensor data to be synchronized, the descriptor synchronization request instruction is used to instruct a first processor to determine the descriptor of the tensor data to be synchronized and first sub-data of the tensor data according to the descriptor synchronization request instruction, and the amount of the first sub-data corresponds to the amount of data that can be synchronized; and a step S32e: sending the descriptor synchronization request instruction to the first processor.

For example, the second processor among a plurality of processors may be set to be a receiver of data synchronization, and the second processor may issue the synchronization request for part of the tensor data. In the step S31e, when there is tensor data to be synchronized in the second processor, the second processor can determine the descriptor of the tensor data and the amount of data that can be contained in the non-shared storage space of the second processor allocated to the tensor data, i.e., the amount of data can be synchronized. According to the descriptor of the tensor data and the amount of data that can be synchronized, the second processor may generate a descriptor synchronization request instruction and send the instruction in the step S32e The descriptor synchronization request instruction may include at least one of an identifier of the descriptor, content of the descriptor, and data characteristic of the tensor data, and the descriptor synchronization request instruction is used to instruct the first processor to determine the descriptor of the tensor data to be synchronized and the first sub-data of the tensor data.

In some embodiments, when receiving the descriptor synchronization request instruction, the first processor may parse the instruction to determine the descriptor of the tensor data to be synchronized and the amount of data that can be synchronized; the first processor may determine the tensor data to be synchronized according to the descriptor; and the first processor may determine the part of data that can be synchronized this time from the tensor data according to the amount of data that can be synchronized, i.e., the first sub-data. The amount of the first sub-data may correspond to the amount of data that can be synchronized, for example, the amount of the first sub-data may less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the descriptor synchronization request instruction may also include a range of part of tensor data to be synchronized, such as the content of the descriptor of the part of sub-data or a range of a storage address of the part of sub-data, so as to determine the part of data to be synchronized.

By adopting the above-mentioned data synchronization method provided by the present disclosure, the receiver can issue a synchronization request for part of the tensor data, so that the sender can determine the sub-data to be synchronized this time, thereby improving the efficiency of data synchronization.

In some embodiments, the data synchronization method further includes:
when a descriptor synchronization instruction is received from a first processor, determining a descriptor of tensor data to be synchronized and first sub-data of the tensor data; and
storing the first sub-data of the tensor data according to the descriptor of the tensor data.

For example, the first processor may generate and send a descriptor synchronization instruction according to the descriptor of the tensor data and the first sub-data. When receiving the descriptor synchronization instruction, the second processor may parse the instruction to determine the descriptor of the tensor data to be synchronized and the first sub-data of the tensor data synchronized this time; and then the second processor may determine the tensor data to be synchronized according to the descriptor, and store the first sub-data of the tensor data in its own non-shared storage space.

By adopting the above-mentioned data synchronization method provided by the present disclosure, the receiver can determine the descriptor according to the descriptor synchronization instruction and obtain sub-data synchronized this time, thereby reducing synchronization overhead and improving the efficiency of data synchronization.

In some embodiments, when there is tensor data to be synchronized in the sender of data to be synchronized, for example, when the first processor completes an operation and obtains an operation result (the tensor data), the sender can query the state of the receiver to determine the amount of data that can be contained in the non-shared storage space of the receiver allocated to the tensor data, so that part of tensor data can be synchronized.

In some embodiments, the present disclosure provides a data synchronization method applied to a first processor, including:
according to a descriptor of tensor data to be synchronized, generating a state query instruction, where the descriptor is used to indicate a shape of the tensor data to be synchronized, and the state query instruction is used to instruct a second processor to determine the amount of tensor data to be synchronized and generate a synchronization state instruction, where the state query instruction includes an identifier of the descriptor and/or content of the descriptor; and
sending the state query instruction to the second processor.

For example, when there is tensor data to be synchronized in the sender of data to be synchronized, when the first processor completes an operation and obtains an operation result (the tensor data), the sender can query the state of the receiver to determine the amount of data that can be contained in the non-shared storage space of the receiver allocated to the tensor data, so that part of tensor data can be synchronized. The first processor among a plurality of processors may be set as the sender of data to be synchronized, and the second processor may be set as the receiver of data synchronization. Both the first processor and the second processor are any of the plurality of processors, and the second processor may be of the same type or different from the first processor. The present disclosure does not limit the type of the first processor and the type of the second processor.

In some embodiments, the first processor may generate a state query instruction according to the descriptor of the tensor data to be synchronized. The state query instruction may include an identifier of the descriptor of the tensor data to be synchronized and/or content of the descriptor, and the state query instruction is used to instruct the second processor to determine and reply its own state (the amount of data that can be synchronized among the tensor data).

In some embodiments, the first processor may send the state query instruction to the second processor. After receiving the state query instruction, the second processor may parse the instruction to determine the identifier of the descriptor and/or the content of the descriptor. According to the identifier of the descriptor and/or the content of the descriptor, the second processor may determine the tensor data to be synchronized, and then determine the space that can be allocated to the tensor data, and determine the amount of data that can be synchronized among the tensor data. According to the amount of data that can be synchronized among the tensor data and descriptor, the second processor can generate and send a synchronization state instruction, so that the first processor can determine the descriptor of the tensor data to be synchronized and the amount of data that can be synchronized of this time.

By adopting the above-mentioned data synchronization method provided by the present disclosure, the sender of data to be synchronized may actively query the state of the receiver, so that part of data can be synchronized between the sender and the receiver, thereby improving the efficiency of data synchronization.

In some embodiments, the data synchronization method further includes:
- when the synchronization state instruction is received from the second processor, determining first sub-data of the tensor data according to the descriptor of the tensor data in the synchronization state instruction and the amount of data that can be synchronized, where the amount of the first sub-data corresponds to the amount of data that can be synchronized; and
- according to the first sub-data, generating a descriptor synchronization instruction and sending the descriptor synchronization instruction to the second processor to instruct the second processor to obtain the first sub-data.

For example, when receiving the synchronization state instruction from the second processor, the first processor may parse the instruction to obtain the content of the instruction (for example, the identifier of the descriptor, the amount of data that can be synchronized, etc.). According to the identifier of the descriptor, the descriptor of the tensor data to be synchronized can be determined, so as to determine the tensor data to be synchronized; and the part of data that can be synchronized this time (the first sub-data) is determined from the tensor data according to the amount of data that can be synchronized. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization state instruction may also include a range of part of tensor data to be synchronized, such as the content of the descriptor of the part of sub-data or a range of a storage address of the part of sub-data, so as to determine the part of data to be synchronized. The first processor may directly determine the first sub-data to be synchronized according to the range of the part of data.

In some embodiments, the first processor may generate a descriptor synchronization instruction according to the first sub-data and send the descriptor synchronization instruction to the second processor. The descriptor synchronization instruction may include the identifier of the descriptor of the tensor data to be synchronized and the first sub-data. After receiving the descriptor synchronization instruction, the second processor may parse the descriptor synchronization instruction to determine the descriptor of the tensor data to be synchronized and the first sub-data of the tensor data, determine the tensor data to be synchronized according to the descriptor, and store the first sub-data of the tensor data in its own non-shared storage space.

By adopting the above-mentioned data synchronization method provided by the present disclosure, the tensor data can be determined according to the descriptor in the synchronization state instruction, the sub-data synchronized this time can be determined according to the amount of data that can be synchronized of the receiver, and the descriptor synchronization instruction can be generated and sent according to the sub-data, so that the receiver can obtain the sub-data synchronized this time, thereby reducing the synchronization overhead and improving the efficiency of data synchronization.

In some embodiments, the synchronization state instruction includes the identifier of the descriptor. The step of determining first sub-data of the tensor data according to the descriptor of the tensor data in the synchronization state instruction and the amount of data that can be synchronized when the synchronization state instruction is received from the second processor includes:
- parsing the synchronization state instruction to obtain the identifier of the descriptor and the amount of data that can be synchronized; and
- according to the identifier of the descriptor, determining the descriptor of the tensor data to be synchronized.

For example, the synchronization state instruction may include the identifier of the descriptor (for example, the identifier is TR1) and the amount of data that can be synchronized. The first processor may parse the synchronization state instruction to obtain the identifier of the descriptor and the amount of data that can be synchronized, and then determine the descriptor of the tensor data to be synchronized according to the identifier of the descriptor.

By adopting the above-mentioned data synchronization method provided by the present disclosure, the amount of data transmitted during synchronization can be reduced, and the processing efficiency can be improved.

In some embodiments, the step of determining first sub-data of the tensor data according to the descriptor of the tensor data in the synchronization state instruction and the amount of data that can be synchronized when the synchronization state instruction is received from the second processor includes:
- determining the tensor data and second sub-data to be synchronized among the tensor data according to the descriptor of the tensor data; and
- determining the first sub-data according to the second sub-data and the amount of data that can be synchronized in the synchronization state instruction.

For example, the state of data among the tensor data may be set, where the data that has been synchronized may be set to a synchronized state, and the data that has not been synchronized may be set to a to-be-synchronized state. In this case, when receiving the synchronization state instruction from the second processor, the first processor may determine the tensor data to be synchronized according to the descriptor; according to the state of the data among the tensor data, the first processor may determine the second sub-data in the to-be-synchronized state; and according to the second sub-data and the amount of data that can be synchronized indicated by the synchronization state instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing a state of the first sub-data of the tensor data from a to-be synchronized state to a synchronized state.

For example, after the first processor generates the descriptor synchronization instruction according to the first sub-data of the tensor data and sends the descriptor synchronization instruction to the second processor to make the second processor synchronize the first sub-data of the tensor data, the first processor can change the state of data among the tensor data, in other words, the first processor can change the state of the first sub-data from the to-be synchronized state to the synchronized state. In this way, when the state of the second processor is queried next time and the synchronization state instruction of the second processor is received, data to be synchronized next time can be determined from part of data in the to-be-synchronized state, thereby avoiding repeated data synchronization and improving data synchronization efficiency.

In some embodiments, the present disclosure provides a data synchronization method applied to a first processor, including:
  when a state query instruction is received from a first processor, determining a descriptor of tensor data to be synchronized, where the descriptor is used to indicate a shape of the tensor data to be synchronized;
  determining the amount of data that can be synchronized among the tensor data according to the descriptor of the tensor data;
  according to the descriptor of the tensor data and the amount of data that can be synchronized, generating a synchronization state instruction, where the synchronization state instruction is used to instruct the first processor to determine first sub-data of the tensor data, and the amount of the first sub-data corresponds to the amount of data that can be synchronized; and
  sending the synchronization state instruction to the first processor.

For example, when there is tensor data to be synchronized in a sender of data to be synchronized, the sender may query the state of the receiver. The first processor (sender) may generate and send the state query instruction, and when the second processor receives the state query instruction, the second processor may parse the state query instruction to determine the descriptor of the tensor data to be synchronized.

In some embodiments, the second processor may determine the tensor data to be synchronized according to the descriptor, and determine the amount of data that can be contained in the non-shared storage space of the second processor allocated to the tensor data, i.e., the amount of data can be synchronized, so that part of tensor data can be synchronized.

In some embodiments, the second processor may generate and send a synchronization state instruction to the first processor according to the determined amount of data that can be synchronized and the descriptor of the tensor data to instruct the first processor to determine the descriptor of the tensor data to be synchronized and the amount of data that can be synchronized this time. After determining the part of the data that can be synchronized this time (i.e., the first sub-data), the first processor may generate the descriptor synchronization instruction and send the descriptor synchronization instruction to the second processor, where the descriptor synchronization instruction may include the identifier of the descriptor of the tensor data to be synchronized and the first sub-data.

By adopting the above-mentioned data synchronization method provided by the present disclosure, the sender may query the state of the receiver; after receiving the state query instruction, the receiver determines and responds to its own state (i.e., the amount of data that can be synchronized). In this way, part of tensor data can be synchronized through interaction, which may improve the efficiency of data synchronization.

In some embodiments, the data synchronization method further includes:
  when the descriptor synchronization instruction is received from the first processor, determining the descriptor of the tensor data to be synchronized and first sub-data of the tensor data; and
  according to the descriptor of the tensor data, storing the first sub-data of the tensor data.

For example, when receiving the descriptor synchronization instruction, the second processor may parse the instruction to determine the descriptor of the tensor data to be synchronized and the first sub-data of the tensor data to be synchronized this time; and then the second processor may determine the tensor data to be synchronized according to the descriptor, and store the first sub-data of the tensor data in its own non-shared storage space.

By adopting the above-mentioned data synchronization method provided by the present disclosure, the receiver can determine the descriptor according to the descriptor synchronization instruction and obtain sub-data synchronized this time, thereby reducing synchronization overhead and improving the efficiency of data synchronization.

In some embodiments, the identifier and content of the descriptor can be stored in the descriptor storage space, where the descriptor storage space can be a storage space in an internal memory (such as a register, an on-chip SRAM, or other medium cache, etc.) of the processor. The data storage space of the tensor data indicated by the descriptor may be a storage space in the internal memory (such as an on-chip cache) of the processor or a storage space in an external memory (an off-chip memory) connected to the processor. The data address in the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the data storage space corresponding to the descriptor may be a fixed address. For example, a separate data storage space may be allocated for the tensor data, and a start address of each piece of tensor data in the data storage space corresponds to an identifier of the descriptor. In this case, the processor can determine the data address of the tensor data according to the content of the descriptor.

In some embodiments, when the data address of the data storage space corresponding to the identifier of the descriptor is a variable address, the descriptor may be also used to indicate the address of N-dimensional tensor data, where the content of the descriptor may further include at least one address parameter representing the address of the tensor data. For example, if the tensor data is 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may vary from different datum points. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of the tensor data includes at least one of the followings: a size of the data storage space of the tensor data in at least one of N dimensions, a size of the storage area in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area where the tensor data is mapped in a 3-dimensional space.

It should be understood that those skilled in the art may select a shape parameter representing tensor data according to actual conditions, which is not limited in the present disclosure.

By adopting the above-mentioned data synchronization method provided by the present disclosure, when the space of the receiver of data synchronization is insufficient, part of tensor data can be synchronized firstly, and repeated many times until all of the tensor data are synchronized, which can avoid the problems of overall synchronization failure or synchronization delay of tensor data in the case of insufficient space, and improve the efficiency of data synchronization. In addition, the descriptor indicating the shape of the tensor data is set, and the tensor data is determined according to the descriptor during the data synchronization process, thereby reducing synchronization overhead and reducing the complexity of data access.

It should be noted that, for the sake of simple description, the above method embodiments are all described as a series of action combinations. However, those skilled in the art should be aware that the present disclosure is not limited by the described action order, because according to the present disclosure, certain steps may be executed in another order or executed simultaneously. Those skilled in the art should also be aware that the embodiments described in the specification are alternative embodiments and that the actions and modules involved are not necessary in the present disclosure.

It should be further noted that although the steps in the flow charts are shown in sequence as indicated by the arrows, these steps are not necessarily executed in the order indicated by the arrows. Unless specifically stated in the present disclosure, the execution of these steps is not strictly limited in order, and these steps may be executed in other orders. In addition, at least part of the steps in in the flow charts may include a plurality of sub-steps or stages. These sub-steps or stages are not necessarily executed at the same time, but may be executed at different times. The execution of these sub-steps or stages is not necessarily performed sequentially, but may be performed alternately with other steps or at least a part of the sub-steps or stages of other steps.

FIG. 3e2 shows a block diagram of a data synchronization apparatus according to an embodiment of the present disclosure. The data synchronization apparatus is applied to a first processor. As shown in FIG. 3e2, the data synchronization apparatus includes:

a descriptor and data amount determining module 5e configured to, when a descriptor synchronization request instruction is received from a second processor, determine a descriptor of tensor data to be synchronized and an amount of data that can be synchronized among the tensor data, where the descriptor is used to indicate a shape of the tensor data to be synchronized;

a sub-data determining module 52e configured to, determine first sub-data of the tensor data according to the descriptor of the tensor data and the amount of data that can be synchronized, where the amount of the first sub-data corresponds to the amount of data that can be synchronized; and a synchronization instruction generating and sending module 53e configured to, according to the first sub-data, generate a descriptor synchronization instruction and send the descriptor synchronization instruction to the second processor to instruct the second processor to obtain the first sub-data.

In some embodiments, the sub-data determining module includes:

a first determining sub-module configured to determine the tensor data and second sub-data in a to-be-synchronized state among the tensor data according to the descriptor of the tensor data; and a second determining sub-module configured to determine the first sub-data according to the second sub-data and the amount of data that can be synchronized.

In some embodiments, the data synchronization apparatus further includes:

a state changing module configured to change a state of the first sub-data of the tensor data from a to-be synchronized state to a synchronized state.

In some embodiments, the descriptor synchronization request instruction includes an identifier of the descriptor. The descriptor and the amount of data determining module includes:

a first parsing sub-module configured to parse the descriptor synchronization request instruction to obtain the identifier of the descriptor and the amount of data that can be synchronized; and a first descriptor determining sub-module configured to determine the descriptor of the tensor data to be synchronized according to the identifier of the descriptor.

In some embodiments, the descriptor synchronization request instruction includes the data characteristics of the tensor data to be synchronized. The descriptor and the amount of data determining module includes:

a second parsing sub-module configured to parse the descriptor synchronization request instruction to obtain the data characteristics of the tensor data to be synchronized and the amount of data that can be synchronized; and a second descriptor determining sub-module configured to determine the descriptor of the tensor data according to the data characteristics of the tensor data.

FIG. 3e3 shows a block diagram of a data synchronization apparatus according to an embodiment of the present disclosure. The data synchronization apparatus is applied to a second processor. As shown in FIG. 3e3, the data synchronization apparatus includes:

a request instruction generating module 61e configured to generate a descriptor synchronization request instruction according to a descriptor of tensor data to be synchronized and the amount of data that can be synchronized among the tensor data, where the descriptor is used to indicate a shape of the tensor data to be synchronized, the descriptor synchronization request instruction is used to instruct a first processor to determine the descriptor of the tensor data to be synchronized and first sub-data of the tensor data according to the descriptor synchronization request instruction, and the amount of the first sub-data corresponds to the amount of data that can be synchronized; and a request instruction sending module 62e configured to send the descriptor synchronization request instruction to the first processor.

In some embodiments, the data synchronization apparatus further includes:

a descriptor and sub-data determining module configured to, when a descriptor synchronization instruction is received from a first processor, determine a descriptor of tensor data to be synchronized and first sub-data of the tensor data; and a data storing module configured to store the first sub-data of the tensor data according to the descriptor of the tensor data.

It should be understood that the apparatus embodiment described above is only schematic, and the apparatus provided in the present disclosure may be implemented in other manners. For example, division of the units/modules is only logical function division and another division manner may be adopted during practical implementation. For example, a plurality of units or components may be combined or integrated into another system or some characteristics may be neglected or not performed.

In addition, unless otherwise specified, each functional unit/module in the embodiments of the disclosure may be integrated into a unit/module, each unit/module may also physically exist independently, and two or more units/modules may also be integrated into one unit/module. The integrated unit/module may be implemented in the form of hardware or a software functional unit/module.

If the integrated unit/module is implemented in the form of hardware, the hardware may be a digital circuit, an analogue circuit, and the like. The physical implementation of hardware may include, but is not limited to, a transistor, a memristor, and the like. Unless otherwise specified, the artificial intelligence processor may be any appropriate hardware processor, such as CPU, GPU, FPGA, DSP, ASIC, and the like. Unless otherwise specified, the storage unit may be any proper magnetic storage medium or magneto-optic storage medium, for example, an RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), an HMC (Hybrid Memory Cube), and the like.

If being implemented in the form of a software program module and sold or used as an independent product, the integrated unit/module may be stored in a computer-readable memory. Based on such an understanding, all or part of the technical solutions may be embodied in form of software product. The computer software product is stored in a memory, including a plurality of instructions configured to enable a computer device (which may be a PC, a server, a network device, or the like) to perform all or part of the operations of the method in each embodiment of the application. The memory may include various media capable of storing program codes such as a U disk, a mobile hard disk, a read-only memory (ROM), a random access memory (RAM), a magnetic disk, or an optical disk.

In some embodiments, the present disclosure provides an artificial intelligence chip including the above-mentioned data synchronization apparatus.

In some embodiments, the present disclosure provides a board card including a storage device, an interface apparatus, a control device, and the above-mentioned artificial intelligence chip. The artificial intelligence chip is connected to the storage device, the control device, and the interface apparatus, respectively; the storage device is configured to store data; the interface apparatus is configured to implement data transfer between the artificial intelligence chip and an external equipment; and the control device is configured to monitor a state of the artificial intelligence chip.

In the above-mentioned embodiments, the description of each embodiment has its own focus. For parts that are not described in detail in an embodiment, please refer to related descriptions of other embodiments. The technical features of the above-mentioned embodiments may be combined arbitrarily. In order to make the description concise, not all possible combinations of the various technical features in the above-mentioned embodiments are described. However, as long as there is no contradiction in the combinations of these technical features, they should be regarded as the scope of this specification.

The foregoing may be better understood according to the following articles:

A1. A data synchronization method applied to a first processor, comprising:
 when a descriptor synchronization request instruction is received from a second processor, determining a descriptor of tensor data to be synchronized and an amount of data that can be synchronized among the tensor data, wherein the descriptor is used to indicate a shape of the tensor data to be synchronized;
 determining first sub-data of the tensor data according to the descriptor of the tensor data and the amount of data that can be synchronized, wherein the amount of the first sub-data corresponds to the amount of data that can be synchronized; and
 according to the first sub-data, generating a descriptor synchronization instruction and sending the descriptor synchronization instruction to the second processor to instruct the second processor to obtain the first sub-data.

A2. The data synchronization method of A1, wherein the determining first sub-data of the tensor data according to the descriptor of the tensor data and the amount of data that can be synchronized includes:
 determining the tensor data and second sub-data in a to-be-synchronized state among the tensor data according to the descriptor of the tensor data; and
 determining the first sub-data according to the second sub-data and the amount of data that can be synchronized.

A3. The data synchronization method of A1 or A2, further comprising:
 changing a state of the first sub-data of the tensor data from a to-be synchronized state to a synchronized state.

A4. The data synchronization method of any one of A1-A3, wherein the descriptor synchronization request instruction includes an identifier of the descriptor, wherein the determining a descriptor of tensor data to be synchronized and the amount of data that can be synchronized among the tensor data when a descriptor synchronization request instruction is received from a second processor includes:
 parsing the descriptor synchronization request instruction to obtain the identifier of the descriptor and the amount of data that can be synchronized; and
 determining the descriptor of the tensor data to be synchronized according to the identifier of the descriptor.

A5. The data synchronization method of any one of A1-A3, wherein the descriptor synchronization request instruction includes data characteristics of the tensor data to be synchronized, wherein the determining a descriptor of tensor data to be synchronized and the amount of data that can be synchronized among the tensor data when a descriptor synchronization request instruction is received from a second processor includes:
 parsing the descriptor synchronization request instruction to obtain the data characteristics of the tensor data to be synchronized and the amount of data that can be synchronized; and
 determining the descriptor of the tensor data according to the data characteristics of the tensor data.

A6. A data synchronization method applied to a second processor, comprising:
 generating a descriptor synchronization request instruction according to a descriptor of tensor data to be synchronized and the amount of data that can be synchronized among the tensor data, wherein the descriptor is used to indicate a shape of the tensor data to be synchronized, the descriptor synchronization request instruction is used to instruct a first processor to determine the descriptor of the tensor data to be synchronized and first sub-data of the tensor data according to the descriptor synchronization request instruction, and the amount of the first sub-data corresponds to the amount of data that can be synchronized; and
 sending the descriptor synchronization request instruction to the first processor.

A7. The data synchronization method of A6, further comprising:
 when a descriptor synchronization instruction is received from a first processor, determining a descriptor of tensor data to be synchronized and first sub-data of the tensor data; and
 storing the first sub-data of the tensor data according to the descriptor of the tensor data.

A8. A data synchronization apparatus applied to a first processor, comprising:
 a descriptor and data amount determining module configured to, when a descriptor synchronization request instruction is received from a second processor, determine a descriptor of tensor data to be synchronized and an amount of data that can be synchronized among the tensor data, wherein the descriptor is used to indicate a shape of the tensor data to be synchronized;
 a sub-data determining module configured to, determine first sub-data of the tensor data according to the descriptor of the tensor data and the amount of data that can be synchronized, wherein the amount of the first sub-data corresponds to the amount of data that can be synchronized; and a synchronization instruction generating and sending module configured to, according to the first sub-data, generate a descriptor synchronization instruction and send the descriptor synchronization instruction to the second processor to instruct the second processor to obtain the first sub-data.

A9. The data synchronization apparatus of A8, wherein the sub-data determining module includes:
a first determining sub-module configured to determine the tensor data and second sub-data in a to-be-synchronized state among the tensor data according to the descriptor of the tensor data; and
a second determining sub-module configured to determine the first sub-data according to the second sub-data and the amount of data that can be synchronized.

A10. The data synchronization apparatus of A8 or A9, further comprising:
a state changing module configured to change a state of the first sub-data of the tensor data from a to-be synchronized state to a synchronized state.

A11. The data synchronization apparatus of any one of A8-A10, wherein the descriptor synchronization request instruction includes an identifier of the descriptor, wherein the descriptor and the amount of data determining module includes:
a first parsing sub-module configured to parse the descriptor synchronization request instruction to obtain the identifier of the descriptor and the amount of data that can be synchronized; and
a first descriptor determining sub-module configured to determine the descriptor of the tensor data to be synchronized according to the identifier of the descriptor.

A12. The data synchronization apparatus of any one of A8-A10, wherein the descriptor synchronization request instruction includes data characteristics of the tensor data to be synchronized, wherein the descriptor and the amount of data determining module includes:
a second parsing sub-module configured to parse the descriptor synchronization request instruction to obtain the data characteristics of the tensor data to be synchronized and the amount of data that can be synchronized; and
a second descriptor determining sub-module configured to determine the descriptor of the tensor data according to the data characteristics of the tensor data.

A13. A data synchronization apparatus applied to a second processor, comprising:
a request instruction generating module configured to generate a descriptor synchronization request instruction according to a descriptor of tensor data to be synchronized and the amount of data that can be synchronized among the tensor data, wherein the descriptor is used to indicate a shape of the tensor data to be synchronized, the descriptor synchronization request instruction is used to instruct a first processor to determine the descriptor of the tensor data to be synchronized and first sub-data of the tensor data according to the descriptor synchronization request instruction, and the amount of the first sub-data corresponds to the amount of data that can be synchronized; and
a request instruction sending module configured to send the descriptor synchronization request instruction to the first processor.

A14. The data synchronization apparatus of A13, further comprising:
a descriptor and sub-data determining module configured to, when a descriptor synchronization instruction is received from the first processor, determine the descriptor of the tensor data to be synchronized and the first sub-data of the tensor data; and
a data storing module configured to store the first sub-data of the tensor data according to the descriptor of the tensor data.

A15. An artificial intelligence chip, comprising the data synchronization apparatus of any one of A8-A14.

A16. An electronic device, comprising the artificial intelligence chip of A15.

A17. A board card, comprising a storage device, an interface apparatus, a control device, and the artificial intelligence chip of A15, wherein
the artificial intelligence chip is connected to the storage device, the control device, and the interface apparatus, respectively;
the storage device is configured to store data;
the interface apparatus is configured to implement data transfer between the artificial intelligence chip and an external equipment; and
the control device is configured to monitor a state of the artificial intelligence chip.

A18. The board card of A17, wherein
the storage device includes a plurality of groups of storage units, wherein each group of the storage units is connected with the artificial intelligence chip by a bus, and the storage units are DDR SDRAMs;
the chip includes a DDR controller configured to control data transfer and data storage of each storage unit; and
the interface apparatus is a standard PCIE interface.

With the continuous development of the A1 (Artificial Intelligence) technology, it has gradually obtained wide application and worked well in the fields of image recognition, speech recognition, and natural language processing, and the like. However, as the complexity of A1 algorithms is growing, the amount of data and data dimensions that need to be processed are increasing, therefore, multi-core and/or multi-chip data are usually required for data processing. When data is synchronized between cores or chips, a synchronization method adopting the related-art may result in large synchronization overhead and low processing efficiency.

Figure 1H:
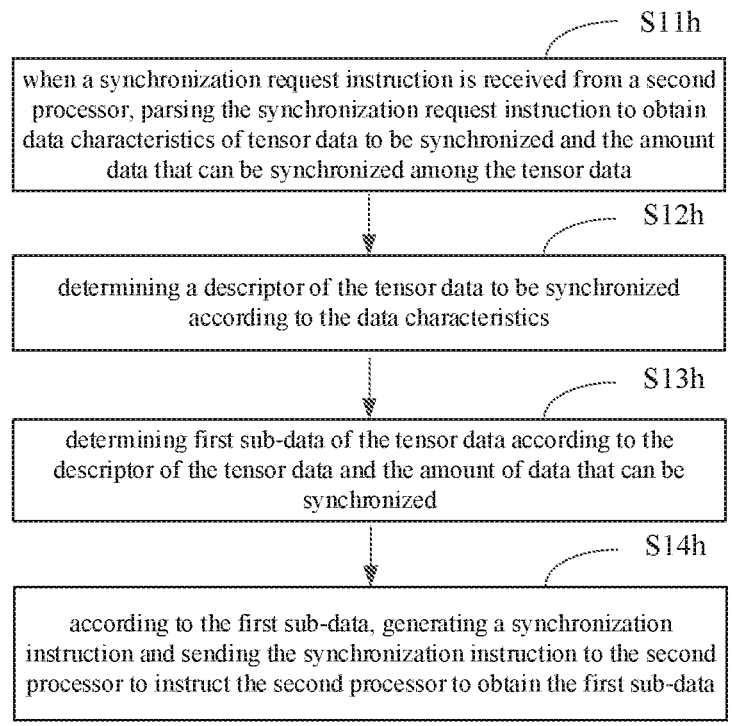
FIG. 1h shows a flowchart of a data synchronization method according to an embodiment of the present disclosure.

In some embodiments, the present disclosure provides a data synchronization method. FIG. 1h shows a flowchart of a data synchronization method according to an embodiment of the present disclosure. As shown in FIG. 1h, the data synchronization method is applied to a first processor (any processor in a processing system), and the method includes:
a step S11h: when a synchronization request instruction is received from a second processor, parsing the synchronization request instruction to obtain data characteristics of tensor data to be synchronized and an amount of data that can be synchronized among the tensor data;
a step S12h: determining a descriptor of the tensor data to be synchronized according to the data characteristics, where the descriptor is used to indicate a shape of the tensor data to be synchronized;
a step S13h: determining first sub-data of the tensor data according to the descriptor of the tensor data and the amount of data that can be synchronized, where the amount of the first sub-data corresponds to the amount of data that can be synchronized; and
a step S14h: according to the first sub-data, generating a synchronization instruction and sending the synchronization instruction to the second processor to instruct the second processor to obtain the first sub-data.

For example, the data to be synchronized may include N-dimensional tensor data (N is an integer greater than or equal to 0, for example, N=1, 2, or 3).

In some embodiments, during data processing, data synchronization between a plurality of processors (such as a plurality of cores of an artificial intelligence chip) may be executed, for example, an operation result of a processor A1 may be synchronized to a processor A2 as input data of another operation. In this case, a data synchronization mechanism based on the descriptor can be used to achieve data synchronization.

In some embodiments, since a non-shared storage space of each processor allocated to the tensor data to be synchronized may be limited, the tensor data cannot be synchronized at the same time. In this case, part of tensor data can be synchronized firstly, and repeated many times until all of the tensor data are synchronized.

In some embodiments, the receiver of data synchronization can issue a synchronization request for part of tensor data, in other words, the receiver sends a descriptor synchronization request instruction, where the descriptor synchronization request instruction may determine the data characteristics of the tensor data to be synchronized and the amount of data that can be synchronized among the tensor data, i.e., the amount of data that can be contained in the non-shared storage space of the receiver allocated to the tensor data.

In some embodiments, the first processor among a plurality of processors may be set as the sender of data to be synchronized, and the second processor may be set as the receiver of data synchronization. Both the first processor and the second processor are any of the plurality of processors, and the second processor may be of the same type or different from the first processor. The present disclosure does not limit the type of the first processor and the type of the second processor.

In some embodiments, in the step S11$h$, when receiving the synchronization request instruction from the second processor, the first processor may parse the instruction to obtain content of the instruction, i.e., the data characteristics of the tensor data to be synchronized and the amount of data that can be synchronized, where the data characteristics may include at least one of the identifier (for example, a serial number of data), shape, source, and storage address of the tensor data.

In some embodiments, the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, an address ADDR0-ADDR127), and the shape of the tensor data may be a specified shape (for example, the tensor data may be a 20*10 two-dimensional tensor). Those skilled in the art can set the data characteristics of the tensor data to be synchronized according to the actual situation, which is not limited in the present disclosure.

In some embodiments, in the step S12$h$, the first processor may determine the descriptor of the tensor data to be synchronized according to the data characteristics; in the step S13$h$, the first processor may determine the tensor data to be synchronized according to the descriptor, and then determine the part of data that can be synchronized this time among the tensor data according to the amount of data that can be synchronized, i.e., the first sub-data. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization request instruction may also include a range of part of tensor data to be synchronized, such as a range of a storage address of the part of sub-data, so as to determine the part of data to be synchronized. The first processor may directly determine the first sub-data to be synchronized according to the range of the part of data.

In some embodiments, in the step S14$h$, the first processor may generate a synchronization instruction according to the first sub-data and send the synchronization instruction to the second processor. The synchronization instruction may include the data characteristics of the tensor data to be synchronized and the first sub-data. After receiving the synchronization instruction, the second processor may parse the synchronization instruction to determine the data characteristics and the first sub-data, determine the descriptor according to the data characteristics, and determine the tensor data to be synchronized according to the descriptor, and then store the first sub-data of the tensor data in its own non-shared storage space.

By adopting the above-mentioned data synchronization method provided by the present disclosure, the receiver may issue a synchronization request instruction to actively request the synchronization of part of the data, and the sender may determine the sub-data synchronized this time according to the amount of data that can be synchronized received from the receiver. According to the sub-data, the synchronization instruction may be generated and sent, so that the receiver can obtain the sub-data synchronized this time, thereby reducing the synchronization overhead without changing the instruction structure and improving the efficiency of data synchronization.

In some embodiments, the step S13$h$ may include:
determining the tensor data and second sub-data in a to-be-synchronized state among the tensor data according to the descriptor of the tensor data; and
determining the first sub-data according to the second sub-data and the amount of data that can be synchronized.

For example, the state of data among the tensor data may be set, where the data that has been synchronized may be set to a synchronized state, and the data that has not been synchronized may be set to a to-be-synchronized state. In this case, when receiving the synchronization request instruction from the second processor, the first processor may determine the second sub-data in the to-be-synchronized state according to the state of the data among the tensor data; and according to the second sub-data and the amount of data that can be synchronized indicated by the synchronization state instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing a state of the first sub-data of the tensor data from a to-be synchronized state to a synchronized state.

For example, after the first processor generates and sends the synchronization instruction according to the first sub-data of the tensor data, so that the second processor can synchronize the first sub-data of the tensor data, the first processor may change a state of data among the tensor data. In other words, the first processor can change the state of the first sub-data from the to-be synchronized state to the synchronized state. In this way, when receiving the synchronization request instruction from the second processor next time, the first processor can determine data to be synchronized next time from part of data in the to-be-synchronized state, thereby avoiding repeated data synchronization and improving data synchronization efficiency.

FIG. 3/1 shows a flowchart of a data synchronization method according to an embodiment of the present disclosure. As shown in FIG. 3/1, the data synchronization method is applied to a second processor, and the method includes:

- a step S31f: according to a descriptor of tensor data to be synchronized, determining data characteristics of the tensor data and an amount of data that can be synchronized among the tensor data, where the descriptor is used to indicate a shape of the tensor data to be synchronized; and
- a step S32f: according to the data characteristics of the tensor data and the amount of data that can be synchronized, generating a synchronization request instruction and sending the synchronization request instruction to the first processor, where the synchronization request instruction is used to instruct the first processor to determine the tensor data to be synchronized and first sub-data of the tensor data according to the synchronization request instruction, and the amount of the first sub-data corresponds to the amount of data that can be synchronized.

For example, a receiver of data to be synchronized (i.e., the second processor) may issue a synchronization request for part of the tensor data. When there is tensor data to be synchronized in the second processor, the descriptor of the tensor data can be determined. The descriptor may be a registered (created) descriptor indicating the shape of the tensor data, or a new descriptor registered (created) according to the shape parameter of the tensor data, which is not limited in the present disclosure.

In some embodiments, in the step S31f, the second processor may determine the data characteristics of the tensor data according to the descriptor, where the data characteristics may include at least one of the identifier (for example, a serial number of data), shape, source, and storage address of the tensor data. In addition, the second processor can determine the amount of data that can be contained in the non-shared storage space of the second processor allocated to the tensor data, i.e., the amount of data can be synchronized.

In some embodiments, in the step S32f, according to the data characteristics of the tensor data and the amount of data that can be synchronized, the second processor may generate a synchronization request instruction and send the instruction, where the synchronization request instruction is used to instruct the first processor to determine the tensor data to be synchronized and the first sub-data of the tensor data.

In some embodiments, when receiving the synchronization request instruction, a receiver of data to be synchronized (i.e., the first processor) may parse the instruction to determine the data characteristics of the tensor data to be synchronized and the amount of data that can be synchronized; according to the data characteristics, the receiver may determine the descriptor of the tensor data to be synchronized; according to the descriptor, the receiver may determine the tensor data to be synchronized, and determine the part of data that can be synchronized this time among the tensor data according to the amount of data that can be synchronized, i.e., the first sub-data. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization request instruction may also include a range of part of tensor data to be synchronized, such as content of the descriptor of the part of sub-data and a range of a storage address of the part of sub-data, so as to determine the part of data to be synchronized.

By adopting the above-mentioned data synchronization method provided by the present disclosure, the receiver may issue a synchronization request for part of the tensor data, so that the sender can determine the sub-data synchronized this time, thereby improving the efficiency of data synchronization.

In some embodiments, the data synchronization method further includes:
- when a synchronization instruction is received from a first processor, parsing the synchronization instruction to obtain data characteristics of tensor data to be synchronized and first sub-data of the tensor data;
- determining the descriptor of the tensor data according to the data characteristics; and
- storing the first sub-data of the tensor data according to the descriptor of the tensor data.

For example, the first processor may generate and send the synchronization instruction according to the data characteristics of the tensor data and the first sub-data. When receiving the synchronization instruction, the second processor may parse the instruction to determine the data characteristics of the tensor data to be synchronized and the first sub-data of the tensor data synchronized this time; according to the data characteristics, the second processor may determine the descriptor, and then determine the tensor data to be synchronized according to the descriptor; and the second processor may store the first sub-data of the tensor data in its own non-shared storage space.

By adopting the above-mentioned data synchronization method provided by the present disclosure, according to the synchronization instruction, the receiver can determine the descriptor and obtain the sub-data synchronized this time, thereby reducing the synchronization overhead, improving the efficiency of data synchronization, and achieving instruction compatibility during instruction transfer and processing.

In some embodiments, there is tensor data to be synchronized in the sender of data to be synchronized, for example, when an operation is completed and a result of the operation (tensor data) is obtained, the sender can query the state of the receiver to determine the amount of data that can be contained in the non-shared storage space of the receiver allocated to the tensor data, so that part of tensor data can be synchronized.

In some embodiments, the present disclosure further provides a data synchronization method applied to a first processor, including:

according to a descriptor of tensor data to be synchronized, determining data characteristics of the tensor data, where the descriptor is used to indicate a shape of the tensor data to be synchronized; and according to the data characteristics of the tensor data, generating a state query instruction and sending the state query instruction to a second processor, where the state query instruction is used to instruct the second processor to determine the amount of tensor data to be synchronized and generate a synchronization state instruction.

For example, when the first processor determines that there is tensor data to be synchronized, the first processor may obtain the descriptor of the tensor data. The descriptor may be a registered (created) descriptor indicating the shape of the tensor data, or a new descriptor registered (created) according to the shape parameter of the tensor data, which is not limited in the present disclosure.

In some embodiments, according to the descriptor of the tensor data, the first processor may determine the data characteristics of the tensor data. The data characteristics may include at least one of the identifier (for example, a serial number of data), shape, source, and storage address of the tensor data.

In some embodiments, the data characteristics of the tensor data to be synchronized may include information such as the shape, source, and address of the tensor data. For example, the tensor data may be from a K-th sender (a K-th processor), the tensor data may be from an operation result of a convolution operation numbered 200, the address of the tensor data may be a specific address area (for example, an address ADDR0-ADDR127), and the shape of the tensor data may be a specified shape (for example, the tensor data may be a 20*10 two-dimensional tensor). Those skilled in the art can set the data characteristics of the tensor data to be synchronized according to the actual situation, which is not limited in the present disclosure.

In some embodiments, according to the data characteristics of the tensor data, the first processor may generate a state query instruction and send the state query instruction to the second processor. If the second processor already has information (for example, a descriptor indicating the tensor data to be synchronized has been registered) of the tensor data, the state query instruction may only include part of the data characteristics, such as the identifier of the tensor data, and then the state query instruction may instruct the second processor to determine the descriptor of the tensor data to be synchronized according to the identifier of the tensor data; if the second processor does not have information of the tensor data, the synchronization instruction can include more data characteristics, such as the identifier and storage address of the tensor data, and then the synchronization instruction may instruct the second processor to determine the descriptor of the tensor data to be synchronized. The present disclosure does not limit the specific content included in the state query instruction.

In some embodiments, if the state query instruction includes the identifier of the tensor data, the second processor may determine the tensor data to be synchronized according to the identifier, and register or obtain the descriptor indicating the tensor data to be synchronized. If the state query instruction includes more data characteristics (the identifier and storage address, etc.), the second processor can register the descriptor indicating the tensor data to be synchronized according to the data characteristics in the instruction.

In some embodiments, after determining the descriptor of the tensor data to be synchronized, the second processor may determine the space that can be allocated to the tensor data corresponding to the descriptor, and determine the amount of data that can be synchronized among the tensor data. According to the amount of data that can be synchronized and the data characteristics, the second processor can generate and send a synchronization state instruction, so that the first processor can determine the tensor data to be synchronized and the amount of data that can be synchronized this time.

According to the above-mentioned data synchronization method provided by the present disclosure, by setting the descriptor indicating the shape of the tensor data, the sender can determine the data characteristics of the tensor data according to the descriptor, and generate and send the state query instruction according to the data characteristics to instruct the receiver to feedback its own state (i.e., the amount of data that can be synchronized) according to the state query instruction, therefore, part of tensor data can be synchronized, the synchronization overhead can be reduced without changing the instruction structure, and the efficiency of data synchronization can be improved.

In some embodiments, the data synchronization method further includes:

when the synchronization state instruction is received from the second processor, parsing the synchronization state instruction to determine the data characteristics of the tensor data to be synchronized and the amount of data that can be synchronized;

determining the descriptor of the tensor data to be synchronized according to the data characteristics;

determining first sub-data of the tensor data according to the descriptor and the amount of data that can be synchronized, where the amount of the first sub-data corresponds to the amount of data that can be synchronized; and according to the first sub-data, generating a synchronization instruction and sending the synchronization instruction to the second processor to instruct the second processor to obtain the first sub-data.

For example, when receiving the synchronization state instruction from the second processor, the first processor may parse the instruction to obtain content of the instruction, i.e., the data characteristics of the tensor data to be synchronized and the amount of data that can be synchronized. According to the data characteristics, the descriptor of the tensor data to be synchronized can be determined, and then the tensor data to be synchronized can be determined; and the part of data that can be synchronized this time (the first sub-data) is determined from the tensor data according to the amount of data that can be synchronized. The amount of the first sub-data may correspond to the amount of data that can be synchronized, for example, the amount of the first sub-data may be less than or equal to the amount of data that can be synchronized.

In some embodiments, if all the data of the tensor data has not been synchronized, data that can be synchronized may be selected from the tensor data as the first sub-data. If part of the tensor data has not been synchronized, and the amount of data that has not been synchronized is greater than the amount of data that can be synchronized, data that can be synchronized may be selected from the data that has not been synchronized (second sub-data of the tensor data) as the first sub-data; if the amount of data that has not been synchronized is less than or equal to the amount of data that can be synchronized, the data that has not been synchronized can be directly taken as the first sub-data. It should be understood that those skilled in the art can determine the first sub-data according to the actual situation, which is not limited in the present disclosure.

In some embodiments, the synchronization state instruction may also include a range of part of tensor data to be synchronized, such as a range of a storage address of the part of sub-data, so as to determine the part of data to be synchronized. The first processor may directly determine the first sub-data to be synchronized according to the range of the part of data.

In some embodiments, the first processor may generate a synchronization instruction according to the first sub-data and send the synchronization instruction to the second processor. The synchronization instruction may include the data characteristics of the tensor data to be synchronized and the first sub-data. After receiving the synchronization instruction, the second processor may parse the synchronization instruction to determine the data characteristics of the tensor data to be synchronized and the first sub-data of the tensor data, determine the descriptor according to the data characteristics, and store the first sub-data of the tensor data in its own non-shared storage space.

By adopting the above-mentioned data synchronization method provided by the present disclosure, the descriptor of the tensor data and the amount of data that can be synchronized can be determined according to the synchronization state instruction from the sender; the sub-data synchronized this time can be determined according to the amount of data that can be synchronized; and the synchronization instruction can be generated and sent according to the sub-data, so that the receiver can obtain the sub-data synchronized this time, thereby reducing the synchronization overhead and improving the efficiency of data synchronization.

In some embodiments, the step of determining the first sub-data of the tensor data according to the descriptor and the amount of data that can be synchronized includes:

according to the descriptor, determining the tensor data to be synchronized and second sub-data in a to-be-synchronized state among the tensor data; and determining the first sub-data according to the second sub-data and the amount of data that can be synchronized.

For example, the state of data among the tensor data may be set, where the data that has been synchronized may be set to a synchronized state, and the data that has not been synchronized may be set to a to-be-synchronized state. In this case, when receiving the synchronization state instruction from the second processor, the first processor may determine the second sub-data in the to-be-synchronized state according to the state of the data among the tensor data; and according to the second sub-data and the amount of data that can be synchronized indicated by the synchronization state instruction, the first processor may determine the first sub-data to be synchronized this time.

In some embodiments, if the amount of the second sub-data is greater than the amount of data that can be synchronized, the first sub-data synchronized this time can be selected from the second sub-data; if the amount of the second sub-data is less than or equal to the amount of data that can be synchronized, the second sub-data can be directly taken as the first sub-data.

By adopting the above-mentioned data synchronization method provided by the present disclosure, part of tensor data synchronized this time can be determined, and then the part of tensor data can be synchronized, thereby improving the efficiency of data synchronization.

In some embodiments, the data synchronization method further includes: changing a state of the first sub-data of the tensor data from a to-be synchronized state to a synchronized state.

For example, after the first processor generates the synchronization instruction according to the first sub-data of the tensor data and sends the descriptor synchronization instruction to the second processor to make the second processor synchronize the first sub-data of the tensor data, the first processor can change the state of data among the tensor data. In other words, the first processor can change the state of the first sub-data from the to-be synchronized state to the synchronized state. In this way, when the state of the second processor is queried next time and the synchronization state instruction of the second processor is received, data to be synchronized next time can be determined from part of data in the to-be-synchronized state, thereby avoiding repeated data synchronization and improving data synchronization efficiency.

In some embodiments, the present disclosure further provides a data synchronization method applied to a second processor, and the method includes:

when a state query instruction is received from a first processor, parsing the state query instruction to obtain data characteristics of tensor data to be synchronized;

determining a descriptor of the tensor data to be synchronized according to the data characteristics, where the descriptor is used to indicate a shape of the tensor data to be synchronized;

determining the amount of data that can be synchronized among the tensor data according to the descriptor of the tensor data; and according to the data characteristics of the tensor data and the amount of data that can be synchronized, generating a synchronization state instruction and sending the synchronization state instruction to the first processor, where the synchronization state instruction is used to instruct the first processor to determine first sub-data of the tensor data, and the amount of the first sub-data corresponds to the amount of data that can be synchronized.

For example, when there is tensor data to be synchronized in a sender of data to be synchronized, the sender may query the state of the receiver. The first processor (sender) may generate and send the state query instruction, and when the second processor receives the state query instruction, the second processor may parse the state query instruction to determine the data characteristics of the tensor data to be synchronized, where the data characteristics may include at least one of the identifier (for example, a serial number of data), shape, source, and storage address of the tensor data.

In some embodiments, the second processor may determine the descriptor of the tensor data to be synchronized according to the data characteristics. The descriptor may be a registered (created) descriptor indicating the shape of the tensor data, or a new descriptor registered (created) according to the shape parameter of the tensor data, which is not limited in the present disclosure.

In some embodiments, the second processor may determine the tensor data to be synchronized according to the descriptor, and determine the amount of data that can be contained in the non-shared storage space of the second processor allocated to the tensor data, i.e., the amount of data that can be synchronized, so that part of tensor data can be synchronized.

In some embodiments, the second processor may generate and send a synchronization state instruction to the first processor according to the determined amount of data that can be synchronized and the data characteristics of the tensor data, so as to instruct the first processor to determine the amount of data that can be synchronized this time. After determining the part of data (i.e., the first sub-data) that can be synchronized this time, the first processor may generate a synchronization instruction and send the synchronization instruction to the second processor. The synchronization instruction may include the data characteristics of the tensor data to be synchronized and the first sub-data of the tensor data.

By adopting the above-mentioned data synchronization method provided by the present disclosure, the sender may query the state of the receiver; after receiving the state query instruction, the receiver determines and responds to its own state (i.e., the amount of data that can be synchronized). In this way, part of tensor data can be synchronized through interaction, which may improve the efficiency of data synchronization.

In some embodiments, the data synchronization method further includes:
when a synchronization instruction is received from the first processor, parsing the synchronization instruction to obtain the data characteristics of the tensor data to be synchronized and the first sub-data of the tensor data;
determining the descriptor of the tensor data according to the data characteristics; and
storing the first sub-data of the tensor data according to the descriptor of the tensor data.

For example, when receiving the synchronization instruction, the second processor may parse the instruction to determine the data characteristics of the tensor data to be synchronized and the first sub-data of the tensor data to be synchronized this time; according to the data characteristics, the second processor may determine the descriptor of the tensor data to be synchronized; and according to the descriptor, the second processor may determine the tensor data to be synchronized, and then store the first sub-data of the tensor data in its own non-shared storage space.

By adopting the above-mentioned data synchronization method provided by the present disclosure, the receiver can determine the descriptor according to the synchronization instruction and obtain sub-data synchronized this time, thereby reducing synchronization overhead and improving the efficiency of data synchronization.

In some embodiments, the identifier and content of the descriptor can be stored in the descriptor storage space, where the descriptor storage space can be a storage space in an internal memory (such as a register, an on-chip SRAM, or other medium cache, etc.) of the processor. The data storage space of the tensor data indicated by the descriptor may be a storage space in the internal memory (such as an on-chip cache) of the processor or a storage space in an external memory (an off-chip memory) connected to the processor. The data address in the data storage space may be an actual physical address or a virtual address. The present disclosure does not limit a position of the descriptor storage space and a position of the data storage space, and the type of the data address.

In some embodiments, the identifier and content of the descriptor, and tensor data indicated by the descriptor can be stored in a same area. For example, a continuous area of an on-chip cache with addresses ADDR0-ADDR1023 can be used to store the above information. Within this area, addresses ADDR0-ADDR31 can be used to store the identifier of the descriptor, addresses ADDR32-ADDR63 can be used to store the content of the descriptor, and addresses ADDR64-ADDR1023 can be used to store the tensor data indicated by the descriptor. The address ADDR is not limited to 1 bit or 1 byte, and is an address unit used to represent an address. Those skilled in the art can determine the storage area and the address thereof according to the specific applications, which is not limited in the present disclosure.

In some embodiments, the identifier and content of the descriptor, and the tensor data indicated by the descriptor can be respectively stored in different areas of an internal memory. For example, a register can be used as a descriptor storage space to store the identifier and content of the descriptor, and an on-chip cache can be used as a data storage space to store the tensor data indicated by the descriptor.

In some embodiments, a special register (SR) may be provided for the descriptor, where data in the descriptor may be an immediate number or be obtained from the special register. When the register is used to store the identifier and content of the descriptor, a serial number of the register can be used to indicate the identifier of the descriptor. For example, if the serial number of the register is 0, the identifier of a descriptor stored in the register is 0. When the descriptor in the register is valid, an area can be allocated in a caching space (such as creating a tensor caching unit for each piece of tensor data in the cache) according to a size of tensor data indicated by the descriptor for storing the tensor data. It should be understood that a preset caching space may also be used to store the tensor data, which is not limited in the present disclosure.

In some embodiments, the identifier and content of the descriptor can be stored in an internal memory, and the tensor data indicated by the descriptor can be stored in an external memory. For example, the identifier and content of the descriptor may be stored on-chip and the tensor data indicated by the descriptor may be stored off-chip.

In some embodiments, the data address of the data storage space corresponding to the descriptor may be a fixed address. For example, a separate data storage space may be allocated for the tensor data, and a start address of each piece of tensor data in the data storage space corresponds to an identifier of the descriptor. In this case, the processor can determine the data address of the tensor data according to the content of the descriptor.

In some embodiments, when the data address of the data storage space corresponding to the identifier of the descriptor is a variable address, the descriptor may be also used to indicate the address of N-dimensional tensor data, where the content of the descriptor may further include at least one address parameter representing the address of the tensor data. For example, if the tensor data is a 3-dimensional data, when the descriptor points to the address of the tensor data, the content of the descriptor may include an address parameter indicating the address of the tensor data, such as a start address of the tensor data; or the content of the descriptor may include a plurality of address parameters of the address of the tensor data, such as a start address+address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may be different according to the change of the datum point. The present disclosure does not limit the selection of the datum point.

In some embodiments, the base address may include a start address of the data storage space. When the datum point of the descriptor is a first data block of the data storage space, the base address of the descriptor is the start address of the data storage space. When the datum point of the descriptor is other data than the first data block in the data storage space, the base address of the descriptor is the physical address of the data block in the data storage space.

In some embodiments, the shape parameter of the tensor data includes at least one of the followings: a size of the data storage space of the tensor data in at least one of N dimensions, a size of the storage area in at least one of the N dimensions, an offset of the storage area in at least one of the N dimensions, a position of at least two vertices at diagonal positions in the N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is 3-dimensional data, the descriptor can use a coordinate (x, y, z) to represent the shape of the tensor data, and the data description position of the tensor data can be represented by the coordinate (x, y, z), and the data description position of the tensor data may be a position of a point or an area where the tensor data is mapped in a 3-dimensional space.

It should be understood that those skilled in the art may select a shape parameter representing tensor data according to actual conditions, which is not limited in the present disclosure.

By adopting the above-mentioned data synchronization method provided by the present disclosure, when the space of the receiver of data synchronization is insufficient, part of tensor data can be synchronized firstly, and repeated many times until all of the tensor data are synchronized, which can avoid the problems of overall synchronization failure or synchronization delay of tensor data in the case of insufficient space, and improve the efficiency of data synchronization. In addition, the descriptor indicating the shape of the tensor data is set, and the tensor data is determined according to the descriptor during the data synchronization process, thereby reducing synchronization overhead and reducing the complexity of data access, and achieving the instruction compatibility during transfer and processing process.

It should be noted that, for the sake of simple description, the above method embodiments are all described as a series of action combinations. However, those skilled in the art should be aware that the present disclosure is not limited by the described action order, because according to the present disclosure, certain steps may be executed in another order or executed simultaneously. Those skilled in the art should also be aware that the embodiments described in the specification are alternative embodiments and that the actions and modules involved are not necessary in the present disclosure.

It should be further noted that although the steps in the flow charts are shown in sequence as indicated by the arrows, these steps are not necessarily executed in the order indicated by the arrows. Unless specifically stated in the present disclosure, the execution of these steps is not strictly limited in order, and these steps may be executed in other orders. In addition, at least part of the steps in in the flow charts may include a plurality of sub-steps or stages. These sub-steps or stages are not necessarily executed at the same time, but may be executed at different times. The execution of these sub-steps or stages is not necessarily performed sequentially, but may be performed alternately with other steps or at least a part of the sub-steps or stages of other steps.

FIG. 3/2 shows a block diagram of a data synchronization apparatus according to an embodiment of the present disclosure. The data synchronization apparatus is applied to a first processor. As shown in FIG. 3/2, the data synchronization apparatus includes:

a request instruction parsing module 51$f$ configured to, when a synchronization request instruction is received from a second processor, parse the synchronization request instruction to obtain data characteristics of tensor data to be synchronized and the amount data that can be synchronized among the tensor data;

a first descriptor determining module 52$f$ configured to determine a descriptor of the tensor data to be synchronized according to the data characteristics, where the descriptor is used to indicate a shape of the tensor data to be synchronized;

a data determining module 53$f$ configured to determine first sub-data of the tensor data according to the descriptor of the tensor data and the amount of data that can be synchronized, where the amount of the first sub-data corresponds to the amount of data that can be synchronized; and a synchronization instruction generating and sending module 54$f$ configured to, according to the first sub-data, generate a synchronization instruction and sending the synchronization instruction to the second processor to instruct the second processor to obtain the first sub-data.

In some embodiments, the data determining module includes:

a first determining sub-module configured to determine the tensor data and second sub-data in a to-be-synchronized state among the tensor data according to the descriptor of the tensor data; and a second determining sub-module configured to determine the first sub-data according to the second sub-data and the amount of data that can be synchronized.

In some embodiments, the data synchronization apparatus further includes:
a state changing module configured to change a state of the first sub-data of the tensor data from a to-be synchronized state to a synchronized state.

FIG. 3f3 shows a block diagram of a data synchronization apparatus according to an embodiment of the present disclosure. The data synchronization apparatus is applied to a second processor. As shown in FIG. 3f3, the data synchronization apparatus includes:
a characteristics and data amount determining module 61f configured to, according to a descriptor of tensor data to be synchronized, determine data characteristics of the tensor data and the amount of data that can be synchronized among the tensor data, where the descriptor is used to indicate a shape of the tensor data to be synchronized; and
a request instruction generating and sending module 62f configured to, according to the data characteristics of the tensor data and the amount of data that can be synchronized, generate a synchronization request instruction and sending the synchronization request instruction to the first processor, where the synchronization request instruction is used to instruct the first processor to determine the tensor data to be synchronized and first sub-data of the tensor data according to the synchronization request instruction, and the amount of the first sub-data corresponds to the amount of data that can be synchronized.

In some embodiments, the data synchronization apparatus further includes:
a synchronization instruction parsing module configured to, when a synchronization instruction is received from the first processor, parse the synchronization instruction to obtain the data characteristics of the tensor data to be synchronized and the first sub-data of the tensor data;
a second descriptor determining module configured to determine the descriptor of the tensor data according to the data characteristics; and
a data storing module configured to store the first sub-data of the tensor data according to the descriptor of the tensor data.

It should be understood that the apparatus embodiment described above is only schematic, and the apparatus provided in the present disclosure may be implemented in other manners. For example, division of the units/modules is only logical function division and another division manner may be adopted during practical implementation. For example, a plurality of units or components may be combined or integrated into another system or some characteristics may be neglected or not performed.

In addition, unless otherwise specified, each functional unit/module in the embodiments of the disclosure may be integrated into a unit/module, each unit/module may also physically exist independently, and two or more units/modules may also be integrated into one unit/module. The integrated unit/module may be implemented in the form of hardware or a software functional unit/module.

If the integrated unit/module is implemented in the form of hardware, the hardware may be a digital circuit, an analogue circuit, and the like. The physical implementation of hardware may include, but is not limited to, a transistor, a memristor, and the like. Unless otherwise specified, the artificial intelligence processor may be any appropriate hardware processor, such as CPU, GPU, FPGA, DSP, ASIC, and the like. Unless otherwise specified, the storage unit may be any proper magnetic storage medium or magneto-optic storage medium, for example, an RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), an HMC (Hybrid Memory Cube), and the like.

If being implemented in the form of a software program module and sold or used as an independent product, the integrated unit/module may be stored in a computer-readable memory. Based on such an understanding, all or part of the technical solutions may be embodied in form of software product. The computer software product is stored in a memory, including a plurality of instructions configured to enable a computer device (which may be a PC, a server, a network device, or the like) to perform all or part of the operations of the method in each embodiment of the application. The memory may include various media capable of storing program codes such as a U disk, a mobile hard disk, a read-only memory (ROM), a random access memory (RAM), a magnetic disk, or an optical disk.

In some embodiments, the present disclosure provides an artificial intelligence chip including the above-mentioned data synchronization apparatus.

In some embodiments, the present disclosure provides a board card including a storage device, an interface apparatus, a control device, and the above-mentioned artificial intelligence chip. The artificial intelligence chip is connected to the storage device, the control device, and the interface apparatus, respectively; the storage device is configured to store data; the interface apparatus is configured to implement data transfer between the artificial intelligence chip and an external equipment; and the control device is configured to monitor a state of the artificial intelligence chip.

In the above-mentioned embodiments, the description of each embodiment has its own focus. For parts that are not described in detail in an embodiment, please refer to related descriptions of other embodiments. The technical features of the above-mentioned embodiments may be combined arbitrarily. In order to make the description concise, not all possible combinations of the various technical features in the above-mentioned embodiments are described. However, as long as there is no contradiction in the combinations of these technical features, they should be regarded as the scope of this specification.

The foregoing may be better understood according to the following articles:

A1. A data synchronization method applied to a first processor, comprising:
when a synchronization request instruction is received from a second processor, parsing the synchronization request instruction to obtain data characteristics of tensor data to be synchronized and an amount of data that can be synchronized among the tensor data;
determining a descriptor of the tensor data to be synchronized according to the data characteristics, wherein the descriptor is used to indicate a shape of the tensor data to be synchronized;
determining first sub-data of the tensor data according to the descriptor of the tensor data and the amount of data that can be synchronized, wherein the amount of the first sub-data corresponds to the amount of data that can be synchronized; and according to the first sub-data, generating a synchronization instruction and sending the synchronization instruction to the second processor to instruct the second processor to obtain the first sub-data.

A2. The data synchronization method of A1, wherein the determining first sub-data of the tensor data according to the descriptor of the tensor data and the amount of data that can be synchronized includes:
determining the tensor data and second sub-data in a to-be-synchronized state among the tensor data according to the descriptor of the tensor data; and
determining the first sub-data according to the second sub-data and the amount of data that can be synchronized.

A3. The data synchronization method of A1 or A2, further comprising:
changing a state of the first sub-data of the tensor data from a to-be synchronized state to a synchronized state.

A4. A data synchronization method applied to a second processor, comprising:
according to a descriptor of tensor data to be synchronized, determining data characteristics of the tensor data and the amount of data that can be synchronized among the tensor data, wherein the descriptor is used to indicate a shape of the tensor data to be synchronized; and
according to the data characteristics of the tensor data and the amount of data that can be synchronized, generating a synchronization request instruction and sending the synchronization request instruction to a first processor, wherein the synchronization request instruction is used to instruct the first processor to determine the tensor data to be synchronized and first sub-data of the tensor data according to the synchronization request instruction, and the amount of the first sub-data corresponds to the amount of data that can be synchronized.

A5. The data synchronization method of A4, further comprising:
when a synchronization instruction is received from the first processor, parsing the synchronization instruction to obtain the data characteristics of the tensor data to be synchronized and the first sub-data of the tensor data;
determining the descriptor of the tensor data according to the data characteristics; and
storing the first sub-data of the tensor data according to the descriptor of the tensor data.

A6. A data synchronization apparatus applied to a first processor, comprising:
a request instruction parsing module configured to, when a synchronization request instruction is received from a second processor, parse the synchronization request instruction to obtain data characteristics of tensor data to be synchronized and an amount of data that can be synchronized among the tensor data;
a first descriptor determining module configured to determine a descriptor of the tensor data to be synchronized according to the data characteristics, wherein the descriptor is used to indicate a shape of the tensor data to be synchronized;
a data determining module configured to determine first sub-data of the tensor data according to the descriptor of the tensor data and the amount of data that can be synchronized, wherein the amount of the first sub-data corresponds to the amount of data that can be synchronized; and
a synchronization instruction generating and sending module configured to, according to the first sub-data, generate a synchronization instruction and send the synchronization instruction to the second processor to instruct the second processor to obtain the first sub-data.

A7. The data synchronization apparatus of A6, wherein the data determining module includes:
a first determining sub-module configured to determine the tensor data and second sub-data in a to-be-synchronized state among the tensor data according to the descriptor of the tensor data; and
a second determining sub-module configured to determine the first sub-data according to the second sub-data and the amount of data that can be synchronized.

A8. The data synchronization apparatus of A6 or A7, further comprising:
a state changing module configured to change a state of the first sub-data of the tensor data from a to-be synchronized state to a synchronized state.

A9. A data synchronization apparatus applied to a second processor, comprising:
a characteristics and data amount determining module configured to, according to a descriptor of tensor data to be synchronized, determine data characteristics of the tensor data and the amount of data that can be synchronized among the tensor data, wherein the descriptor is used to indicate a shape of the tensor data to be synchronized; and
a request instruction generating and sending module configured to, according to the data characteristics of the tensor data and the amount of data that can be synchronized, generate a synchronization request instruction and send the synchronization request instruction to a first processor, wherein the synchronization request instruction is used to instruct the first processor to determine the tensor data to be synchronized and first sub-data of the tensor data according to the synchronization request instruction, and the amount of the first sub-data corresponds to the amount of data that can be synchronized.

A10. The data synchronization apparatus of A9, further comprising:
a synchronization instruction parsing module configured to, when a synchronization instruction is received from the first processor, parse the synchronization instruction to obtain the data characteristics of the tensor data to be synchronized and the first sub-data of the tensor data;
a second descriptor determining module configured to determine the descriptor of the tensor data according to the data characteristics; and
a data storing module configured to store the first sub-data of the tensor data according to the descriptor of the tensor data.

A11. An artificial intelligence chip, comprising the data synchronization apparatus of any one of A6-A10.

A12. An electronic device, comprising the artificial intelligence chip of A11.

A13. A board card comprising a storage device, an interface apparatus, a control device, and the artificial intelligence chip of A11, wherein
the artificial intelligence chip is connected to the storage device, the control device, and the interface apparatus, respectively;
the storage device is configured to store data;
the interface apparatus is configured to implement data transfer between the artificial intelligence chip and an external equipment; and the control device is configured to monitor a state of the artificial intelligence chip.

A14. The board card of A13, wherein the storage device includes a plurality of groups of storage units, wherein each group of the storage units is connected with the artificial intelligence chip by a bus, and the storage units are DDR SDRAMs:

the chip includes a DDR controller configured to control data transfer and data storage of each storage unit; and the interface apparatus is a standard PCIE interface.

The embodiments of the present disclosure have been described above, and the above description is exemplary, not exhaustive, and is not limited to the disclosed embodiments. Without departing from the scope and spirit of the described embodiments, many modifications and changes are obvious to those ordinary skilled in the art. The terms used herein are intended to better explain the principles, practical applications, or improvements to technologies in the market of the embodiments, or to enable other ordinary skilled in the art to understand the embodiments disclosed herein.

The invention claimed is:

1. A data processing method, comprising:
determining that a decoded processing instruction is a descriptor management instruction fir managing a descriptor indicates a shape of a tensor data;
obtaining a management parameter of the descriptor in the processing instruction, wherein the management parameter includes at least one of an identifier of the descriptor, the shape of the tensor data indicated by the descriptor, or content of the tensor data indicated by the descriptor;
determining a first storage area for content of the descriptor in a descriptor storage space and a second storage area for the tensor data in a data storage space based on the management parameter; and
executing the descriptor management instruction to manage the descriptor by interacting with the first storage area and the second storage area.

2. The data processing method of claim 1, wherein the descriptor management instruction is a descriptor registration instruction, wherein the executing the descriptor management instruction to manage the descriptor by interacting with the first storage area and the second storage area includes:
registering the descriptor according to at least one of the identifier of the descriptor, the shape of the tensor data indicated by the descriptor, or the content of the tensor data indicated by the descriptor.

3. The data processing method of claim 2, wherein the registering the descriptor according to at least one of the identifier of the descriptor, the shape of the tensor data indicated by the descriptor, and the content of the tensor data indicated by the descriptor further comprises:
determining the content of the descriptor to indicate the second storage area according to at least one of the shape of the tensor data indicated by the descriptor, or the content of the tensor data indicated by the descriptor, and
storing the content of the descriptor in the first storage area.

4. The data processing method of claim 3, wherein the management parameter includes the shape of the tensor data indicated by the descriptor, and the content of the descriptor is determined according to a correspondence between the shape of the tensor data and a data address of the second storage area.

5. The data processing method of claim 1, wherein the management parameter includes the identifier of the descriptor, wherein determining the first storage area for content of the descriptor in the descriptor storage space further comprises:
when the identifier indicates the first storage area, determining the first storage area according to the identifier; or
when the identifier does not indicate the first storage area, establishing a correspondence between the identifier of the descriptor and the first storage area.

6. The data processing method of claim 1, wherein the content of the tensor data indicated by the descriptor includes at least one of immediate data or data in a register.

7. The data processing method of claim 1, wherein the descriptor management instruction is a descriptor release instruction, and the management parameter includes the identifier of the descriptor, wherein the executing the descriptor management instruction according to the management parameter further comprises:
releasing the descriptor corresponding to the identifier of the descriptor.

8. The data processing method of claim 7, wherein the releasing the descriptor corresponding to the identifier of the descriptor further comprises:
releasing the first storage area of the descriptor in the descriptor storage space and the second storage area of the content of the tensor data indicated by the descriptor in the data storage space, respectively.

9. The data processing method of claim 7, further comprising:
storing the content of the descriptor in a designated storage space according to e identifier of the descriptor.

10. A data processing apparatus, comprising a control circuit configured to:
determine that a decoded processing instruction is a descriptor management instruction for managing a descriptor used to indicate a shape of a tensor data;
obtain a management parameter of the descriptor in the processing instruction, wherein the management parameter includes at least one of an identifier of the descriptor, the shape of the tensor data indicated by the descriptor, or content of the tensor data indicated by the descriptor;
determine a first storage area for content of the descriptor in a descriptor storage space and a second storage area for the tensor data in a data storage space based on the management parameter; and
execute the descriptor management instruction to manage the descriptor by interacting with the first storage area and the second storage area.

11. The data processing apparatus of claim 10, wherein the descriptor management instruction is a descriptor registration instruction, wherein to execute the descriptor management instruction to manage the descriptor by interacting with the first storage area and the second storage area, the control circuit is further configured to:
determine the content of the descriptor to indicate the second storage area according to at least one of the shape of the tensor data indicated by the descriptor, or the content of the tensor data indicated by the descriptor, and
store the content of the descriptor in the first storage area.

12. The data processing apparatus of claim 11, wherein the management parameter includes the identifier of the descriptor, Wherein the control circuit is further configured to:

when the identifier indicates the first storage area, determine the first storage area according to the identifier; or when the identifier does not indicate the first storage area, establish a correspondence between the identifier of the descriptor and the first storage area.

13. The data processing apparatus of claim 10, wherein the descriptor management instruction is a descriptor release instruction, and the management parameter includes the identifier of the descriptor, wherein to execute the descriptor management instruction to manage the descriptor by interacting with the first storage area and the second storage area, the control circuit is further configured to:

release the descriptor corresponding to the identifier of the descriptor.

14. The data processing apparatus of claim 13, wherein to release the descriptor corresponding to the identifier of the descriptor, the control circuit is further configured to:

release the first storage area of the descriptor in the descriptor storage space and the second storage area of the content of the tensor data indicated by the descriptor in the data storage space, respectively.

15. An artificial intelligence chip, comprising the data processing apparatus of claim 10.

16. The artificial intelligence chip of claim 15, wherein the descriptor management instruction is a descriptor registration instruction, wherein to execute the descriptor management instruction to manage the descriptor by interacting with the first storage area and the second storage area, the control circuit is further configured to:

determine the content of the descriptor to indicate the second storage area according to at least one of the shape of the tensor data indicated by the descriptor, or the content of the tensor data indicated by the descriptor, and store the content of the descriptor in the first storage area.

17. The artificial intelligence chip of claim 16, wherein the management parameter includes the identifier of the descriptor, wherein the control circuit is further configured to:

when the identifier indicates the first storage area, determine the first storage area according to the identifier; or when the identifier does not indicate the first storage area, establish a correspondence between the identifier of the descriptor and the first storage area.

18. The artificial intelligence chip of claim 15, wherein the descriptor management instruction is a descriptor release instruction, and the management parameter includes the identifier of the descriptor, wherein to execute the descriptor management instruction to manage the descriptor by interacting with the first storage area and the second storage area, the control circuit is further configured to:

release the first storage area of the descriptor in the descriptor storage space and the second storage area of the content of the tensor data indicated by the descriptor in the data storage space, respectively, according to the identifier of the descriptor.

19. An electronic device, comprising the artificial intelligence chip of claim 15.

20. A hoard card, comprising a storage device, an interface apparatus, a control device, and the artificial intelligence chip of claim 15, wherein the artificial intelligence chip is connected to the storage device, the control device, and the interface apparatus, respectively;

the storage device is configured to store data;

the interface apparatus is configured to implement data transfer between the artificial intelligence chip and an external equipment; and the control device is configured to monitor a stale of the artificial intelligence chip.

* * * * *